US012745179B2

(12) United States Patent
Jin et al.

(10) Patent No.: US 12,745,179 B2
(45) Date of Patent: Sep. 22, 2026

(54) COMMUNICATION METHOD AND COMMUNICATION APPARATUS

(71) Applicant: HUAWEI TECHNOLOGIES CO., LTD., Shenzhen (CN)

(72) Inventors: Yinghao Jin, Boulogne Billancourt (FR); Chuan Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 244 days.

(21) Appl. No.: 18/509,869

(22) Filed: Nov. 15, 2023

(65) Prior Publication Data

US 2024/0089857 A1 Mar. 14, 2024

Related U.S. Application Data

(63) Continuation of application No. PCT/CN2022/092596, filed on May 13, 2022.

(30) Foreign Application Priority Data

May 18, 2021 (CN) ......................... 202110541101.X

(51) Int. Cl.
*H04W 52/02* (2009.01)
*H04L 5/00* (2006.01)
(Continued)

(52) U.S. Cl.
CPC ....... *H04W 52/0235* (2013.01); *H04L 5/0051* (2013.01); *H04W 56/0015* (2013.01); *H04W 68/02* (2013.01)

(58) Field of Classification Search
None
See application file for complete search history.

(56) References Cited

U.S. PATENT DOCUMENTS 10,917,887 B2 * 2/2021 Liu .................. H04W 72/0453
11,424,895 B2 * 8/2022 Kim .................. H04W 72/0446
(Continued)

FOREIGN PATENT DOCUMENTS

CN 102804861 A 11/2012
CN 106160839 A 11/2016
WO 2014056174 A1 4/2014

OTHER PUBLICATIONS

Qualcomm Incorporated, "PDCCH-Based Power Saving Channel Design", 3GPP TSG-RAN WG1#97, R1-1907294, XP051728734, May 13-17, 2019, 16 pages.

*Primary Examiner* — Eunsook Choi
(74) *Attorney, Agent, or Firm* — Maier & Maier, PLLC

(57) ABSTRACT

A terminal device receives a reference signal from a first cell, where time domain resources occupied by the reference signal are fewer than total time domain resources occupied by a synchronization signal block (SSB) of the first cell and system information (SI) of the first cell. The terminal device sends a wake-up signal (WUS) to the first cell, where the wake-up signal is used to wake up the first cell to send the SSB and/or the SI. In this way, the terminal device can quickly access the cell, to reduce a delay of accessing the cell by the terminal device, and improve communication performance. The time domain resources occupied by the reference signal are fewer than the total time domain resources occupied by the SSB of the first cell and the SI of the first cell.

19 Claims, 27 Drawing Sheets

(51) Int. Cl.
*H04W 56/00* (2009.01)
*H04W 68/02* (2009.01)

(56) References Cited

U.S. PATENT DOCUMENTS

| | | | | |
|---|---|---|---|---|
| 12,035,345 | B2 * | 7/2024 | Ying | H04W 72/1273 |
| 12,120,696 | B2 * | 10/2024 | Xiong | H04L 5/0044 |
| 12,127,097 | B2 * | 10/2024 | Harada | H04L 5/0053 |
| 12,155,444 | B2 * | 11/2024 | Zhang | H04W 76/19 |
| 12,177,748 | B2 * | 12/2024 | Ali | H04W 4/80 |
| 12,224,832 | B2 * | 2/2025 | Ben Hadj Fredj | H04W 76/28 |
| 12,232,035 | B2 * | 2/2025 | Li | H04W 68/025 |
| 12,267,260 | B2 * | 4/2025 | Viering | H04L 5/0032 |
| 12,302,246 | B2 * | 5/2025 | Peng | H04W 52/0219 |
| 2014/0198675 | A1 * | 7/2014 | He | H04W 72/046<br>370/252 |
| 2016/0135195 | A1 | 5/2016 | Dong | |
| 2017/0201980 | A1 * | 7/2017 | Hakola | H04L 5/0053 |
| 2021/0068053 | A1 | 3/2021 | Nam et al. | |
| 2021/0227496 | A1 * | 7/2021 | Ly | H04W 76/27 |
| 2022/0399973 | A1 * | 12/2022 | Zhou | H04L 5/0078 |
| 2023/0188261 | A1 * | 6/2023 | Awadin | H04L 1/1864<br>370/329 |
| 2023/0209487 | A1 * | 6/2023 | Liu | H04L 5/0053<br>370/503 |
| 2024/0089857 | A1 * | 3/2024 | Jin | H04W 52/02 |

* cited by examiner

COMMUNICATION METHOD AND COMMUNICATION APPARATUS

CROSS-REFERENCE TO RELATED APPLICATIONS

This application is a continuation of International Application No. PCT/CN2022/092596, filed on May 13, 2022, which priority to Chinese Patent Application No. 202110541101.X, filed on May 18, 2021. The disclosures of the aforementioned applications are hereby incorporated by reference in their entireties.

TECHNICAL FIELD

The embodiments relate to the field of communication technologies and to a communication method and a communication apparatus.

BACKGROUND

With increasing complexity of functions of base stations, power consumption of the base stations also continuously increases. Power consumption of the base stations has become one of main causes of high operational expenses of operators. Reduction of power consumption of the base stations has become a popular research topic nowadays.

Power consumption of a base station is mainly caused by a radio frequency module, and a power amplifier in the radio frequency module has highest power consumption. Currently, in a communication network, when a cell is lightly loaded or is unloaded, a power amplifier in a radio frequency module of a base station is turned off. In this case, the base station does not broadcast any message in the cell, to reduce power consumption of the base station. For example, the base station does not broadcast a synchronization signal block (SSB) of the cell or system information (SI) of the cell.

However, if a terminal device needs to access the cell and the base station does not broadcast any message in the cell, a delay of accessing the cell by the terminal device is excessively large.

SUMMARY

Embodiments provide a communication method and a communication apparatus to reduce a delay of accessing a cell by a terminal device and improve communication performance.

A first aspect of embodiments provides a communication method. The method includes the following steps:

A terminal device receives a reference signal from a first cell, where time domain resources occupied by the reference signal are fewer than total time domain resources occupied by an SSB of the first cell and SI of the first cell; and the terminal device sends a wake-up signal (WUS) to the first cell, where the wake-up signal is used to wake up the first cell to send the SSB and/or the SI.

In the foregoing solution, the terminal device may sense the first cell, synchronize with the first cell, and perform radio resource management and measurement based on the reference signal of the first cell. The time domain resources occupied by the reference signal are fewer than the total time domain resources occupied by the SSB corresponding to the first cell and the SI corresponding to the first cell. In this way, power consumption of broadcasting the reference signal by the first cell is low. In other words, the first cell is in a low-power broadcast mode. Therefore, power consumption overheads of the first cell are reduced. After the terminal device senses the first cell based on the reference signal, the terminal device sends the wake-up signal to the first cell, where the wake-up signal is used to wake up the first cell to send the SSB and/or the SI. In this case, the first cell can enable broadcasting of the SSB and the SI in a timely manner, so that the terminal device quickly accesses the first cell. This reduces a delay of accessing the cell by the terminal device, and improves communication performance.

In a possible implementation, the method further includes: the terminal device determines the first cell based on the reference signal.

In this possible implementation, the terminal device may determine the first cell based on the reference signal, so that the terminal device wakes up the first cell to access the first cell.

In another possible implementation, the reference signal includes at least one of the following information: an identifier of the first cell, a number of a system frame in which the reference signal is located, a half-frame indication, an index of the reference signal, a beam index of the reference signal, a time-frequency resource for sending the wake-up signal, a feature parameter of a pseudo-random sequence used by the wake-up signal, or a condition for sending the wake-up signal by the terminal device.

In this possible implementation, some information included in the reference signal is provided. For example, the terminal device may determine the first cell based on the information; or the terminal device may determine the wake-up signal for the first cell and the time-frequency resource for sending the wake-up signal based on the information. In this way, the terminal device can wake up the first cell, so that the terminal device accesses the first cell. This reduces a delay of accessing the cell by the terminal device, and improves communication performance.

In another possible implementation, that the terminal device sends a wake-up signal to the first cell includes the following step:

The terminal device sends the wake-up signal to the first cell when a first condition is met, where the first condition includes at least one of the following: the terminal device determines to camp on or access the first cell; received power of the reference signal is greater than a threshold; or the reference signal is a reference signal with maximum received power among reference signals that are received by the terminal device and that respectively correspond to one or more cells.

In this possible implementation, the terminal device sends the wake-up signal to the first cell when the first condition is met. This can prevent the first cell from frequently receiving a wake-up signal from the terminal device, to improve power saving effect for the first cell. When the reference signal received by the terminal device has high received power, and/or the reference signal is a reference signal with maximum received power among reference signals that are received by the terminal device and that are in one or more cells, the terminal device sends a wake-up signal to an access network device. Therefore, it can be understood that the terminal device can receive a signal with high strength from the first cell. In this way, if the terminal device subsequently accesses the first cell, the first cell can provide higher communication quality for the terminal device.

In another possible implementation, the reference signal includes the time-frequency resource for sending the wake-up signal and the feature parameter of the pseudo-random sequence used by the wake-up signal, and the method further includes the following step:

The terminal device generates the wake-up signal based on the feature parameter of the pseudo-random sequence used by the wake-up signal.

That the terminal device sends a wake-up signal to the first cell includes the following step:

The terminal device sends the wake-up signal to the first cell on the time-frequency resource for sending.

In this possible implementation, a specific implementation of generating the wake-up signal and sending the wake-up signal by the terminal device is provided, so that the solution has higher implementability. In this way, the terminal device can generate and send the wake-up signal, to wake up the first cell to broadcast the SSB and/or the SI. Therefore, the terminal device can quickly access the first cell, to improve communication performance.

In another possible implementation, the wake-up signal includes a preamble for waking up the first cell to send the SSB and/or the SI.

In this possible implementation, the terminal device wakes up, by using a specific preamble, the access network device to broadcast the SSB and/or the SI in the first cell. When the access network device receives the specific preamble, the access network device may determine that the preamble is used to wake up the access network device to broadcast the SSB and/or the SI in the first cell. The terminal device does not need to access the first cell, and the terminal device can quickly wake up the access network device to broadcast the SSB and/or the SI in the first cell. In other words, the terminal device can quickly transfer information to the access network device. In this case, the access network device can broadcast the SSB and/or the SI in the first cell in a timely manner. This helps the terminal device quickly access the first cell, and reduces an access delay.

In another possible implementation, the method further includes the following steps:

The terminal device receives the SSB and/or the SI from the first cell.

The terminal device camps on the first cell based on the SSB and/or the SI, or the terminal device initiates random access in the first cell based on the SSB and/or the SI, or the terminal device performs synchronization in the first cell based on the SSB and/or the SI.

In this possible implementation, the terminal device receives the SSB and/or the SI of the first cell after the terminal device wakes up the first cell. In this way, the terminal device can camp on or access the first cell, synchronize with the first cell, or perform another operation.

In another possible implementation, that the time domain resources occupied by the reference signal are fewer than the total time domain resources occupied by the SSB of the first cell and the SI of the first cell includes:

A quantity of time domain symbols occupied by the reference signal is less than a total quantity of time domain symbols occupied by the SSB of the first cell and the SI of the first cell.

In this possible implementation, the quantity of time domain symbols occupied by the reference signal is less than the total quantity of time domain symbols occupied by the SSB of the first cell and the SI of the first cell. That is, power consumption of the access network device is reduced through symbol-level shutdown. In this way, power consumption of broadcasting the reference signal by the first cell is low. Therefore, power consumption overheads of the first cell are reduced.

A second aspect of embodiments provides a communication method. The method includes the following steps:

A terminal device receives a reference signal from an access network device, where time domain resources occupied by the reference signal are fewer than total time domain resources occupied by an SSB of a first cell and SI of the first cell; and the terminal device sends a wake-up signal to the access network device, where the wake-up signal is used to wake up the access network device to send the SSB and/or the SI in the first cell.

In the foregoing solution, the terminal device may sense the first cell, synchronize with the first cell, and perform radio resource management and measurement based on the reference signal of the first cell. The time domain resources occupied by the reference signal are fewer than the total time domain resources occupied by the SSB corresponding to the first cell and the SI corresponding to the first cell. In this way, power consumption of broadcasting the reference signal by the first cell is low. In other words, the first cell is in a low-power broadcast mode. Therefore, power consumption overheads of the first cell are reduced. After the terminal device senses the first cell based on the reference signal, the terminal device sends the wake-up signal to the first cell, where the wake-up signal is used to wake up the first cell to send the SSB and/or the SI. In this case, the first cell can enable broadcasting of the SSB and the SI in a timely manner, so that the terminal device quickly accesses the first cell. This reduces a delay of accessing the cell by the terminal device, and improves communication performance.

In a possible implementation, the method further includes the following step:

The terminal device determines the first cell based on the reference signal.

In this possible implementation, the terminal device may determine the first cell based on the reference signal, so that the terminal device wakes up the first cell to access the first cell.

In another possible implementation, the reference signal includes at least one of the following information: an identifier of the first cell, a number of a system frame in which the reference signal is located, a half-frame indication, an index of the reference signal, a beam index of the reference signal, a time-frequency resource for sending the wake-up signal, a feature parameter of a pseudo-random sequence used by the wake-up signal, or a condition for sending the wake-up signal by the terminal device.

In this possible implementation, some information included in the reference signal is provided. For example, the terminal device may determine the first cell based on the information; or the terminal device may determine the wake-up signal for the first cell and the time-frequency resource for sending the wake-up signal based on the information. In this way, the terminal device can wake up the first cell, so that the terminal device accesses the first cell. This reduces a delay of accessing the cell by the terminal device, and improves communication performance.

In another possible implementation, that the terminal device sends a wake-up signal to the access network device includes the following step:

The terminal device sends the wake-up signal to the access network device when a first condition is met, where the first condition includes at least one of the following: the terminal device determines to camp on or access the first cell; received power of the reference signal is greater than a preset threshold; the reference signal is a reference signal with maximum received power among reference signals that are received by the terminal device and that respectively correspond to one or more cells; the reference signal includes a paging indication; or a system information number included in the reference signal changes.

In this possible implementation, the terminal device sends the wake-up signal to the access network device when the first condition is met. This can prevent the access network device from frequently receiving a wake-up signal from the terminal device, to improve power saving effect for the access network device. When the reference signal received by the terminal device has high received power, and/or the reference signal is a reference signal with maximum received power among reference signals that are received by the terminal device and that are in one or more cells, the terminal device sends a wake-up signal to an access network device. Therefore, it can be understood that the terminal device can receive a signal with high strength from the first cell. In this way, if the terminal device subsequently accesses the first cell, the access network device can provide higher communication quality for the terminal device.

In another possible implementation, the reference signal includes the time-frequency resource for sending the wake-up signal and the feature parameter of the pseudo-random sequence used by the wake-up signal, and the method further includes the following step:

The terminal device generates the wake-up signal based on the feature parameter of the pseudo-random sequence used by the wake-up signal.

That the terminal device sends a wake-up signal to the access network device includes the following step:

The terminal device sends the wake-up signal to the access network device on the time-frequency resource for sending.

In this possible implementation, a specific implementation of generating the wake-up signal and sending the wake-up signal by the terminal device is provided, so that the solution has higher implementability. In this way, the terminal device can generate and send the wake-up signal, to wake up the first cell to broadcast the SSB and/or the SI. Therefore, the terminal device can quickly access the first cell, to improve communication performance.

In another possible implementation, the wake-up signal includes a preamble for waking up the first cell to send the SSB and/or the SI.

In this possible implementation, the terminal device wakes up, by using a specific preamble, the access network device to broadcast the SSB and/or the SI in the first cell. When the access network device receives the specific preamble, the access network device may determine that the preamble is used to wake up the access network device to broadcast the SSB and/or the SI in the first cell. The terminal device does not need to access the first cell, and the terminal device can quickly wake up the access network device to broadcast the SSB and/or the SI in the first cell. In other words, the terminal device can quickly transfer information to the access network device. In this case, the access network device can broadcast the SSB and/or the SI in the first cell in a timely manner. This helps the terminal device quickly access the first cell, and reduces an access delay.

In another possible implementation, the method further includes the following steps:

The terminal device receives the SSB and/or the SI from the access network device.

The terminal device camps on the first cell based on the SSB and/or the SI, or the terminal device initiates random access in the first cell based on the SSB and/or the SI, or the terminal device performs synchronization in the first cell based on the SSB and/or the SI.

In this possible implementation, the terminal device receives the SSB and/or the SI of the first cell after the terminal device wakes up the first cell. In this way, the terminal device can camp on or access the first cell, synchronize with the first cell, or perform another operation.

A third aspect of embodiments provides a communication method. The method includes the following steps:

An access network device sends a reference signal to a terminal device, where the access network device is an access network device to which a first cell belongs, and time domain resources occupied by the reference signal are fewer than total time domain resources occupied by an SSB of the first cell and SI of the first cell; and the access network device receives a wake-up signal from the terminal device, where the wake-up signal is used to wake up the access network device to send the SSB and/or the SI in the first cell.

In the foregoing solution, the terminal device may sense the first cell, synchronize with the first cell, and perform radio resource management and measurement based on the reference signal of the first cell. The time domain resources occupied by the reference signal are fewer than the total time domain resources occupied by the SSB corresponding to the first cell and the SI corresponding to the first cell. In this way, power consumption of broadcasting the reference signal by the first cell is low. In other words, the first cell is in a low-power broadcast mode. Therefore, power consumption overheads of the first cell are reduced. After the terminal device senses the first cell based on the reference signal, the terminal device sends the wake-up signal to the first cell, where the wake-up signal is used to wake up the first cell to send the SSB and/or the SI. In this case, the first cell can enable broadcasting of the SSB and the SI in a timely manner, so that the terminal device quickly accesses the first cell. This reduces a delay of accessing the cell by the terminal device, and improves communication performance.

In a possible implementation, the reference signal includes at least one of the following information: an identifier of the first cell, a number of a system frame in which the reference signal is located, a half-frame indication, an index of the reference signal, a beam index of the reference signal, a time-frequency resource for sending the wake-up signal, a feature parameter of a pseudo-random sequence used by the wake-up signal, or a condition for sending the wake-up signal by the terminal device.

In this possible implementation, some information included in the reference signal is provided. For example, the terminal device may determine the first cell based on the information; or the terminal device may determine the wake-up signal for the first cell and the time-frequency resource for sending the wake-up signal based on the information. In this way, the terminal device can wake up the first cell, so that the terminal device accesses the first cell. This reduces a delay of accessing the cell by the terminal device, and improves communication performance.

In another possible implementation, the method further includes the following step:

The access network device sends the SSB and/or the SI to the terminal device.

In this implementation, after the terminal device wakes up the first cell, the access network device may send the SSB and/or the SI. In this way, the terminal device can quickly access the first cell based on the SSB and/or the SI, to improve communication performance.

In another possible implementation, the method further includes the following steps:

The access network device determines, based on first information, whether to enable broadcasting of the SSB and/or the SI in the first cell; and if the access network device determines to enable broadcasting of the SSB and/or the SI in the first cell, the access network device performs the step of sending, by the access network device, the SSB and/or the SI to the terminal device, where the first information includes at least one of the following: load of the first cell, load of a neighboring cell of the first cell, or received power of the reference signal.

In this possible implementation, the access network device may comprehensively determine, based on at least one of a load status of the first cell, a load status of the neighboring cell, and the received power of the reference signal, whether to enable broadcasting of the SSB and/or the SI in the first cell, to further improve communication performance.

In another possible implementation, the reference signal includes the time-frequency resource for sending the wake-up signal and the feature parameter of the pseudo-random sequence used by the wake-up signal, and the method further includes the following steps:

The access network device receives the wake-up signal from the terminal device on the time-frequency resource for sending.

The access network device determines the wake-up signal based on the feature parameter of the pseudo-random sequence used by the wake-up signal.

In this possible implementation, an implementation of receiving the wake-up signal and parsing the wake-up signal by the access network device is provided. In this way, the access network device can receive and parse the wake-up signal according to this implementation, so that the access network device broadcasts the SSB and/or the SI of the first cell in a timely manner. In this way, the terminal device can quickly access the first cell, to improve communication performance.

In another possible implementation, the wake-up signal includes a preamble for waking up the first cell to send the SSB and/or the SI.

In this possible implementation, the terminal device wakes up, by using a specific preamble, the access network device to broadcast the SSB and/or the SI in the first cell. When the access network device receives the specific preamble, the access network device may determine that the preamble is used to wake up the access network device to broadcast the SSB and/or the SI in the first cell. The terminal device does not need to access the first cell, and the terminal device can quickly wake up the access network device to broadcast the SSB and/or the SI in the first cell. In other words, the terminal device can quickly transfer information to the access network device. In this case, the access network device can broadcast the SSB and/or the SI in the first cell in a timely manner. This helps the terminal device quickly access the first cell, and reduces an access delay.

In another possible implementation, that the time domain resources occupied by the reference signal are fewer than the total time domain resources occupied by the SSB of the first cell and the SI of the first cell includes:

A quantity of time domain symbols occupied by the reference signal is less than a total quantity of time domain symbols occupied by the SSB of the first cell and the SI of the first cell.

In this possible implementation, the quantity of time domain symbols occupied by the reference signal is less than the total quantity of time domain symbols occupied by the SSB of the first cell and the SI of the first cell. That is, power consumption of the access network device is reduced through symbol-level shutdown. In this way, power consumption of broadcasting the reference signal by the first cell is low. Therefore, power consumption overheads of the first cell are reduced.

A fourth aspect of embodiments provides a communication method. The method includes the following steps:

A terminal device receives a reference signal from a first cell, where time domain resources occupied by the reference signal are fewer than total time domain resources occupied by an SSB of the first cell and SI of the first cell; and the terminal device sends a measurement result to a second cell, where the measurement result is a measurement result obtained by the terminal device by measuring the reference signal.

In the foregoing solution, the terminal device senses the first cell, synchronizes with the first cell, and performs radio resource management and measurement based on the reference signal of the first cell. The time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the first cell are reduced. The terminal device sends, to the second cell, the measurement result obtained by the terminal device by measuring the reference signal. After obtaining the measurement result, the second cell may indicate, based on the measurement result, the first cell to enable broadcasting of the SSB and/or the SI. That is, the foregoing solution provides a way of triggering the second cell to indicate the first cell to enable broadcasting of the SSB and/or the SI. For the terminal device that is to access the first cell, the first cell can enable broadcasting of the SSB and/or the SI in a timely manner in the foregoing solution. This helps the terminal device quickly access the first cell, reduces a delay of accessing the cell by the terminal device, and improves communication performance.

In a possible implementation, the method further includes the following step:

The terminal device receives configuration information from the second cell, where the configuration information is configuration information of the reference signal.

That the terminal device sends a measurement result to a second cell includes the following step:

The terminal device sends the measurement result to the second cell based on the configuration information.

In this possible implementation, the terminal device may send the measurement result based on the configuration information sent by the second cell, to ensure that the second cell can receive the measurement result. In this way, the second cell can indicate, in a timely manner, the first cell to enable transmission of the SSB and/or the SI. This helps the terminal device quickly access the first cell, reduces a delay of accessing the cell by the terminal device, and improves communication performance.

In another possible implementation, the configuration information includes at least one of the following:

a reference signal measurement cycle, a channel number of a reference signal, a received power threshold for reporting a reference signal, or a physical random access channel (physical random access channel, PRACH) time-frequency resource and a preamble for reporting a measurement result.

The foregoing implementation describes content included in the configuration information, and provides a basis for implementing the solution. For example, the terminal device may determine, based on the configuration information, a reporting condition for reporting a measurement result. The terminal device measures a reference signal based on the measurement cycle, determines a time-frequency resource for reporting a measurement result, and the like. This helps the second cell receive the measurement result. In this way, the second cell can indicate, in a timely manner, the first cell to enable transmission of the SSB and/or the SI. This helps the terminal device quickly access the first cell, reduces a delay of accessing the cell by the terminal device, and improves communication performance.

In another possible implementation, the reference signal includes at least one of the following information:

an identifier of the first cell, a number of a system frame in which the reference signal is located, a half-frame indication, an index of the reference signal, or a beam index of the reference signal.

In this possible implementation, some information included in the reference signal is provided. For example, the terminal device may determine the first cell based on the information, so that the terminal device accesses the first cell. This reduces a delay of accessing the cell by the terminal device, and improves communication performance.

In another possible implementation, that the terminal device sends a measurement result to a second cell includes the following step:

The terminal device sends the measurement result to the second cell when a first condition is met, where the first condition includes at least one of the following: received power of a reference signal in the measurement result is greater than a first threshold; or received power of any one of an SSB, a channel state information reference signal, and a demodulation reference signal of the second cell that are broadcast in the second cell is less than a second threshold.

In this possible implementation, the terminal device sends the measurement result to the second cell when the first condition is met. This prevents the second cell from frequently receiving a measurement result from the terminal device, to improve power saving effect for the second cell. The terminal device sends the measurement result to the second cell when the received power of the reference signal in the measurement result is greater than the first threshold, and/or the received power of any one of the SSB, the channel state information reference signal, and the demodulation reference signal of the second cell that are broadcast in the second cell is less than the second threshold. Therefore, it can be understood that the terminal device can receive a signal with high strength from the first cell. In this way, if the terminal device subsequently accesses the first cell, the first cell can provide higher communication quality for the terminal device.

In another possible implementation, the measurement result includes at least one of the following: the identifier of the first cell or the received power of the reference signal.

In this possible implementation, the second cell may determine the first cell and a received power status of the reference signal based on content included in the measurement result. In this way, the second cell can indicate the first cell to enable broadcasting of the SSB and/or the SI. This enables the terminal device to quickly access the first cell, reduces a delay of accessing the cell by the terminal device, and improves communication performance.

In another possible implementation, if the first cell enables broadcasting of the SSB of the first cell and/or the SI of the first cell, the method further includes the following steps:

The terminal device receives the SSB and/or the SI from the first cell.

The terminal device camps on the first cell based on the SSB and/or the SI, or the terminal device initiates random access in the first cell based on the SSB and/or the SI, or the terminal device performs synchronization in the first cell based on the SSB and/or the SI.

In this possible implementation, the first cell broadcasts the SSB and/or the SI after the second cell indicates the first cell to enable broadcasting of the SSB and/or the SI. The terminal device may receive the SSB and/or the SI of the first cell. In this way, the terminal device can camp on or access the first cell, synchronize with the first cell, or perform another operation.

A fifth aspect of embodiments provides a communication method. The method includes the following steps:

A terminal device receives a reference signal from a first access network device, where the first access network device is an access network device corresponding to a first cell, and time domain resources occupied by the reference signal are fewer than total time domain resources occupied by an SSB of the first cell and SI of the first cell; and the terminal device sends a measurement result to a second access network device, where the measurement result is a measurement result obtained by the terminal device by measuring the reference signal.

In the foregoing solution, the terminal device senses the first cell, synchronizes with the first cell, and performs radio resource management and measurement based on the reference signal of the first cell. The time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the first access network device are reduced. The terminal device sends, to the second access network device, the measurement result obtained by the terminal device by measuring the reference signal. After obtaining the measurement result, the second access network device may indicate, based on the measurement result, the first access network device to enable broadcasting of the SSB of the first cell and/or the SI of the first cell in the first cell. That is, the foregoing solution provides a way of triggering the second access network device to indicate the first access network device to enable broadcasting of the SSB of the first cell and/or the SI of the first cell. For the terminal device that is to access the first cell, the first access network device can enable broadcasting of the SSB of the first cell and/or the SI of the first cell in a timely manner in the foregoing solution. This helps the terminal device quickly access the first cell, reduces a delay of accessing the cell by the terminal device, and improves communication performance.

In a possible implementation, the method further includes the following step:

The terminal device receives configuration information from the second access network device, where the configuration information is configuration information of the reference signal.

That the terminal device sends a measurement result to a second access network device includes the following step:

The terminal device sends the measurement result to the second access network device based on the configuration information.

In this possible implementation, the terminal device may send the measurement result based on the configuration information sent by the second access network device, to ensure that the second access network device can receive the measurement result. In this way, the second access network device can indicate, in a timely manner, the first access network device to enable broadcasting of the SSB and/or the SI. This helps the terminal device quickly access the first cell, reduces a delay of accessing the cell by the terminal device, and improves communication performance.

In another possible implementation, the configuration information includes at least one of the following:

a reference signal measurement cycle, a channel number of a reference signal, a received power threshold for reporting a reference signal, or a PRACH time-frequency resource and a preamble for reporting a measurement result.

The foregoing implementation describes content included in the configuration information, and provides a basis for implementing the solution. For example, the terminal device may determine, based on the configuration information, a reporting condition for reporting a measurement result. The terminal device measures a reference signal based on the measurement cycle, determines a time-frequency resource for reporting a measurement result, and the like. This helps the second cell receive the measurement result. In this way, the second cell can indicate, in a timely manner, the first cell to enable broadcasting of the SSB and/or the SI. This helps the terminal device quickly access the first cell, reduces a delay of accessing the cell by the terminal device, and improves communication performance.

In another possible implementation, the reference signal includes at least one of the following information:

an identifier of the first cell, a number of a system frame in which the reference signal is located, a half-frame indication, an index of the reference signal, or a beam index of the reference signal.

In this possible implementation, some information included in the reference signal is provided. For example, the terminal device may determine the first cell based on the information, so that the terminal device accesses the first cell. This reduces a delay of accessing the cell by the terminal device, and improves communication performance.

In another possible implementation, that the terminal device sends a measurement result to a second access network device includes the following step:

The terminal device sends the measurement result to the second access network device when a first condition is met, where the first condition includes at least one of the following: received power of a reference signal in the measurement result is greater than a first threshold; or received power of any one of a synchronization signal block SSB, a channel state information reference signal, and a demodulation reference signal that correspond to the second cell and that are broadcast by the second access network device in the second cell is less than a second threshold.

In this possible implementation, the terminal device sends the measurement result to the second access network device when the first condition is met. This prevents the second access network device from frequently receiving a measurement result from the terminal device, to improve power saving effect for the second cell. The terminal device sends the measurement result to the second access network device when the received power of the reference signal in the measurement result is greater than the first threshold, and/or the received power of any one of the SSB, the channel state information reference signal, and the demodulation reference signal of the second cell that are broadcast in the second cell is less than the second threshold. Therefore, it can be understood that the terminal device can receive a signal with high strength from the first cell. In this way, if the terminal device subsequently accesses the first cell, the first cell can provide higher communication quality for the terminal device.

In another possible implementation, the measurement result includes at least one of the following: the identifier of the first cell or the received power of the reference signal.

In this possible implementation, the second access network device may determine the first cell and a received power status of the reference signal based on content included in the measurement result. In this way, the second access network device can indicate the first access network device to enable broadcasting of the SSB and/or the SI. This enables the terminal device to quickly access the first cell, reduces a delay of accessing the cell by the terminal device, and improves communication performance.

In another possible implementation, if the first access network device enables broadcasting of the SSB of the first cell and/or the SI of the first cell in the first cell, the method further includes the following steps:

The terminal device receives the SSB and/or the SI from the first access network device.

The terminal device camps on the first cell based on the SSB and the SI, or the terminal device initiates random access in the first cell based on the SSB and the SI, or the terminal device performs synchronization in the first cell based on the SSB and the SI.

In this possible implementation, the first access network device broadcasts the SSB and/or the SI in the first cell after the second access network device indicates the first access network device to enable broadcasting of the SSB and/or the SI. The terminal device may receive the SSB and/or the SI of the first cell. In this way, the terminal device can camp on or access the first cell, synchronize with the first cell, or perform another operation.

A sixth aspect of embodiments provides a communication method. The method includes the following steps:

A first access network device sends a reference signal to a terminal device, where the first access network device is an access network device to which a first cell belongs, and time domain symbols occupied by the reference signal are fewer than total time domain resources occupied by an SSB of the first cell and SI of the first cell; the first access network device receives indication information from a second access network device, where the indication information indicates the first access network device to enable broadcasting of the SSB and/or the SI in the first cell; and the first access network device broadcasts the SSB and/or the SI in the first cell based on the indication information.

In the foregoing solution, the terminal device senses the first cell, synchronizes with the first cell, and performs radio resource management and measurement based on the reference signal of the first cell. The time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the first access network device are reduced. The first access network device receives the indication information, so that the first access network device can enable, in a timely manner, broadcasting of the SSB and/or the SI in the first cell. This helps the terminal device quickly access the first cell, reduces a delay of accessing the cell by the terminal device, and improves communication performance.

In a possible implementation, the reference signal includes at least one of the following information:

an identifier of the first cell, a number of a system frame in which the reference signal is located, a half-frame indication, an index of the reference signal, or a beam index of the reference signal.

In this possible implementation, some information included in the reference signal is provided. For example, the terminal device may determine the first cell based on the information, so that the terminal device accesses the first cell. This reduces a delay of accessing the cell by the terminal device, and improves communication performance.

A seventh aspect of embodiments provides a communication method. The method includes the following steps:

A second access network device receives a measurement result from a terminal device, where the measurement result is a measurement result obtained by the terminal device by measuring a reference signal of a first cell, and time domain symbols occupied by the reference signal are fewer than total time domain resources occupied by an SSB of the first cell and SI of the first cell; and the second access network device sends indication information to a first access network device, where the first access network device is an access network device to which the first cell belongs, and the indication information indicates the first access network device to enable broadcasting of the SSB and/or the SI in the first cell.

In the foregoing solution, the terminal device senses the first cell, synchronizes with the first cell, and performs radio resource management and measurement based on the reference signal of the first cell. The time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the first access network device are reduced. The second access network device sends the indication information to the first access network device, so that the first access network device can enable, in a timely manner, broadcasting of the SSB and/or the SI in the first cell. This helps the terminal device quickly access the first cell, reduces a delay of accessing the cell by the terminal device, and improves communication performance.

In a possible implementation, the method further includes the following step:

The second access network device sends configuration information to the terminal device, where the configuration information is configuration information of the reference signal, and the configuration information is used by the terminal device to send the measurement result.

In this possible implementation, the second access network device sends the configuration information to the terminal device. In this way, the terminal device can send the measurement result based on the configuration information, to ensure that the second access network device can receive the measurement result. In this way, the second access network device can indicate, in a timely manner, the first access network device to enable transmission of the SSB and/or the SI. This helps the terminal device quickly access the first cell, reduces a delay of accessing the cell by the terminal device, and improves communication performance.

In another possible implementation, the configuration information includes at least one of the following:

a reference signal measurement cycle, a channel number of a reference signal, a received power threshold for reporting a reference signal, or a PRACH time-frequency resource and a preamble for reporting a measurement result.

The foregoing implementation describes content included in the configuration information, and provides a basis for implementing the solution. For example, the terminal device may determine, based on the configuration information, a reporting condition for reporting a measurement result. The terminal device measures a reference signal based on the measurement cycle, determines a time-frequency resource for reporting a measurement result, and the like. This helps the second access network device receive the measurement result. In this way, the second access network device can indicate, in a timely manner, the first access network device to enable transmission of the SSB and/or the SI in the first cell. This helps the terminal device quickly access the first cell, reduces a delay of accessing the cell by the terminal device, and improves communication performance.

In another possible implementation, the measurement result includes at least one of the following: the identifier of the first cell or the received power of the reference signal.

In this possible implementation, the second access network device may determine the first cell and a received power status of the reference signal based on content included in the measurement result. In this way, the second access network device can indicate the first access network device to enable broadcasting of the SSB and/or the SI. This enables the terminal device to quickly access the first cell, reduces a delay of accessing the cell by the terminal device, and improves communication performance.

In another possible implementation, the reference signal includes at least one of the following information:

an identifier of the first cell, a number of a system frame in which the reference signal is located, a half-frame indication, an index of the reference signal, or a beam index of the reference signal.

In this possible implementation, some information included in the reference signal is provided. For example, the terminal device may determine the first cell based on the information, so that the terminal device accesses the first cell. This reduces a delay of accessing the cell by the terminal device, and improves communication performance.

In another possible implementation, the method further includes the following steps:

The second access network device determines whether to indicate the first access network device to enable broadcasting of the SSB and/or the SI in the first cell; and if the second access network device determines to indicate the first access network device to enable broadcasting of the SSB and/or the SI of the first cell, the second access network device performs the step of sending, by the second access network device, indication information to a first access network device.

In this possible implementation, the second access network device may first determine whether to indicate the first access network device to enable broadcasting of the SSB and/or the SI in the first cell, to further improve communication performance. For example, the second access network device may determine, based on a load status of the first cell, a load status of a second cell, received power of the reference signal of the first cell, and the like, whether to indicate the first access network device to enable broadcasting of the SSB and/or the SI in the first cell, to improve communication performance.

An eighth aspect of embodiments provides a communication method. The method includes the following steps:

A terminal device receives a reference signal from a first cell, where the first cell is a cell associated with a second cell, and time domain resources occupied by the reference signal are fewer than total time domain resources occupied by an SSB of the first cell and SI of the first cell; the terminal device receives access information from the second cell, where the access information includes access information of the first cell; and the terminal device determines a candidate access cell, where the candidate access cell is selected from the first cell based on the access information and the reference signal.

In the foregoing solution, the terminal device senses the first cell, synchronizes with the first cell, and performs radio resource management and measurement based on the reference signal of the first cell. The time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the first cell are reduced. The terminal device obtains the access information of the first cell from the second cell. In this way, the terminal device can select, based on the access information and the reference signal of the first cell, the candidate access cell for access. This enables the terminal device to quickly access the candidate access cell, reduces a delay of accessing the cell by the terminal device, and improves communication performance.

In a possible implementation, the first cell is located on a first carrier, the second cell is located on a second carrier, and the first carrier is different from the second carrier.

The foregoing implementation provides a scenario to which is the embodiments are applicable. The first cell and the second cell may be cells on different carriers. In this way, the terminal device can access or camp on only the second cell, and select the candidate access cell from the first cell by receiving the access information of the second cell. The first cell does not need to broadcast an SSB and/or SI, so that power consumption overheads of the first cell are reduced.

In another possible implementation, the access information includes at least one of the following:

an identifier of the first cell, an index of the first cell, a channel number of the first cell, a priority of the first cell, an offset of a start time domain location of the reference signal relative to a start time domain location or an end time domain location of an SSB in the second cell, an identifier of a network supported by the first cell, a random access parameter of the first cell, a selection parameter of the first cell, or a reselection parameter of the first cell.

In this possible implementation, content included in the access information is provided, so that the terminal device can select and access the candidate access cell based on the access information. The first cell does not need to broadcast an SSB and/or SI, so that power consumption overheads of the first cell are reduced. In addition, the terminal device can quickly access the candidate access cell based on the access information, to reduce a delay of accessing the cell by the terminal device, and improve communication performance.

In another possible implementation, the method further includes: the terminal device sends a first request to the second cell, where the first request is used to request the second cell to send the access information.

In this possible implementation, when the terminal device needs to access the candidate access cell, the terminal device may request the access information of the first cell from the second cell. This can prevent the second cell from keeping broadcasting the access information of the first cell, and reduce an amount of broadcasting performed by a second access network device, to further reduce power consumption overheads of the second cell, and improve power saving effect.

In another possible implementation, that the terminal device sends a first request to the second cell includes the following step:

The terminal device sends the first request to the second cell by using a preamble or a radio resource control (RRC) system request message.

The foregoing implementation provides two carriers used by the terminal device to send the first request, and provides a basis for implementing the solution. In addition, the terminal device sends the first request to the second cell by using the preamble, and the terminal device does not need to access the second cell. The terminal device can quickly transfer information to the second cell, so that the terminal device quickly obtains the access information of the first cell. This helps the terminal device quickly select the candidate access cell and access the candidate access cell, to reduce a delay of accessing the cell by the terminal device, and improve communication performance.

In another possible implementation, that the terminal device sends a first request to the second cell includes the following step:

The terminal device sends the first request to the second cell when the terminal device detects that the reference signal of the first cell includes a reference signal whose received power is greater than or equal to a threshold.

In this implementation, the terminal device requests the access information of the first cell from the second cell when the terminal device detects that the received power of the reference signal is greater than the threshold. This can prevent the terminal device from frequently requesting the access information of the first cell from the second cell, to reduce power consumption overheads of the second cell. In addition, when received power of a reference signal is greater than the threshold, it indicates that strength of a signal received by the terminal device from a cell corresponding to the reference signal is high. In this way, if the terminal device subsequently accesses the cell, the cell can provide higher communication quality for the terminal device, to improve communication performance.

In another possible implementation, the first cell is a data component carrier (DCC) cell, the second cell is a basic component carrier (BCC) cell, and the first cell is all DCC cells associated with the second cell, or the first cell is some DCC cells associated with the second cell.

In this possible implementation, the first cell may be some or all DCC cells associated with the second cell. For example, by default, the second cell may broadcast access information of all cells associated with the second cell. This helps the terminal device select the candidate access cell from the first cell based on the access information, and access the candidate access cell. Alternatively, the second cell may broadcast access information of a cell with a higher priority among cells associated with the second cell. That is, the first cell includes some cells associated with the second cell. Therefore, an amount of broadcasting performed by the second cell is reduced, and power consumption overheads of broadcasting performed by the second cell are reduced.

In another possible implementation, the method further includes the following step:

The terminal device receives indication information from the second cell, where the indication information indicates that the second cell is a BCC cell.

In the foregoing implementation, the second cell may indicate, by using the indication information, that the second cell is a BCC cell. In this way, the terminal device can request the access information of the first cell from the second cell, so that the terminal device quickly accesses the candidate access cell.

In another possible implementation, the method further includes the following step:

If the terminal device has to-be-sent data, the terminal device initiates random access to the candidate access cell through a random access resource of the candidate access cell.

In the foregoing implementation, the terminal device can quickly access the candidate access cell when the terminal device has to-be-sent data, to reduce a delay of accessing the cell by the terminal device, and improve communication performance.

In another possible implementation, the access information includes SI corresponding to the first cell.

In the foregoing implementation, the access information may be the SI of the first cell. In this way, after the terminal device obtains the SI of the first cell, the terminal device can determine SI in the candidate access cell, and quickly access the candidate access cell, to improve communication performance.

A ninth aspect of embodiments provides a communication method. The method includes the following steps:

A terminal device receives a reference signal from a first access network device, where the first access network device is an access network device to which a first cell belongs, and time domain resources occupied by the reference signal are fewer than total time domain resources occupied by an SSB of the first cell and SI of the first cell; the terminal device receives access information from a second access network device, where the access information includes access information of the first cell, the second access network device is an access network device to which a second cell belongs, and the first cell is a cell associated with the second cell; and the terminal device determines a candidate access cell, where the candidate access cell is selected from the first cell based on the access information and the reference signal.

In the foregoing solution, the terminal device senses the first cell, synchronizes with the first cell, and performs radio resource management and measurement based on the reference signal of the first cell. The time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the first access network device are reduced. The terminal device obtains the access information of the first cell from the second access network device. In this way, the terminal device can select, based on the access information and the reference signal of the first cell, the candidate access cell for access. This enables the terminal device to quickly access the candidate access cell, reduces a delay of accessing the cell by the terminal device, and improves communication performance.

In a possible implementation, the first cell is located on a first carrier, the second cell is located on a second carrier, and the first carrier is different from the second carrier.

The foregoing implementation provides a scenario to which is the embodiments are applicable. The first cell and the second cell may be cells on different carriers. In this way, the terminal device can access or camp on only the second cell, and select the candidate access cell from the first cell by receiving the access information of the second cell. The first cell does not need to broadcast an SSB and/or SI, so that power consumption overheads of the first cell are reduced.

In another possible implementation, the access information includes at least one of the following:

an identifier of the first cell, an index of the first cell, a channel number of the first cell, a priority of the first cell, an offset of a start time domain location of the reference signal relative to a start time domain location or an end time domain location of an SSB in the second cell, an identifier of a network supported by the first cell, a random access parameter of the first cell, a selection parameter of the first cell, or a reselection parameter of the first cell.

In this possible implementation, content included in the access information is provided, so that the terminal device can select and access the candidate access cell based on the access information. The first cell does not need to broadcast an SSB and/or SI, so that power consumption overheads of the first cell are reduced. In addition, the terminal device can quickly access the candidate access cell based on the access information, to reduce a delay of accessing the cell by the terminal device, and improve communication performance.

In another possible implementation, the method further includes the following step:

The terminal device sends a first request to the second access network device, where the first request is used to request the second access network device to send the access information.

In this possible implementation, when the terminal device needs to access the candidate access cell, the terminal device may request the access information of the first cell from the second access network device. This can prevent the second access network device from keeping broadcasting the access information of the first cell, and reduce an amount of broadcasting performed by a second access network device, to further reduce power consumption overheads of the second access network device, and improve power saving effect.

In another possible implementation, that the terminal device sends a first request to the second access network device includes the following step:

The terminal device sends the first request to the second access network device by using a preamble or an RRC system request message.

The foregoing implementation provides two carriers used by the terminal device to send the first request, and provides a basis for implementing the solution. In addition, the terminal device sends the first request to the second access network device by using the preamble, and the terminal device does not need to access the second cell. The terminal device can quickly transfer information to the second cell, so that the terminal device quickly obtains the access information of the first cell. This helps the terminal device quickly select the candidate access cell and access the candidate access cell, to reduce a delay of accessing the cell by the terminal device, and improve communication performance.

In another possible implementation, that the terminal device sends a first request to the second access network device includes the following step:

The terminal device sends the first request to the second access network device when the terminal device detects that received power of the reference signal of the first cell is greater than or equal to a threshold.

In this implementation, the terminal device requests the access information of the first cell from the second access network device when the terminal device detects that the received power of the reference signal is greater than the threshold. This can prevent the terminal device from frequently requesting the access information of the first cell from the second access network device, to reduce power consumption overheads of the second access network device. In addition, when received power of a reference signal is greater than the threshold, it indicates that strength of a signal received by the terminal device from a cell corresponding to the reference signal is high. In this way, if the terminal device subsequently accesses the cell, the cell can provide higher communication quality for the terminal device, to improve communication performance.

In another possible implementation, the first cell is a DCC cell, the second cell is a BCC cell, and the first cell is all DCC cells associated with the second cell, or the first cell is some BCC cells associated with the second cell.

In this possible implementation, the first cell may be some or all DCC cells associated with the second cell. For example, by default, the second cell may broadcast access information of all cells associated with the second cell. This helps the terminal device select the candidate access cell from the first cell based on the access information, and access the candidate access cell. Alternatively, the second cell may broadcast access information of a cell with a higher priority among cells associated with the second cell. That is, the first cell includes some cells associated with the second cell. Therefore, an amount of broadcasting performed by the second cell is reduced, and power consumption overheads of broadcasting performed by the second cell are reduced.

In another possible implementation, the method further includes the following step:

The terminal device receives indication information from the second access network device, where the indication information indicates that the second cell is a BCC cell.

In the foregoing implementation, the second access network device may indicate, by using the indication information, that the second cell is a BCC cell. In this way, the terminal device can request the access information of the first cell from the second access network device, so that the terminal device quickly accesses the candidate access cell.

In another possible implementation, the method further includes the following step:

If the terminal device has to-be-sent data, the terminal device initiates random access to the candidate access cell through a random access resource of the candidate access cell.

In the foregoing implementation, the terminal device can quickly access the candidate access cell when the terminal device has to-be-sent data, to reduce a delay of accessing the cell by the terminal device, and improve communication performance.

In another possible implementation, the access information includes SI of the first cell.

In the foregoing implementation, the access information may be the SI of the first cell. In this way, after the terminal device obtains the SI of the first cell, the terminal device can determine SI in the candidate access cell, and quickly access the candidate access cell, to improve communication performance.

A tenth aspect of embodiments provides a communication method. The method includes the following step:

A second access network device sends access information to a terminal device, where the access information includes access information of a first cell, the first cell is a cell of a first access network device, the first cell is a cell associated with a second cell, the second cell is a cell of the second access network device, and time domain resources occupied by a reference signal of the first cell are fewer than total time domain resources occupied by an SSB of the first cell and SI of the first cell.

In the foregoing solution, the second access network device sends the access information of the first cell to the terminal device. In this way, the terminal device can select a candidate access cell from the first cell based on the access information, and access the candidate access cell. This enables the terminal device to quickly access the candidate access cell, reduces a delay of accessing the cell by the terminal device, and improves communication performance.

In a possible implementation, the first cell is located on a first carrier, the second cell is located on a second carrier, and the first carrier is different from the second carrier.

The foregoing implementation provides a scenario to which is the embodiments are applicable. The first cell and the second cell may be cells on different carriers. In this way, the terminal device can access or camp on only the second cell, and select the candidate access cell from the first cell by receiving the access information of the second cell. The first cell does not need to broadcast an SSB and/or SI, so that power consumption overheads of the first cell are reduced.

In another possible implementation, the access information includes SI of the first cell.

In the foregoing implementation, the access information may be the SI of the first cell. In this way, after the terminal device obtains the SI of the first cell, the terminal device can determine SI in the candidate access cell, and quickly access the candidate access cell, to improve communication performance.

In another possible implementation, the access information includes at least one of the following:

an identifier of the first cell, an index of the first cell, a channel number of the first cell, a priority of the first cell, an offset between a start time domain location of the reference signal and a start time domain location or an end time domain location of an SSB in the second cell, an identifier of a network supported by the first cell, a random access parameter of the first cell, a selection parameter of the first cell, or a reselection parameter of the first cell.

In this possible implementation, content included in the access information is provided, so that the terminal device can select and access the candidate access cell based on the access information. The first cell does not need to broadcast an SSB and/or SI, so that power consumption overheads of the first cell are reduced. In addition, the terminal device can quickly access the candidate access cell based on the access information, to reduce a delay of accessing the cell by the terminal device, and improve communication performance.

In another possible implementation, the method further includes the following step:

The second access network device receives a first request from the terminal device, where the first request is used to request the second access network device to send the access information.

In this possible implementation, when the terminal device needs to access the candidate access cell, the terminal device may request the access information of the first cell from the second access network device. This can prevent the second access network device from keeping broadcasting the access information of the first cell, and reduce an amount of broadcasting performed by a second access network device, to further reduce power consumption overheads of the second access network device, and improve power saving effect.

In another possible implementation, that the second access network device receives a first request from the terminal device includes the following step:

The second access network device receives a preamble from the terminal device, where the preamble includes the first request; or the second access network device receives an RRC system message from the terminal device, where the RRC system message includes the first request.

The foregoing implementation provides two carriers used by the terminal device to send the first request, and provides a basis for implementing the solution. In addition, the terminal device sends the first request to the second access network device by using the preamble, and the terminal device does not need to access the second cell. The terminal device can quickly transfer information to the second cell, so that the terminal device quickly obtains the access information of the first cell. This helps the terminal device quickly select the candidate access cell and access the candidate access cell, to reduce a delay of accessing the cell by the terminal device, and improve communication performance.

In another possible implementation, the first cell is a DCC cell, the second cell is a BCC cell, and the first cell is all DCC cells associated with the second cell, or the first cell is some BCC cells associated with the second cell.

In this possible implementation, the first cell may be some or all DCC cells associated with the second cell. For example, by default, the second cell may broadcast access information of all cells associated with the second cell. This helps the terminal device select the candidate access cell from the first cell based on the access information, and access the candidate access cell. Alternatively, the second cell may broadcast access information of a cell with a higher priority among cells associated with the second cell. That is, the first cell includes some cells associated with the second cell. Therefore, an amount of broadcasting performed by the second cell is reduced, and power consumption overheads of broadcasting performed by the second cell are reduced.

In another possible implementation, the method further includes the following step:

The second access network device sends indication information to the terminal device, where the indication information indicates that the second cell is a BCC cell.

In the foregoing implementation, the second access network device may indicate, by using the indication information, that the second cell is a BCC cell. In this way, the terminal device can request the access information of the first cell from the second access network device, so that the terminal device quickly accesses the candidate access cell.

An eleventh aspect of embodiments provides a communication apparatus. The communication apparatus includes:

a receiving unit, configured to receive a reference signal from a first cell, where time domain resources occupied by the reference signal are fewer than total time domain resources occupied by an SSB of the first cell and SI of the first cell; and a sending unit, configured to send a wake-up signal to the first cell, where the wake-up signal is used to wake up the first cell to send the SSB and/or the SI.

In a possible implementation, the communication apparatus further includes a processing unit, where the processing unit is configured to determine the first cell based on the reference signal.

In another possible implementation, the reference signal includes at least one of the following information:

an identifier of the first cell, a number of a system frame in which the reference signal is located, a half-frame indication, an index of the reference signal, a beam index of the reference signal, a time-frequency resource for sending the wake-up signal, a feature parameter of a pseudo-random sequence used by the wake-up signal, or a condition for sending the wake-up signal by the communication apparatus.

In another possible implementation, the sending unit is configured to:

send the wake-up signal to the first cell when a first condition is met, where the first condition includes at least one of the following: the communication apparatus determines to camp on or access the first cell; received power of the reference signal is greater than a threshold; or the reference signal is a reference signal with maximum received power among reference signals that are received by the communication apparatus and that respectively correspond to one or more cells.

In another possible implementation, the reference signal includes the time-frequency resource for sending the wake-up signal and the feature parameter of the pseudo-random sequence used by the wake-up signal, and the processing unit is further configured to:

generate the wake-up signal based on the feature parameter of the pseudo-random sequence used by the wake-up signal; and the sending unit is configured to:

send the wake-up signal to the first cell on the time-frequency resource for sending.

In another possible implementation, the wake-up signal includes a preamble for waking up the first cell to send the SSB and/or the SI.

In another possible implementation, the sending unit is further configured to:

receive the SSB and/or the SI from the first cell; and the processing unit is further configured to:

camp on the first cell based on the SSB and/or the SI; or initiate random access in the first cell based on the SSB and/or the SI; or perform synchronization in the first cell based on the SSB and/or the SI.

In another possible implementation, that the time domain resources occupied by the reference signal are fewer than the total time domain resources occupied by the SSB of the first cell and the SI of the first cell includes:

A quantity of time domain symbols occupied by the reference signal is less than a total quantity of time domain symbols occupied by the SSB of the first cell and the SI of the first cell.

A twelfth aspect of embodiments provides a communication apparatus. The communication apparatus includes:

a receiving unit, configured to receive a reference signal from an access network device, where time domain resources occupied by the reference signal are fewer than total time domain resources occupied by an SSB of a first cell and SI of the first cell; and a sending unit, configured to send a wake-up signal to the access network device, where the wake-up signal is used to wake up the access network device to send the SSB and/or the SI in the first cell.

In a possible implementation, the communication apparatus further includes a processing unit, where the processing unit is configured to determine the first cell based on the reference signal.

In another possible implementation, the reference signal includes at least one of the following information:

an identifier of the first cell, a number of a system frame in which the reference signal is located, a half-frame indication, an index of the reference signal, a beam index of the reference signal, a time-frequency resource for sending the wake-up signal, a feature parameter of a pseudo-random sequence used by the wake-up signal, or a condition for sending the wake-up signal by the communication apparatus.

In another possible implementation, the sending unit is configured to:

send the wake-up signal to the access network device when a first condition is met, where the first condition includes at least one of the following: the communication apparatus determines to camp on or access the first cell; received power of the reference signal is greater than a preset threshold; or the reference signal is a reference signal with maximum received power among reference signals that are received by the communication apparatus and that respectively correspond to one or more cells.

In another possible implementation, the reference signal includes the time-frequency resource for sending the wake-up signal and the feature parameter of the pseudo-random sequence used by the wake-up signal, and the processing unit is further configured to:

generate the wake-up signal based on the feature parameter of the pseudo-random sequence used by the wake-up signal; and the sending unit is further configured to:

send the wake-up signal to the access network device on the time-frequency resource for sending.

In another possible implementation, the wake-up signal includes a preamble for waking up the first cell to send the SSB and/or the SI.

In another possible implementation, the receiving unit is further configured to:

receive the SSB and/or the SI from the access network device; and the processing unit is further configured to:

camp on the first cell based on the SSB and/or the SI; or initiate random access in the first cell based on the SSB and/or the SI; or perform synchronization in the first cell based on the SSB and/or the SI.

A thirteenth aspect of embodiments provides a communication apparatus. The communication apparatus includes:

a sending unit, configured to send a reference signal to a terminal device, where the communication apparatus is an access network device to which a first cell belongs, and time domain resources occupied by the reference signal are fewer than total time domain resources occupied by an SSB of the first cell and SI of the first cell; and a receiving unit, configured to receive a wake-up signal from the terminal device, where the wake-up signal is used to wake up the communication apparatus to send the SSB and/or the SI in the first cell.

In a possible implementation, the reference signal includes at least one of the following information: an identifier of the first cell, a number of a system frame in which the reference signal is located, a half-frame indication, an index of the reference signal, a beam index of the reference signal, a time-frequency resource for sending the wake-up signal, a feature parameter of a pseudo-random sequence used by the wake-up signal, or a condition for sending the wake-up signal by the terminal device.

In another possible implementation, the sending unit is further configured to:

send the SSB and/or the SI to the terminal device.

In another possible implementation, the communication apparatus further includes a processing unit, where the processing unit is configured to: determine, based on first information, whether to enable broadcasting of the SSB and/or the SI in a first cell; and if the processing unit determines to enable broadcasting of the SSB and/or the SI of the first cell, perform the step of sending, by the communication apparatus, the SSB and/or the SI to the terminal device, where the first information includes at least one of the following: load of the first cell, load of a neighboring cell of the first cell, or received power of the reference signal.

In another possible implementation, the reference signal includes the time-frequency resource for sending the wake-up signal and the feature parameter of the pseudo-random sequence used by the wake-up signal, and the receiving unit is further configured to:

receive the wake-up signal from the terminal device on the time-frequency resource for sending; and the processing unit is further configured to:

determine the wake-up signal based on the feature parameter of the pseudo-random sequence used by the wake-up signal.

In another possible implementation, the wake-up signal includes a preamble for waking up the first cell to send the SSB and/or the SI.

In another possible implementation, that the time domain resources occupied by the reference signal are fewer than the total time domain resources occupied by the SSB of the first cell and the SI of the first cell includes:

A quantity of time domain symbols occupied by the reference signal is less than a total quantity of time domain symbols occupied by the SSB of the first cell and the SI of the first cell.

A fourteenth aspect of embodiments provides a communication apparatus. The communication apparatus includes:

a receiving unit, configured to receive a reference signal from a first cell, where time domain resources occupied by the reference signal are fewer than total time domain resources occupied by an SSB of the first cell and SI of the first cell; and a sending unit, configured to send a measurement result to a second cell, where the measurement result is a measurement result obtained by the communication apparatus by measuring the reference signal.

In a possible implementation, the receiving unit is further configured to:

receive configuration information from the second cell, where the configuration information is configuration information of the reference signal; and the sending unit is further configured to:

send the measurement result to the second cell based on the configuration information.

In another possible implementation, the configuration information includes at least one of the following:

a reference signal measurement cycle, a channel number of a reference signal, a received power threshold for reporting a reference signal, or a PRACH time-frequency resource and a preamble for reporting a measurement result.

In another possible implementation, the reference signal includes at least one of the following information:

an identifier of the first cell, a number of a system frame in which the reference signal is located, a half-frame indication, an index of the reference signal, or a beam index of the reference signal.

In another possible implementation, the sending unit is configured to:

send the measurement result to the second cell when a first condition is met, where the first condition includes at least one of the following: received power of a reference signal in the measurement result is greater than a first threshold; or received power of any one of an SSB, a channel state information reference signal, and a demodulation reference signal of the second cell that are broadcast in the second cell is less than a second threshold.

In another possible implementation, the measurement result includes at least one of the following: the identifier of the first cell or the received power of the reference signal.

In another possible implementation, if the first cell enables broadcasting of the SSB of the first cell and/or the SI of the first cell, the receiving unit is further configured to:

receive the SSB and/or the SI from the first cell; and the processing unit is further configured to:

camp on the first cell based on the SSB and/or the SI; or initiate random access in the first cell based on the SSB and/or the SI; or perform synchronization in the first cell based on the SSB and/or the SI.

A fifteenth aspect of embodiments provides a communication apparatus. The communication apparatus includes:

a receiving unit, configured to receive a reference signal from a first access network device, where the first access network device is an access network device corresponding to a first cell, and time domain resources occupied by the reference signal are fewer than total time domain resources occupied by an SSB of the first cell and SI of the first cell; and a sending unit, configured to send a measurement result to a second access network device, where the measurement result is a measurement result obtained by the communication apparatus by measuring the reference signal.

In a possible implementation, the receiving unit is further configured to:

receive configuration information from the second access network device, where the configuration information is configuration information of the reference signal; and the sending unit is configured to:

send the measurement result to the second access network device based on the configuration information.

In another possible implementation, the configuration information includes at least one of the following:

a reference signal measurement cycle, a channel number of a reference signal, a received power threshold for reporting a reference signal, or a PRACH time-frequency resource and a preamble for reporting a measurement result.

In another possible implementation, the reference signal includes at least one of the following information:

an identifier of the first cell, a number of a system frame in which the reference signal is located, a half-frame indication, an index of the reference signal, or a beam index of the reference signal.

In another possible implementation, the sending unit is configured to:

send the measurement result to the second access network device when a first condition is met, where the first condition includes at least one of the following: received power of a reference signal in the measurement result is greater than a first threshold; or received power of any one of a synchronization signal block SSB, a channel state information reference signal, and a demodulation reference signal that correspond to the second cell and that are broadcast by the second access network device in the second cell is less than a second threshold.

In another possible implementation, the measurement result includes at least one of the following: the identifier of the first cell or the received power of the reference signal.

In another possible implementation, if the first access network device enables broadcasting of the SSB of the first cell and/or the SI of the first cell in the first cell, the receiving unit is further configured to:

receive the SSB and/or the SI from the first access network device; and the processing unit is further configured to:

camp on the first cell based on the SSB and the SI; or initiate random access in the first cell based on the SSB and the SI; or perform synchronization in the first cell based on the SSB and the SI.

A sixteenth aspect of embodiments provides a communication apparatus. The communication apparatus includes:

a sending unit, configured to send a reference signal to a terminal device, where the communication apparatus is an access network device to which a first cell belongs, and time domain symbols occupied by the reference signal are fewer than total time domain resources occupied by an SSB of the first cell and SI of the first cell;

a receiving unit, configured to receive indication information from a second access network device, where the indication information indicates the communication apparatus to enable broadcasting of the SSB and/or the SI in the first cell; and a processing unit, configured to broadcast the SSB and/or the SI in the first cell based on the indication information.

In a possible implementation, the reference signal includes at least one of the following information:

an identifier of the first cell, a number of a system frame in which the reference signal is located, a half-frame indication, an index of the reference signal, or a beam index of the reference signal.

A seventeenth aspect of embodiments provides a communication apparatus. The communication apparatus includes:

a receiving unit, configured to receive a measurement result from a terminal device, where the measurement result is a measurement result obtained by the terminal device by measuring a reference signal of a first cell, and time domain symbols occupied by the reference signal are fewer than total time domain resources occupied by an SSB of the first cell and SI of the first cell; and a sending unit, configured to send indication information to a first access network device, where the first access network device is an access network device to which the first cell belongs, and the indication information indicates the first access network device to enable broadcasting of the SSB and/or the SI in the first cell.

In a possible implementation, the sending unit is further configured to:

send configuration information to the terminal device, where the configuration information is configuration information of the reference signal, and the configuration information is used by the terminal device to send the measurement result.

In another possible implementation, the configuration information includes at least one of the following:

a reference signal measurement cycle, a channel number of a reference signal, a received power threshold for reporting a reference signal, or a PRACH time-frequency resource and a preamble for reporting a measurement result.

In another possible implementation, the measurement result includes at least one of the following: the identifier of the first cell or the received power of the reference signal.

In another possible implementation, the reference signal includes at least one of the following information:

an identifier of the first cell, a number of a system frame in which the reference signal is located, a half-frame indication, an index of the reference signal, or a beam index of the reference signal.

In another possible implementation, the processing unit is further configured to:

determine whether to indicate the first access network device to enable broadcasting of the SSB and/or the SI in the first cell; and if the processing unit determines to indicate the first access network device to enable broadcasting of the SSB and/or the SI of the first cell, perform the step of sending, by the communication apparatus, indication information to a first access network device.

An eighteenth aspect of embodiments provides a communication apparatus. The communication apparatus includes:

a receiving unit, configured to: receive a reference signal from a first cell, where the first cell is a cell associated with a second cell, and time domain resources occupied by the reference signal are fewer than total time domain resources occupied by an SSB of the first cell and SI of the first cell; and receive access information from the second cell, where the access information includes access information of the first cell; and a processing unit, configured to determine a candidate access cell, where the candidate access cell is selected from the first cell based on the access information and the reference signal.

In a possible implementation, the first cell is located on a first carrier, the second cell is located on a second carrier, and the first carrier is different from the second carrier.

In another possible implementation, the access information includes at least one of the following:

an identifier of the first cell, an index of the first cell, a channel number of the first cell, a priority of the first cell, an offset of a start time domain location of the reference signal relative to a start time domain location or an end time domain location of an SSB in the second cell, an identifier of a network supported by the first cell, a random access parameter of the first cell, a selection parameter of the first cell, or a reselection parameter of the first cell.

In another possible implementation, the communication apparatus further includes a sending unit, where the sending unit is configured to send a first request to the second cell, where the first request is used to request the second cell to send the access information.

In another possible implementation, the sending unit is configured to:

send the first request to the second cell by using a preamble or an RRC system request message.

In another possible implementation, the sending unit is configured to:

send the first request to the second cell when the communication apparatus detects that the reference signal of the first cell includes a reference signal whose received power is greater than or equal to a threshold.

In another possible implementation, the first cell is a DCC cell, the second cell is a BCC cell, and the first cell is all DCC cells associated with the second cell, or the first cell is some DCC cells associated with the second cell.

In another possible implementation, the receiving unit is further configured to:

receive indication information from the second cell, where the indication information indicates that the second cell is a BCC cell.

In another possible implementation, the processing unit is further configured to:

if the communication apparatus has to-be-sent data, initiate random access to the candidate access cell through a random access resource of the candidate access cell.

In another possible implementation, the access information includes SI corresponding to the first cell.

A nineteenth aspect of embodiments provides a communication apparatus. The communication apparatus includes:

a receiving unit, configured to: receive a reference signal from a first access network device, where the first access network device is an access network device to which a first cell belongs, and time domain resources occupied by the reference signal are fewer than total time domain resources occupied by an SSB of the first cell and SI of the first cell; and receive access information from a second access network device, where the access information includes access information of the first cell, the second access network device is an access network device to which a second cell belongs, and the first cell is a cell associated with the second cell; and a processing unit, configured to determine a candidate access cell, where the candidate access cell is selected from the first cell based on the access information and the reference signal.

In a possible implementation, the first cell is located on a first carrier, the second cell is located on a second carrier, and the first carrier is different from the second carrier.

In another possible implementation, the access information includes at least one of the following:

an identifier of the first cell, an index of the first cell, a channel number of the first cell, a priority of the first cell, an offset of a start time domain location of the reference signal relative to a start time domain location or an end time domain location of an SSB in the second cell, an identifier of a network supported by the first cell, a random access parameter of the first cell, a selection parameter of the first cell, or a reselection parameter of the first cell.

In another possible implementation, the communication apparatus further includes a sending unit, where the sending unit is further configured to:

send a first request to the second access network device, where the first request is used to request the second access network device to send the access information.

In another possible implementation, the sending unit is configured to:

send the first request to the second access network device by using a preamble or an RRC system request message.

In another possible implementation, the sending unit is configured to:

send the first request to the second access network device when the communication apparatus detects that received power of the reference signal of the first cell is greater than or equal to a threshold.

In another possible implementation, the first cell is a DCC cell, the second cell is a BCC cell, and the first cell is all DCC cells associated with the second cell, or the first cell is some BCC cells associated with the second cell.

In another possible implementation, the receiving unit is further configured to:

receive indication information from the second access network device, where the indication information indicates that the second cell is a BCC cell.

In another possible implementation, the processing unit is further configured to:

if the communication apparatus has to-be-sent data, initiate random access to the candidate access cell through a random access resource of the candidate access cell.

In another possible implementation, the access information includes SI of the first cell.

A twentieth aspect of embodiments provides a communication apparatus. The communication apparatus includes:

a sending unit, configured to send access information to a terminal device, where the access information includes access information of a first cell, the first cell is a cell of a first access network device, the first cell is a cell associated with a second cell, the second cell is a cell of the communication apparatus, and time domain resources occupied by a reference signal of the first cell are fewer than total time domain resources occupied by an SSB of the first cell and SI of the first cell.

In a possible implementation, the first cell is located on a first carrier, the second cell is located on a second carrier, and the first carrier is different from the second carrier.

In another possible implementation, the access information includes SI of the first cell.

In another possible implementation, the access information includes at least one of the following:

an identifier of the first cell, an index of the first cell, a channel number of the first cell, a priority of the first cell, an offset between a start time domain location of the reference signal and a start time domain location or an end time domain location of an SSB in the second cell, an identifier of a network supported by the first cell, a random access parameter of the first cell, a selection parameter of the first cell, or a reselection parameter of the first cell.

In another possible implementation, the communication apparatus further includes a receiving unit, where the receiving unit is configured to receive a first request from the terminal device, where the first request is used to request the communication apparatus to send the access information.

In another possible implementation, the receiving unit is configured to:

receive a preamble from the terminal device, where the preamble includes the first request; or receive an RRC system message from the terminal device, where the RRC system message includes the first request.

In another possible implementation, the first cell is a DCC cell, the second cell is a BCC cell, and the first cell is all DCC cells associated with the second cell, or the first cell is some BCC cells associated with the second cell.

In another possible implementation, the sending unit is further configured to:

send indication information to the terminal device, where the indication information indicates that the second cell is a BCC cell.

A twenty-first aspect of embodiments provides a communication apparatus. The communication apparatus includes a processor and a memory. The memory stores a computer program or computer instructions, and the processor is further configured to invoke and run the computer program or the computer instructions stored in the memory, so that the processor implements any one of the implementations of any one of the first aspect to the tenth aspect.

Optionally, the communication apparatus includes a transceiver, and the processor is configured to control the transceiver to perform any one of the implementations of any one of the first aspect to the tenth aspect.

A twenty-second aspect of embodiments provides a computer program product including computer instructions. When the computer program product runs on a computer, the computer is enabled to perform any one of the implementations of the first aspect to the tenth aspect.

A twenty-third aspect of embodiments provides a non-transitory computer-readable storage medium, including computer instructions. When the computer instructions run on a computer, the computer is enabled to perform any one of the implementations of any one of the first aspect to the tenth aspect.

A twenty-fourth aspect of embodiments provides a communication apparatus. The communication apparatus includes an entity like a network device, a terminal device, or a chip. The communication apparatus includes a processor, configured to invoke a computer program or computer instructions in a memory, so that the processor performs any one of the implementation of any one of the first aspect to the tenth aspect.

Optionally, the processor is coupled to the memory through an interface.

A twenty-fifth aspect of embodiments provides a communication system. The communication system includes the communication apparatus according to the sixteenth aspect and the communication apparatus according to the seventeenth aspect.

A twenty-sixth aspect of embodiments provides a chip, including a processor, connected to a memory and configured to invoke a program stored in the memory, so that the processor performs any one of the implementations of the first aspect to the tenth aspect.

It can be understood from the foregoing solutions that embodiments have at least the following advantages:

It can be understood from the foregoing solutions that a terminal device receives a reference signal from a first cell, where time domain resources occupied by the reference signal are fewer than total time domain resources occupied by an SSB of the first cell and SI of the first cell. The terminal device sends a wake-up signal to the first cell, where the wake-up signal is used to wake up the first cell to send the SSB and/or the SI. Therefore, it can be understood that the terminal device can sense the first cell, synchronize with the first cell, and perform radio resource management and measurement based on the reference signal of the first cell. The time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the first cell are reduced. After the terminal device senses the first cell based on the reference signal, the terminal device sends the wake-up signal to the first cell, where the wake-up signal is used to wake up the first cell to send the SSB and/or the SI. In this case, the first cell can enable broadcasting of the SSB and the SI in a timely manner, so that the terminal device quickly accesses the cell. This reduces a delay of accessing the cell by the terminal device, and improves communication performance.

DETAILED DESCRIPTION OF EMBODIMENTS

Figures 1A, 1B:
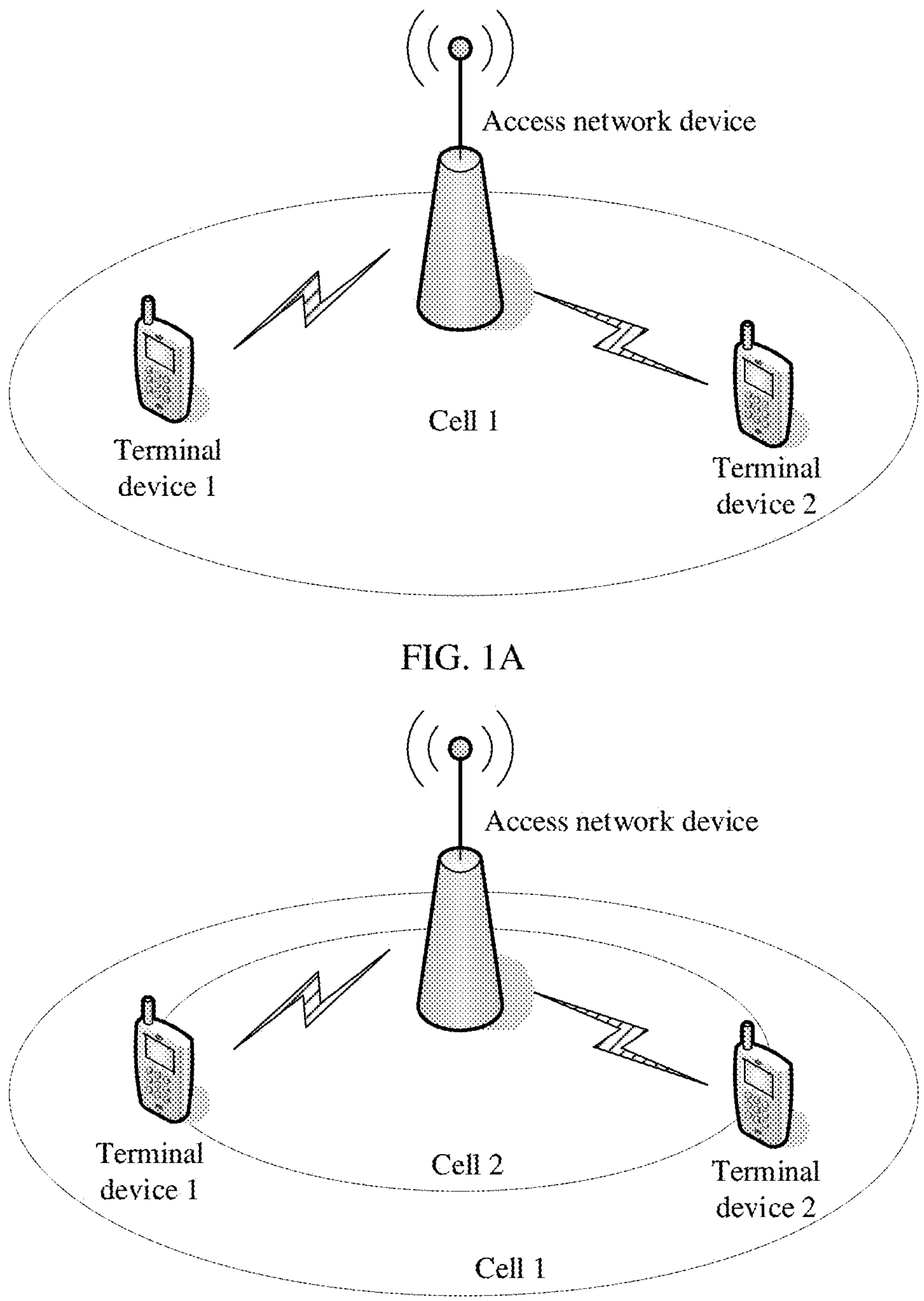
FIG. 1A is a schematic diagram of a communication system according to an embodiment.
FIG. 1B is another schematic diagram of a communication system according to an embodiment.

Embodiments provide a communication method and a communication apparatus to reduce a delay of accessing a cell by a terminal device and improve communication performance.

The following clearly describes solutions in embodiments with reference to accompanying drawings in the embodiments. Clearly, the described embodiments are merely some, but not all, of the embodiments. All other embodiments obtained by a person skilled in the art based on embodiments without creative efforts shall fall within the scope of the embodiments.

Reference to "an embodiment", "some embodiments", or the like indicates that one or more embodiments include a specific feature, structure, or characteristic described with reference to the embodiment. Therefore, statements such as "in an embodiment", "in some embodiments", "in some other embodiments", and "in other embodiments" that appear at different places do not necessarily mean referring to a same embodiment, but mean "one or more but not all of embodiments", unless otherwise specifically emphasized in another manner. The terms "include", "have", and their variants all mean "include, but are not limited to", unless otherwise specifically emphasized in another manner.

In the embodiments, "at least one" means one or more, and "a plurality of" means two or more. "And/or" describes an association relationship between associated items and indicates that three relationships may exist. For example, A and/or B may indicate the following three cases: only A exists, both A and B exist, and only B exists, where A and B may be singular or plural. "At least one of the following items" or a similar expression thereof indicates any combination of the items, including one of the items or any combination of a plurality of the items. For example, at least one of a, b, or c may indicate a, b, c, a and b, a and c, b and c, or a, b, and c, where a, b, and c may be singular or plural.

The following describes terms in the embodiments.

1. Neighboring cell: When there is no other cell between two cells, the two cells are adjacent cells. One of the cells may be referred to as a neighboring cell of the other cell. The neighboring cell may be briefly referred to as a neighboring cell.
2. Symbol: an orthogonal frequency division multiplexing (OFDM) symbol or a single-carrier frequency-division multiple access (SC-FDMA) symbol.

In embodiments, a terminal device may also be referred to as user equipment (UE), a mobile station (MS), a mobile terminal, a station (STA), or the like, and is a device that provides voice and/or data connectivity for a user. For example, the terminal device may include a handheld device or a vehicle-mounted device that has a wireless connection function.

The terminal device may communicate with one or more core networks through a radio access network (RAN). Currently, the terminal device may be a mobile phone (or referred to as a "cellular" phone), a computer with a mobile terminal, a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation security (transportation safety), a wireless terminal in a smart city, a wireless terminal in a smart home, or the like. The terminal device may alternatively be a portable, pocket-sized, handheld, computer built-in, or vehicle-mounted mobile apparatus, a terminal device in a 5G communication network, a terminal device in a future evolved network, or the like.

In embodiments, an access network device is a device that provides a wireless communication function for the terminal device, and may also be referred to as an access device, a (R)AN device, a network device, or the like. The access network device includes, but is not limited to, a next generation NodeB (gNB) in a 5G communication system, an evolved NodeB (eNB) in an LTE system, a radio network controller (RNC), a NodeB (NB), a base station controller (BSC), a base transceiver station (BTS), a home NodeB (home evolved NodeB or HNB), a baseband unit (BBU), a transmission and reception point (TRP), a transmission point (TP), a pico base station device, a mobile switching center, a network device in a future network, or the like. A specific type of a radio access network device is not limited. In systems using different radio access technologies, devices with a function of a radio access network device may have different names.

FIG. 1A is a schematic diagram of a communication system according to an embodiment. As shown in FIG. 1A, the communication system includes an access network device and terminal devices. A terminal device 1 and a terminal device 2 are located in a cell 1 corresponding to the access network device. In the embodiments, the access network device may broadcast, in the cell 1, a reference signal in the cell 1. Time domain resources occupied by the reference signal are fewer than total time domain resources occupied by an SSB corresponding to the cell 1 and SI corresponding to the cell 1. The access network device is in a low-power simplified broadcast mode, to reduce power consumption overheads of the access network device. The terminal device 1 and the terminal device 2 may sense the cell 1 based on the reference signal in the cell 1. This is described in detail in the following embodiments shown in FIG. 2A and FIG. 4A.

It should be noted that FIG. 1A is merely an example. In actual application, the communication system includes at least one access network device and at least one terminal device. A cell of the access network device includes at least one cell.

FIG. 1B is another schematic diagram of a communication system according to an embodiment. As shown in FIG. 1B, the communication system includes an access network device and terminal devices. A cell 1 and a cell 2 are two cells of the access network device. The cell 2 is a cell associated with the cell 1. For example, the cell 1 is located on a carrier 1, the cell 2 is located on a carrier 2, and the carrier 1 is different from the carrier 2.

For example, the cell 1 may be located on a low-frequency carrier, and the cell 2 may be located on a high-frequency carrier. From a perspective of a signal coverage area, a signal coverage area of the cell 1 overlaps a signal coverage area of the cell 2. It can be understood from FIG. 1B that the cell 1 and the cell 2 are two cells of one access network device, and may be referred to as co-site deployed cells.

The access network device may broadcast, in the cell 1, an SSB in the cell 1 and SI in the cell 1. Herein, the cell 1 is referred to as being in a normal broadcast mode. The access network device broadcasts, in the cell 2, a reference signal in the cell 2. Time domain resources occupied by the reference signal are fewer than total time domain resources occupied by an SSB in the cell 2 and SI in the cell 2. That is, the cell 2 is in a low-power simplified broadcast mode, to reduce power consumption overheads of the access network device. In addition, the terminal device 1 and the terminal device 2 may sense the cell 2 based on the reference signal in the cell 2. This is described in detail in the following embodiments shown in FIG. 7A, FIG. 8, and FIG. 10.

It should be noted that FIG. 1B is merely an example. In actual application, the communication system includes at least one access network device and at least one terminal device. A cell of the access network device includes at least one cell 1 and at least one cell 2.

Figure 1C:
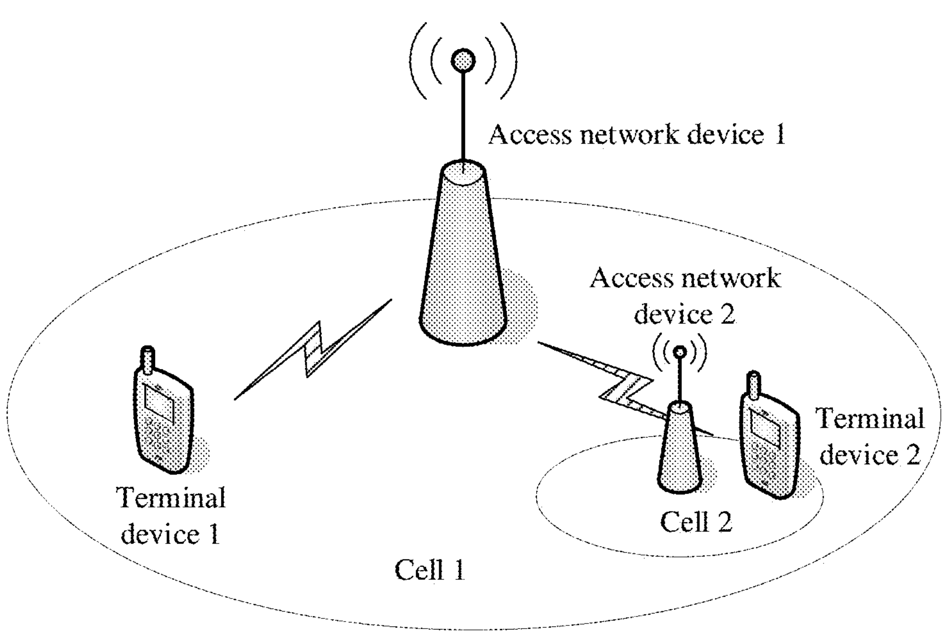
FIG. 1C is another schematic diagram of a communication system according to an embodiment.

FIG. 1C is another schematic diagram of a communication system according to an embodiment. As shown in FIG. 1C, the communication system includes an access network device and terminal devices. A cell 1 is a cell of an access network device 1, and a cell 2 is a cell of an access network device 2. The cell 2 is a cell associated with the cell 1. For example, the cell 1 is located on a carrier 1, the cell 2 is located on a carrier 2, and the carrier 1 is different from the carrier 2.

For example, the cell 1 may be located on a low-frequency carrier, and the cell 2 may be located on a high-frequency carrier. From a perspective of a signal coverage area, a signal coverage area of the cell 1 overlaps a signal coverage area of the cell 2. It can be understood from FIG. 1C that the cell 1 and the cell 2 are cells of two different access network devices, and may be referred to as non-co-site deployed cells.

The access network device 1 may broadcast, in the cell 1, an SSB in the cell 1 and SI in the cell 1. That is, the cell 1 is in a normal broadcast mode. The access network device 2 may broadcast, in the cell 2, a reference signal in the cell 2. Time domain resources occupied by the reference signal are fewer than total time domain resources occupied by an SSB in the cell 2 and SI in the cell 2. That is, the cell 2 is in a low-power simplified broadcast mode, to reduce power consumption overheads of the access network device 2. In addition, a terminal device 1 and a terminal device 2 may sense the cell 2 based on the reference signal in the cell 2. This is described in detail in the following embodiments shown in FIG. 7A, FIG. 8, and FIG. 10.

It should be noted that FIG. 1C is merely an example. In actual application, the communication system includes at least one access network device and at least one terminal device. A cell of each access network device includes at least one cell.

FIG. 1A to FIG. 1C show several possible scenarios to which an embodiments are applicable. This embodiments are still applicable to other scenarios, and the following scenarios do not constitute a limitation.

The following describes solutions with reference to specific embodiments.

Figure 2A:
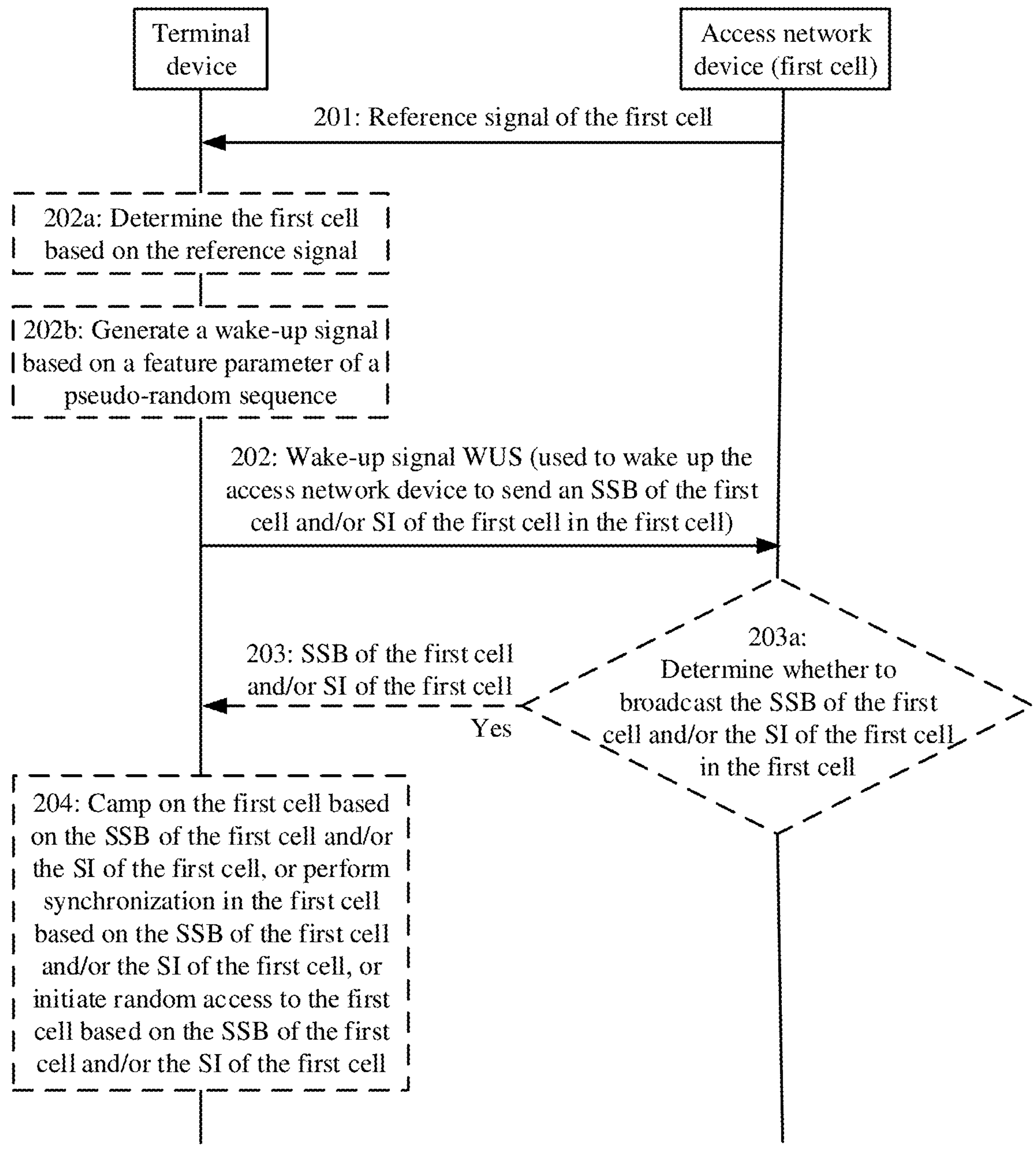
FIG. 2A is a schematic diagram of an embodiment of a communication method according to an embodiment.

FIG. 2A is a schematic diagram of an embodiment of a communication method according to an embodiment. As shown in FIG. 2A, the communication method includes the following steps.

201: An access network device sends a reference signal of a first cell to a terminal device. Correspondingly, the terminal device receives the reference signal of the first cell from the access network device.

The first cell is a cell of the access network device. Time domain resources occupied by the reference signal are fewer than total time domain resources occupied by an SSB of the first cell and SI of the first cell. The reference signal is used by the terminal device to sense the first cell.

Optionally, a quantity of time domain symbols occupied by the reference signal is less than a total quantity of time domain symbols occupied by the SSB of the first cell and the SI of the first cell.

The access network device does not broadcast the SSB and/or the SI in the first cell, but broadcasts the reference signal of the first cell. Herein, the first cell is referred to as being in a low-power simplified broadcast mode.

Figure 2B:
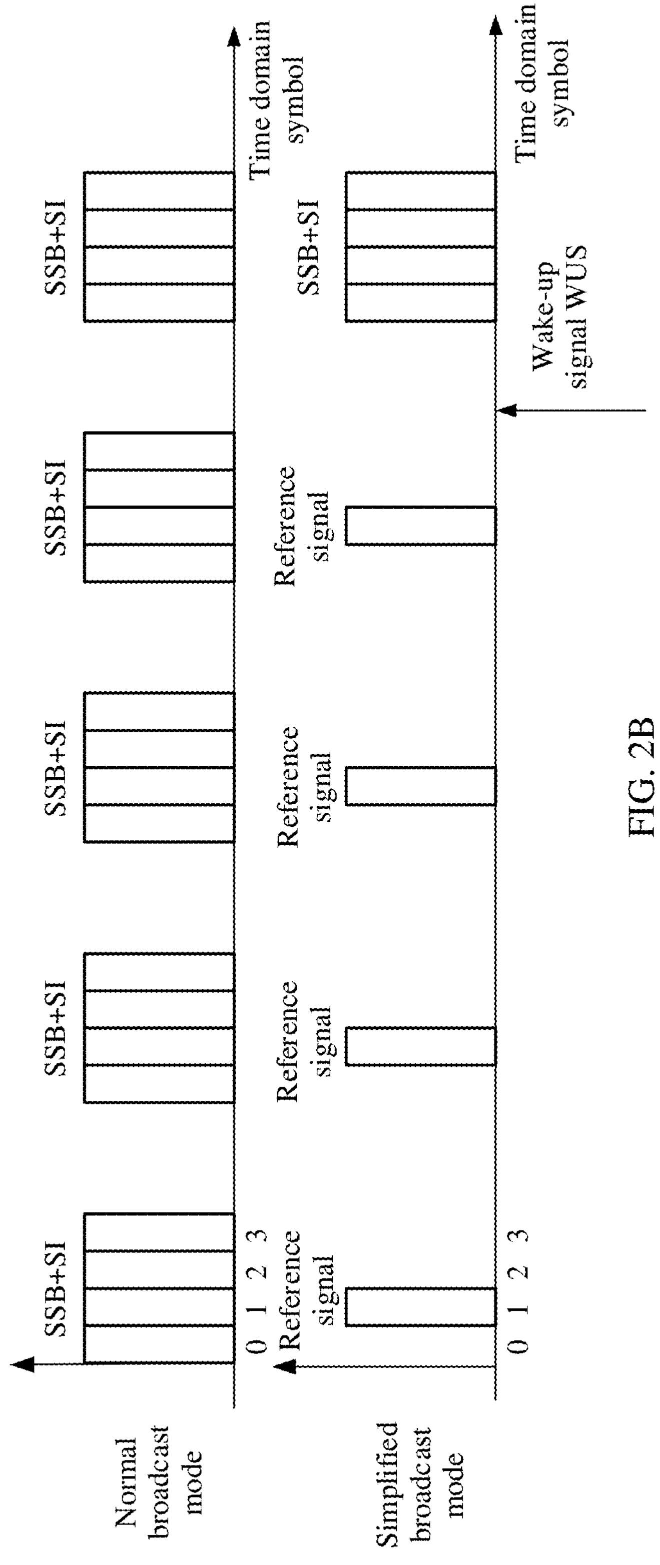
FIG. 2B is a schematic diagram of broadcasting a reference signal according to an embodiment.

For example, as shown in FIG. 2B, a mode in which the access network device broadcasts the SSB and/or the SI in the first cell is referred to as a normal broadcast mode, and a mode in which the access network device broadcasts the reference signal of the first cell in the first cell is referred to as the simplified broadcast mode. It can be understood from FIG. 2B that the quantity of time domain symbols occupied by the SSB of the first cell and the SI of the first cell is 4, and the quantity of time domain symbols occupied by the reference signal is 1. Therefore, it can be understood that the access network device reduces power consumption of the access network device through symbol-level shutdown. Compared with a case in the normal broadcast mode, power consumption of the access network device can be reduced in the simplified broadcast mode. In addition, the terminal device may sense the first cell based on the reference signal of the first cell, so that the terminal device can quickly access the first cell.

In some implementations, the reference signal may be referred to as a discovery reference signal (DRS). The DRS is merely an example, and a name of the reference signal is not limited.

In some implementations, the reference signal may be any one of the following signals: a primary synchronization signal (PSS) of the first cell, a secondary synchronization signal (SSS) of the first cell, a synchronization signal block (SSB) of the first cell, or a newly designed signal.

In an implementation in which the reference signal is a newly designed signal, optionally, the reference signal includes at least one of the following information:

an identifier of the first cell, a number of a system frame in which the reference signal is located, a half-frame indication, an index of the reference signal, a beam index of the reference signal, a time-frequency resource for sending a wake-up signal, a feature parameter of a pseudo-random sequence used by a wake-up signal, or a condition for sending a wake-up signal by the terminal device.

The following describes the at least one piece of information included in the reference signal.

1. Identifier of the first cell For example, the identifier of the first cell may be a physical cell identifier (physical cell identifier, PCI) of the first cell, or a cell identity (cell identity) of the first cell.

For example, the terminal device may determine, based on the identifier of the first cell, a cell corresponding to the reference signal received by the terminal device.

2. The number of the system frame in which the reference signal is located is a frame number of a system frame used by the access network device to send the reference signal, such as a frame number of a system frame carrying the reference signal.
3. The half-frame indication indicates whether the reference signal is located in a first half-frame or a second half-frame of the system frame. The half-frame indication indicates whether the reference signal is carried in the first half-frame or the second half-frame of the system frame, so that the terminal device parses out the reference signal from the system frame.
4. The index of the reference signal indicates a number of the reference signal sent by the access network device.

For example, the access network device may send reference signals on different beams. The access network device sends a reference signal numbered 1 on a beam A, and sends a reference signal numbered 2 on a beam B. In this case, the terminal device measures power of a reference signal, and reports received power of the reference signal to the access network device. When reporting the received power of the reference signal, the terminal device may indicate a number of the measured reference signal to the access network device. In this way, the access network device can determine a beam on which the terminal device measures the reference signal.

5. The beam index of the reference signal indicates a number of a beam used by the access network device to send the reference signal.

For example, the terminal device measures power of a reference signal, and reports the power of the reference signal to the access network device. When reporting the power of the reference signal, the terminal device may indicate, to the access network device, a beam on which the measured reference signal is measured. In this way, the access network device can determine a beam on which the terminal device measures the reference signal.

6. Time-frequency resource for sending the wake-up signal

The time-frequency resource for sending the wake-up signal may be indicated in a plurality of manners. The following describes several possible implementations.

a. The time-frequency resource for sending the wake-up signal includes a time-frequency location for sending the wake-up signal.

In this case, in the following step 202, the terminal device may determine a time-frequency location for sending the wake-up signal.

b. The time-frequency resource for sending the wake-up signal is indicated by an index value.

The time-frequency resource for sending the wake-up signal is a time-frequency resource corresponding to a first index value.

For example, a value range of the first index value is 1 to 64. For example, when the first index value is 1, a corresponding time-frequency resource is a second time domain symbol to a fourth time domain symbol after a time domain symbol occupied by the reference signal in time domain, and a resource block same as a resource block occupied by the reference signal in frequency domain; or when the first index value is 2, a corresponding time-frequency resource is a third time domain symbol to a fifth time domain symbol after a time domain symbol occupied by the reference signal in time domain. Time domain resources corresponding to other values of the first index value are similar, and examples are not described herein one by one.

It should be noted that the time-frequency resource corresponding to the first index value may be specified in a communication standard protocol, predefined, or configured. This is not limited.

7. Feature parameter of the pseudo-random sequence used by the wake-up signal

The feature parameter of the pseudo-random sequence used by the wake-up signal may be indicated in a plurality of manners. The following describes several possible implementations.

a. The feature parameter of the pseudo-random sequence used by the wake-up signal includes the feature parameter of the pseudo-random sequence.

For example, the feature parameter includes a root sequence index of the pseudo-random sequence. The root sequence index is used by the terminal device to generate the wake-up signal.

b. The feature parameter of the pseudo-random sequence used by the wake-up signal is indicated by a second index value.

Each second index value corresponds to a feature parameter.

It should be noted that the feature parameter corresponding to the second index value may be specified in a communication standard protocol, predefined, or configured. This is not limited.

8. Condition for sending the wake-up signal by the terminal device

Optionally, the condition for sending the wake-up signal by the terminal device includes: The terminal device detects that received power of the reference signal is greater than a first threshold. The first threshold may be configured by the access network device for the terminal device or preset. This is not limited.

The terminal device sends the wake-up signal to the access network device when the terminal device detects that the received power of the reference signal is greater than the first threshold. The terminal device can receive a signal with high strength from the first cell. Therefore, if the terminal device subsequently accesses the first cell, the first cell can provide high communication quality for the terminal device. Therefore, in the foregoing case, the solution in which the terminal device wakes up the access network device to broadcast the SSB/or the SI in the first cell is more practical.

It should be noted that, optionally, the time-frequency resource for sending the wake-up signal and the feature parameter of the pseudo-random sequence used by the wake-up signal may also be specified in a communication standard protocol or predefined. For example, the access network device may not broadcast the time-frequency resource for sending the wake-up signal or the feature parameter of the pseudo-random sequence used by the wake-up signal.

For example, the wake-up signal is a preamble. Both a time-frequency resource for sending the preamble and a pseudo-random sequence used by the preamble are defined in a communication protocol or predefined. The terminal device may wake up, by using a specific preamble, the access network device to broadcast the SSB and/or the SI in the first cell.

In step 201, the reference signal may be generated based on the pseudo-random sequence. For example, the pseudo-random sequence may be an m sequence, a Gold sequence, or a ZC sequence. This is not limited.

The foregoing describes the at least one piece of information included in the reference signal. The access network device may use the pseudo-random sequence to represent the foregoing information. For example, the access network device may configure, based on the at least one piece of information, an initial value or a shift value for generating a pseudo-random sequence, and then generate a corresponding pseudo-random sequence. Then the access network device generates the reference signal based on the pseudo-random sequence.

Figure 2C:
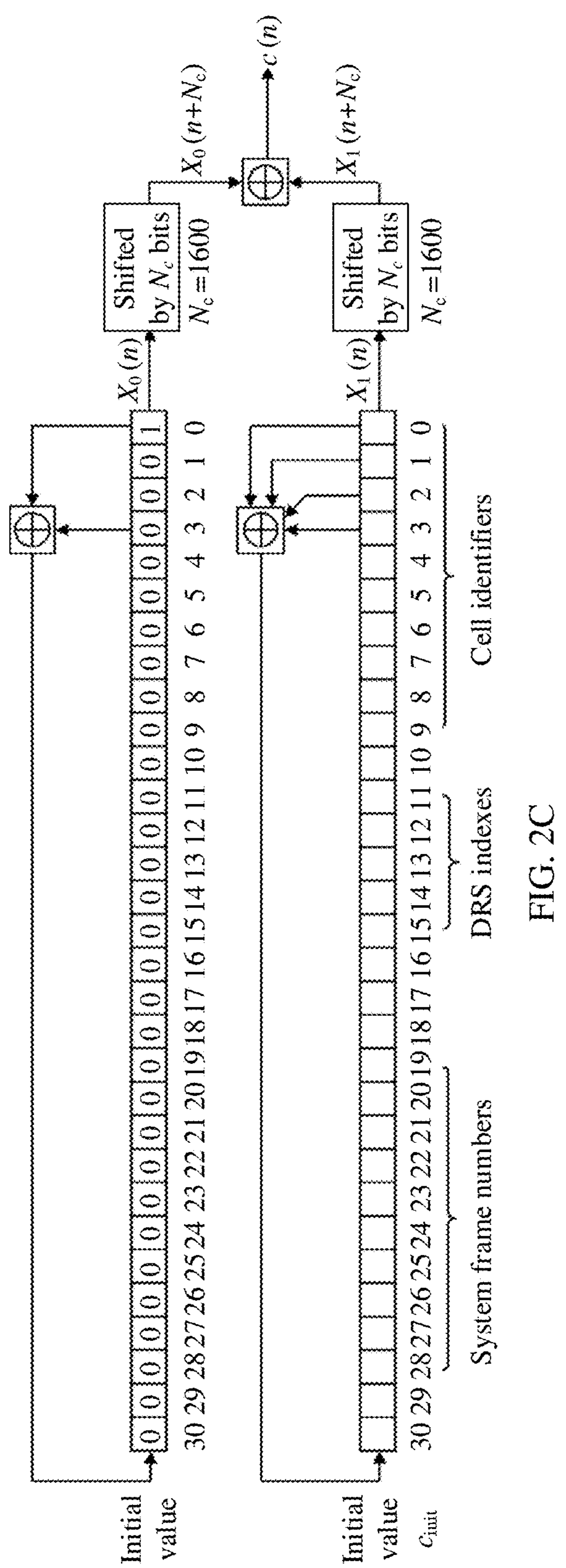
FIG. 2C is a schematic diagram of a process of generating a pseudo-random sequence used to generate a reference signal according to an embodiment.

For example, the pseudo-random sequence used to generate the reference signal is a 127-bit Gold sequence. The Gold sequence is generated by performing modulo 2 addition on two m sequences. A specific generation process is shown in FIG. 2C. c(n) is the pseudo-random sequence for generating the reference signal. An initial value of a first m sequence is 0000000000000000000000000000001. A 0th bit to a 9th bit of an initial value of a second m sequence represent the identifier of the first cell, an 11th bit to a 15th bit represent the index of the reference signal, a 19th bit to a 28th bit represent the number of the system frame, and remaining bits are not limited. The access network device obtains the pseudo-random sequence c(n) through the generation process shown in FIG. 2C. The access network device performs Fourier transform or inverse Fourier transform on c(n) to generate the reference signal of the first cell.

In this case, it can be understood that the reference signal includes the identifier of the first cell, the index of the reference signal, and the number of the system frame. After receiving the reference signal, the terminal device may derive the identifier of the first cell, the index of the reference signal, and the number of the system frame.

Optionally, the reference signal includes at least one sub-signal.

Total time domain resources occupied by the at least one sub-signal are fewer than the total time domain resources occupied by the SSB of the first cell and the SI of the first cell. Each sub-signal may be generated by using a pseudo-random sequence. For related descriptions of the pseudo-random sequence, refer to the foregoing related descriptions.

In a possible implementation, a quantity of time domain symbols occupied by the at least one sub-signal is less than the total quantity of time domain symbols occupied by the SSB of the first cell and the SI of the first cell.

For example, the quantity of time domain symbols occupied by the at least one sub-channel is one time domain symbol or three time domain symbols.

Optionally, the at least one sub-signal includes at least one piece of information: the identifier of the first cell, the number of the system frame in which the reference signal is located, the half-frame indication, the index of the reference signal, the beam index of the reference signal, the time-frequency resource for sending the wake-up signal, the feature parameter of the pseudo-random sequence used by the wake-up signal, or the condition for sending the wake-up signal by the terminal device. Each sub-signal includes one or more of the foregoing information.

For example, the reference signal includes three sub-signals: a DRS-a, a DRS-b, and a DRS-c. The DRS-a includes the identifier of the first cell. The DRS-b includes the number of the system frame in which the reference signal is located, and the half-frame indication. The DRS-c includes the time-frequency resource for sending the wake-up signal or the feature parameter of the pseudo-random sequence used by the wake-up signal.

In a possible implementation, in a time-frequency resource occupied by the at least one sub-signal, frequency-domain resources on a same time domain symbol that are occupied by different sub-signals meet a frequency division multiplexing relationship.

Figure 2D:
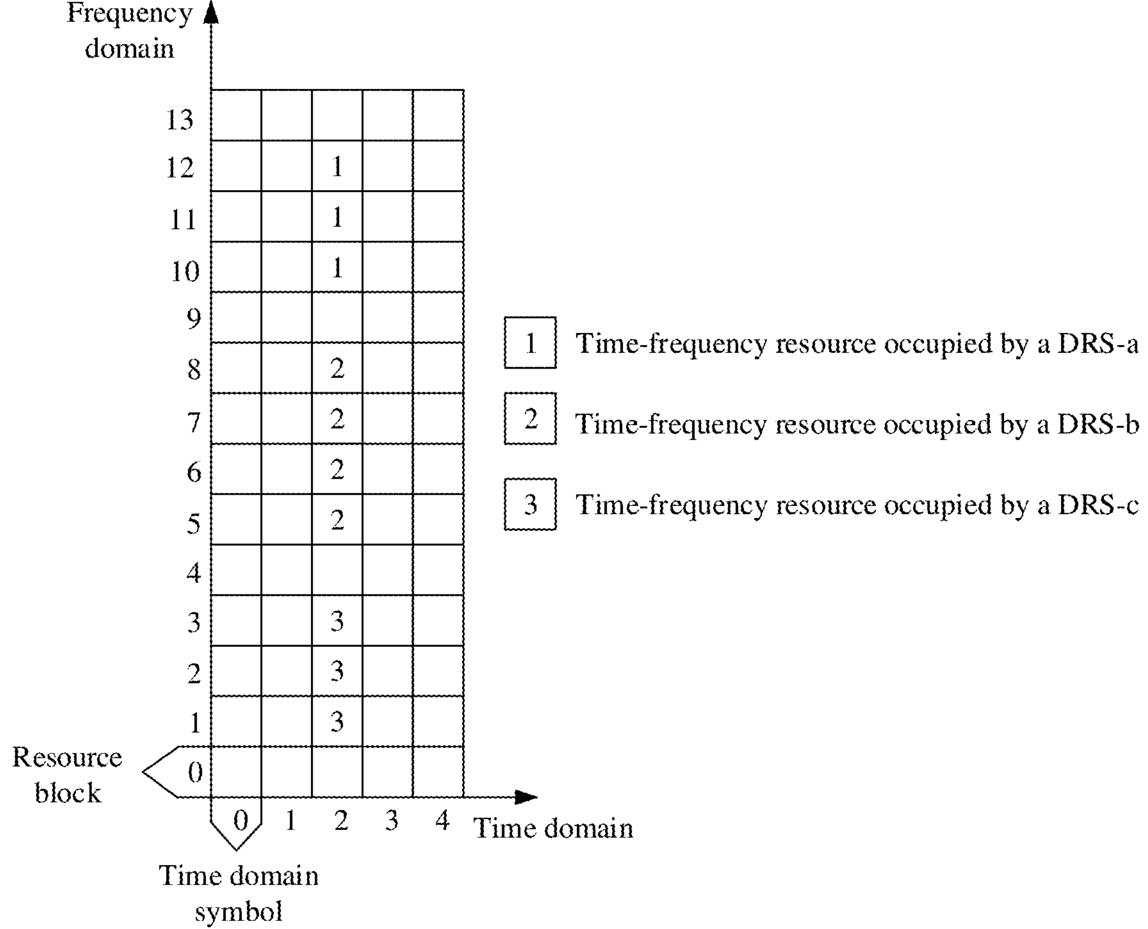
FIG. 2D is a schematic diagram of a time-frequency resource occupied by a reference signal according to an embodiment.

For example, as shown in FIG. 2D, the reference signal includes three sub-signals: a DRS-a, a DRS-b, and a DRS-c. The DRS-a, the DRS-b, and the DRS-c occupy a same time domain symbol: a time domain symbol 2. On the time domain symbol 2, a frequency-domain resource occupied by the DRS-a is a resource block 10 to a resource block 12. On the time domain symbol 2, a frequency-domain resource occupied by the DRS-b is a resource block 5 to a resource 8. On the time domain symbol 2, a frequency-domain resource occupied by the DRS-c is a resource block 1 to a resource block 3. Therefore, it can be understood that the frequency-domain resources on the time domain symbol 2 that are respectively occupied by the DRS-a, the DRS-b, and the DRS-c meet a frequency division multiplexing relationship.

In another possible implementation, in a time-frequency resource occupied by the at least one sub-channel, time domain resources at a same frequency domain location that are occupied by different sub-signals meet a time division multiplexing relationship.

Figure 2E:
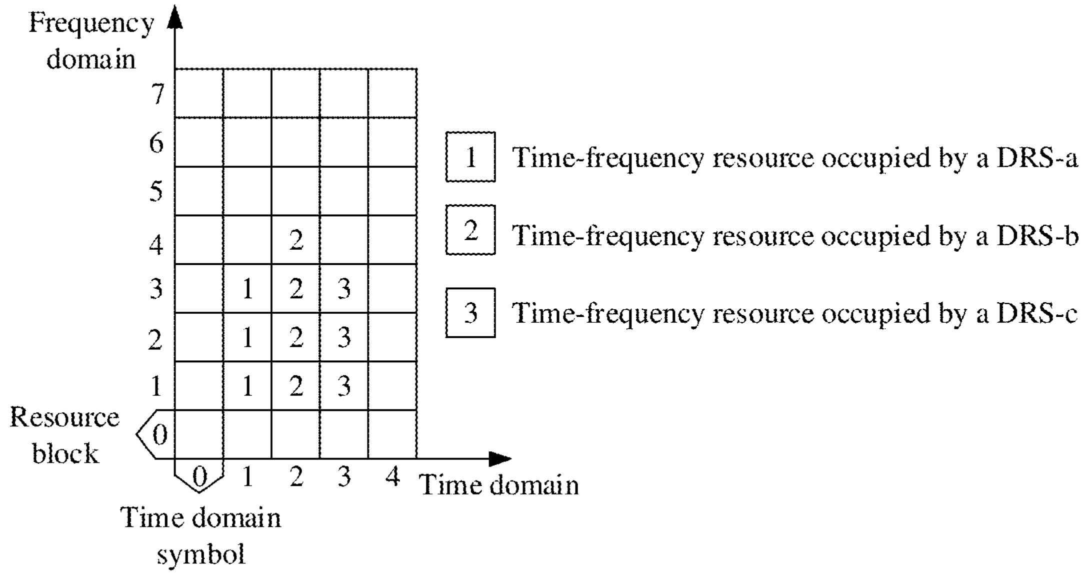
FIG. 2E is another schematic diagram of a time-frequency resource occupied by a reference signal according to an embodiment.

For example, as shown in FIG. 2E, the reference signal includes three sub-signals: a DRS-a, a DRS-b, and a DRS-c. In frequency domain, the DRS-a occupies a resource block 1 to a resource block 3. In frequency domain, the DRS-b occupies the resource block 1 to a resource block 4. In frequency domain, the DRS-c occupies the resource block 1 to the resource block 3. On the resource block 1, the DRS-a, the DRS-b, and the DRS-c occupy a time domain symbol 1, a time domain symbol 2, and a time domain symbol 3 respectively. In this case, it can be understood that time domain resources on the resource block 1 that are respectively occupied by the DRS-a, the DRS-b, and the DRS-c meet a time division multiplexing relationship. On the resource block 2, the DRS-a, the DRS-b, and the DRS-c occupy a time domain symbol 1, a time domain symbol 2, and a time domain symbol 3 respectively. In this case, it can be understood that time domain resources on the resource block 2 that are respectively occupied by the DRS-a, the DRS-b, and the DRS-c meet a time division multiplexing relationship. On the resource block 3, the DRS-a, the DRS-b, and the DRS-c occupy a time domain symbol 1, a time domain symbol 2, and a time domain symbol 3 respectively. In this case, it can be understood that time domain resources on the resource block 3 that are respectively occupied by the DRS-a, the DRS-b, and the DRS-c meet a time division multiplexing relationship.

202: The terminal device sends a wake-up signal to the access network device.

Correspondingly, the access network device receives the wake-up signal from the terminal device.

The wake-up signal is used to wake up the access network device to send the SSB and/or the SI in the first cell.

For example, the terminal device may receive the reference signal of the first cell from the access network device. Then the terminal device sends the wake-up signal to the access network device. The wake-up signal is used to wake up the access network device to broadcast the SSB and/or the SI in the first cell.

In some implementations, the terminal device may determine the first cell after the terminal device receives the reference signal in step 201. Optionally, the embodiment shown in FIG. 2A further includes step 202*a*. Step 202*a* may be performed before step 202.

202*a*: The terminal device determines the first cell based on the reference signal.

In step 202*a*, the terminal device may determine the first cell in a plurality of manners. The following describes several possible implementations. These embodiments are still applicable to other implementations, and the following examples do not constitute a limitation.

Implementation 1: The reference signal includes the identifier of the first cell. Step 202*a* includes: The terminal device determines the first cell based on the identifier of the first cell.

Implementation 2: Step 202*a* includes: The terminal device determines the first cell based on a format of the reference signal.

A reference signal of each cell of the access network device has a corresponding format. Reference signals of different cells have different formats. The terminal device obtains formats of reference signals of different cells. The terminal device determines the first cell based on the format of the reference signal.

Optionally, the format of the reference signal is a pseudo-random sequence used by the reference signal. Different pseudo-random sequences are used for reference signals of different cells.

It should be noted that the terminal device may obtain a format of a reference signal of each cell of the access network device from the access network device, or another device preconfigures, on the terminal device, a format of a reference signal of each cell of the access network device.

In a possible implementation, step 201 includes: The terminal device sends the wake-up signal to the access network device when a first condition is met.

The first condition includes at least one of the following:

The terminal device determines to camp on or access the first cell; received power of the reference signal is greater than a second threshold; or the reference signal is a reference signal with maximum received power among reference signals that are received by the terminal device and that are in one or more cells.

The second threshold may be configured by the access network device for the terminal device, defined in a communication protocol, or preset. This is not limited.

In the foregoing implementation, the terminal device sends the wake-up signal to the access network device when the first condition is met. This can prevent the access network device from frequently receiving a wake-up signal from the terminal device, to improve power saving effect for the access network device. When the reference signal received by the terminal device has high received power, and/or the reference signal is a reference signal with maximum received power among reference signals that are received by the terminal device and that are in one or more cells, the terminal device sends a wake-up signal to an access network device. Therefore, it can be understood that the terminal device can receive a signal with high strength from the first cell. In this way, if the terminal device subsequently accesses the first cell, the access network device can provide higher communication quality for the terminal device.

Optionally, the embodiment shown in FIG. 2A further includes step 202*b*. Step 202*b* may be performed before step 202.

202*b*: The terminal device generates the wake-up signal based on the feature parameter of the pseudo-random sequence.

For example, a ZC sequence is used for the wake-up signal. The feature parameter of the pseudo-random sequence includes a root sequence index u. In this case, the terminal device generates the ZC sequence based on the root sequence index u. The terminal device sequentially places each bit of the ZC sequence on a corresponding subcarrier, and performs Fourier transform to obtain the wake-up signal.

Step 202 includes: The terminal device sends the wake-up signal to the access network device on the time-frequency resource for sending the wake-up signal. Correspondingly, the access network device receives the wake-up signal from the terminal device on the time-frequency resource for sending.

The time-frequency resource for sending the wake-up signal and the feature parameter of the pseudo-random sequence used by the wake-up signal may be sent by the access network device to the terminal device by using the reference signal, or may be specified in a communication standard protocol. This is not limited.

In some implementations, the time-frequency resource for sending the wake-up signal and the feature parameter of the pseudo-random sequence used by the wake-up signal are specified in a communication standard protocol. The wake-up signal includes a preamble for waking up the access network device to send the SSB and/or the SI in the first cell.

In this implementation, both a time-frequency resource for sending the preamble and a pseudo-random sequence used by the preamble are defined in a communication protocol or predefined. The terminal device wakes up, by using a specific preamble, the access network device to broadcast the SSB and/or the SI in the first cell. When the access network device receives the specific preamble, the access network device may determine that the preamble is used to wake up the access network device to broadcast the SSB and/or the SI in the first cell. The terminal device does not need to access the first cell, and the terminal device can quickly wake up the access network device to broadcast the SSB and/or the SI in the first cell. In other words, the terminal device can quickly transfer information to the access network device. In this case, the access network device can broadcast the SSB and/or the SI in the first cell in a timely manner. This helps the terminal device quickly access the first cell, and reduces an access delay.

Optionally, the embodiment shown in FIG. 2A further includes step 203 and step 204. Step 203 and step 204 may be performed after step 202.

203: The access network device sends the SSB of the first cell and/or the SI of the first cell to the terminal device. Correspondingly, the terminal device receives the SSB of the first cell and/or the SI of the first cell from the access network device.

After the access network device receives the wake-up signal, the access network device broadcasts the SSB of the first cell and/or the SI of the first cell in the first cell.

Optionally, the embodiment shown in FIG. 2A further includes step 203*a*. Step 203*a* is performed after step 202 and before step 203.

203*a*: The access network device determines whether to broadcast the SSB of the first cell and/or the SI of the first cell in the first cell. If the access network device determines to broadcast the SSB of the first cell and/or the SI of the first cell in the first cell, the access network device performs step 203. If the access network device determines not to broadcast the SSB of the first cell and/or the SI of the first cell in the first cell, the access network device performs another operation.

In a possible implementation, the access network device determines, based on first information, whether to broadcast the SSB of the first cell and/or the SI of the first cell in the first cell. If the access network device determines to broadcast the SSB of the first cell and/or the SI of the first cell in the first cell, the access network device performs step 203. If the access network device determines not to broadcast the SSB of the first cell and/or the SI of the first cell in the first cell, the access network device performs another operation.

The first information includes at least one of the following: load of the first cell, load of a neighboring cell of the first cell, or received power of the wake-up signal received by the access network device.

For example, if the load of the first cell is low, the load of the neighboring cell is high, and the received power of the wake-up signal is high, the access network device may broadcast the SSB of the first cell and/or the SI of the first cell in the first cell.

For example, if the load of the first cell is high and the load of the neighboring cell is low, the access network device may not enable broadcasting of the SSB of the first cell and/or the SI of the first cell in the first cell.

It should be noted that, optionally, that the access network device performs another operation includes: The access network device remains in an original state. For example, the access network device does not broadcast the SSB of the first cell and/or the SI of the first cell in the first cell.

204: The terminal device camps on the first cell based on the SSB of the first cell and/or the SI of the first cell, or the terminal device performs synchronization in the first cell based on the SSB of the first cell and/or the SI of the first cell, or the terminal device initiates random access to the first cell based on the SSB of the first cell and/or the SI of the first cell.

For example, the SI of the first cell includes a network to which the first cell belongs. The terminal device determines, based on the SI of the first cell, whether the terminal device can camp on the first cell. If the terminal device subscribes to the network to which the first cell belongs, the terminal device can camp on the first cell.

It should be noted that, if the terminal device does not subscribe to the network to which the first cell belongs, the terminal device cannot camp on the first cell.

For example, the SI of the first cell includes a random access time-frequency resource and a preamble. The terminal device sends the preamble to the access network device on the random access time-frequency resource, to request to access the first cell.

In this embodiment, the terminal device receives the reference signal of the first cell from the access network device. The time domain resources occupied by the reference signal are fewer than the total time domain resources occupied by the SSB of the first cell and the SI of the first cell. The terminal device sends the wake-up signal to the access network device, where the wake-up signal is used to wake up the access network device to send the SSB of the first cell and/or the SI of the first cell in the first cell. Therefore, it can be understood that the terminal device senses the first cell based on the reference signal of the first cell. In addition, the time domain resources occupied by the reference signal are fewer than the total time domain resources occupied by the SSB of the first cell and the SI of the first cell. In this way, power consumption of broadcasting the reference signal by the access network device is low. In other words, the first cell is in a low-power simplified broadcast mode. The terminal device senses the first cell based on the reference signal, and the terminal device may send the wake-up signal to the access network device. In this way, the access network device can enable, in a timely manner, broadcasting of the SSB of the first cell and the SI of the first cell in the first cell, so that the terminal device can quickly access the first cell. This reduces a delay of accessing the cell by the terminal device, and improves communication performance.

In the embodiment shown in FIG. 2A, the access network device may be replaced with the first cell. For example, the solution of the embodiments is described by using the first cell as an execution entity. The following describes another description manner of the solution shown in FIG. 2A by using an embodiment shown in FIG. 3.

Figure 3:
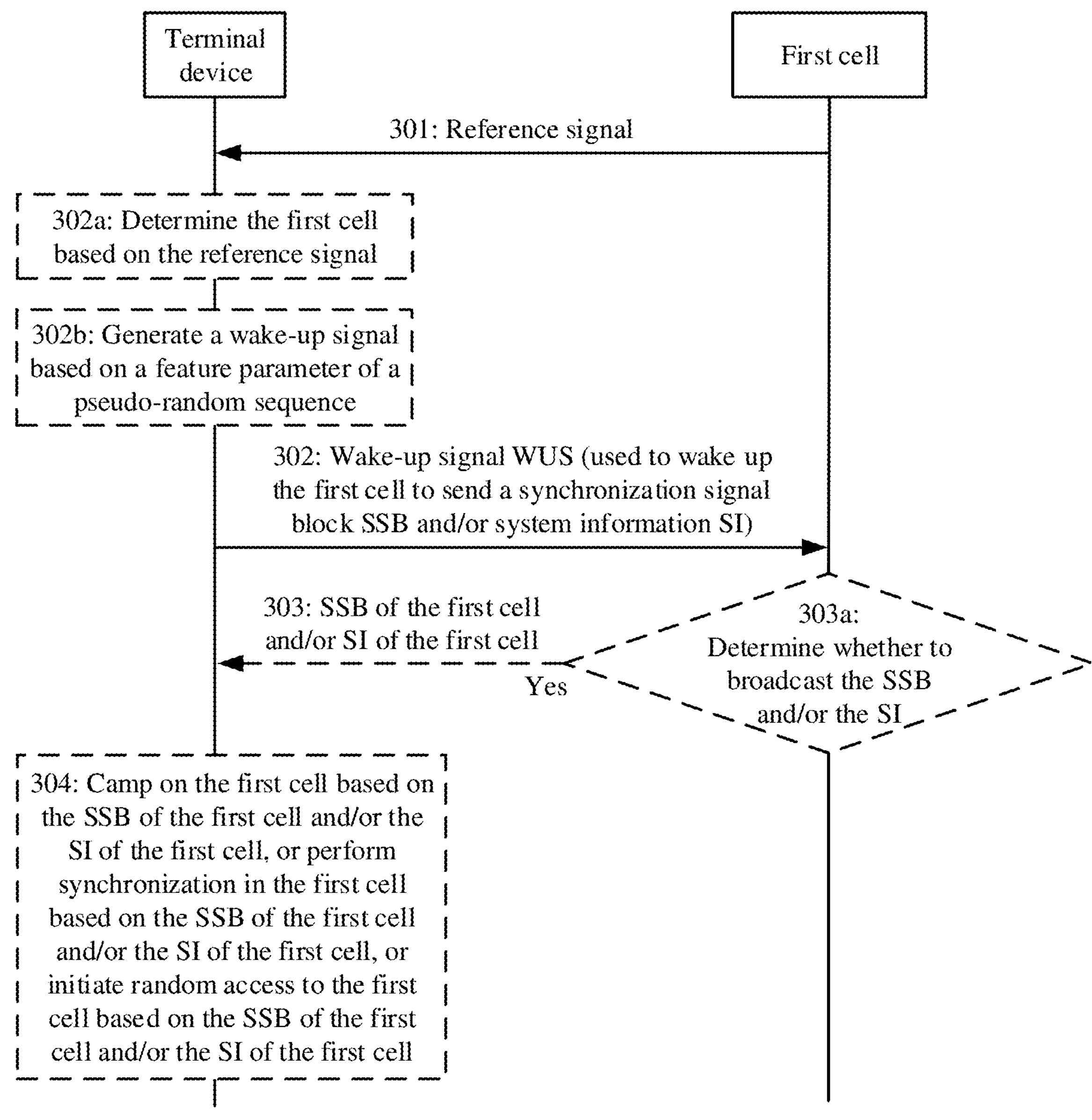
FIG. 3 is a schematic diagram of another embodiment of a communication method according to an embodiment.

FIG. 3 is a schematic diagram of another embodiment of a communication method. As shown in FIG. 3, the communication method includes the following steps.

301: A terminal device receives a reference signal from a first cell.

For related descriptions of the reference signal, refer to related descriptions in the embodiment shown in FIG. 2A. Details are not described herein again.

302: The terminal device sends a wake-up signal to the first cell.

The wake-up signal is used to wake up the first cell to send an SSB and/or SI. For related descriptions of the wake-up signal, refer to related descriptions of step 202 in the embodiment shown in FIG. 2A. Details are not described herein again.

In some implementations, the wake-up signal includes a preamble for waking up the first cell to send the SSB and/or the SI.

For example, the terminal device does not need to access a cell, and the terminal device can quickly wake up, by using a specific preamble, the first cell to broadcast the SSB and/or the SI. When the first cell receives the specific preamble from the terminal device, the first cell may determine that the preamble is used to wake up the first cell to broadcast the SSB and/or the SI. In this case, the first cell can enable broadcasting of the SSB and/or the SI in a timely manner, so that the terminal device quickly accesses the first cell.

For related descriptions of the preamble, refer to related descriptions of step 202 in the embodiment shown in FIG. 2A. Details are not described herein again.

Optionally, the embodiment shown in FIG. 3 further includes step 302*a*. Step 302*a* may be performed before step 302.

302*a*: The terminal device determines the first cell based on the reference signal.

Step 302*a* is similar to step 202*a* shown in FIG. 2A. For details, refer to related descriptions in the embodiment shown in FIG. 2A. The details are not described herein again.

In a possible implementation, step 301 includes: The terminal device sends the wake-up signal to the first cell when a first condition is met. For related descriptions of the first condition, refer to related descriptions in the embodiment shown in FIG. 2A. Details are not described herein again.

Optionally, the embodiment shown in FIG. 3 further includes step 302*b*. Step 302*b* may be performed before step 302.

302*b*: The terminal device generates the wake-up signal based on a feature parameter of a pseudo-random sequence.

Step 302*b* is similar to step 202*b* in the embodiment shown in FIG. 2A. For details, refer to related descriptions of step 202*b* in the embodiment shown in FIG. 2A. The details are not described herein again.

In this case, step 302 includes: The terminal device sends the wake-up signal to the first cell on a time-frequency resource for sending the wake-up signal. Correspondingly, the first cell receives the wake-up signal from the terminal device on the time-frequency resource for sending the wake-up signal.

Optionally, the embodiment shown in FIG. 3 further includes step 303 and step 304. Step 303 and step 304 may be performed after step 302.

303: The first cell sends the SSB and/or the SI to the terminal device.

Correspondingly, the terminal device receives the SSB and/or the SI from the first cell.

Optionally, the embodiment shown in FIG. 3 further includes step 303*a*. Step 303*a* may be performed after step 302 and before step 303.

303*a*: The first cell determines whether to broadcast the SSB and/or the SI. If the first cell determines to broadcast the SSB and/or the SI, the first cell performs step 304. If the first cell determines not to broadcast the SSB and/or the SI, the first cell performs another operation.

Related descriptions of step 303*a* are similar to those of step 203*a* in the embodiment shown in FIG. 2A. For details, refer to the foregoing related descriptions. The details are not described herein again.

304: The terminal device camps on the first cell based on the SSB of the first cell and/or the SI of the first cell, or the terminal device performs synchronization in the first cell based on the SSB of the first cell and/or the SI of the first cell, or the terminal device initiates random access to the first cell based on the SSB of the first cell and/or the SI of the first cell.

Step 304 is similar to step 204 in the embodiment shown in FIG. 2A. For details, refer to related descriptions of step 204 in the embodiment shown in FIG. 2A. The details are not described herein again.

In this embodiment, the terminal device receives the reference signal from the first cell. Time domain resources occupied by the reference signal are fewer than total time domain resources occupied by the SSB of the first cell and the SI of the first cell. The terminal device sends the wake-up signal to the first cell, where the wake-up signal is used to wake up the first cell to send the SSB and/or the SI. Therefore, it can be understood that the terminal device senses the first cell based on the reference signal of the first cell. In addition, the time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. The terminal device senses the first cell based on the reference signal, and the terminal device may send the wake-up signal to the first cell. In this case, the first cell can enable broadcasting of the SSB and the SI in a timely manner, so that the terminal device can quickly access the cell. This reduces a delay of accessing the cell by the terminal device, and improves communication performance.

Figure 4A:
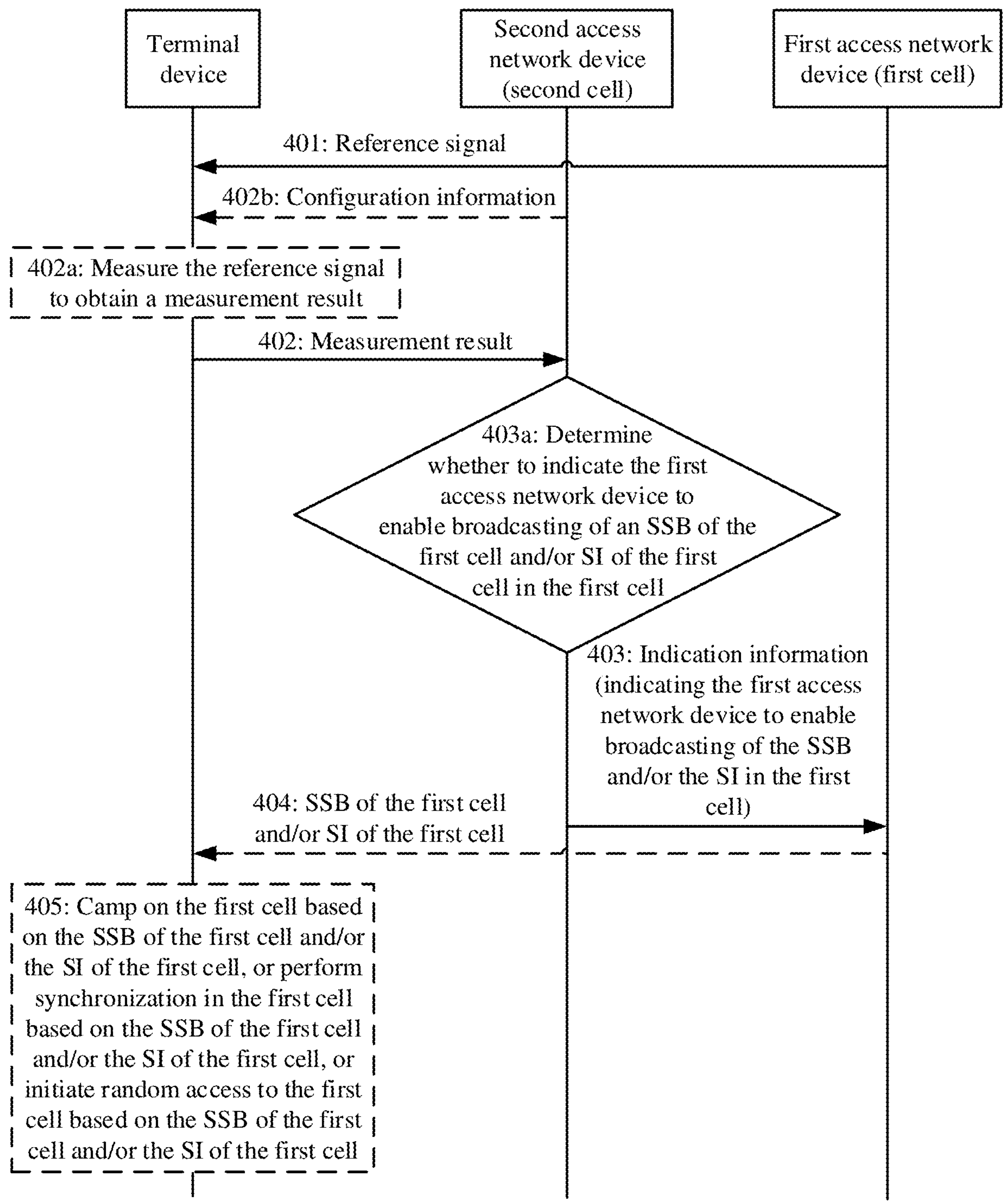
FIG. 4A is a schematic diagram of another embodiment of a communication method according to an embodiment.

FIG. 4A is a schematic diagram of another embodiment of a communication method. As shown in FIG. 4A, the communication method includes the following steps.

401: A first access network device sends a reference signal of a first cell to a terminal device. Correspondingly, the terminal device receives the reference signal of the first cell from the first access network device.

The first cell is a cell of the first access network device. Time domain resources occupied by the reference signal are fewer than total time domain resources occupied by an SSB of the first cell and SI of the first cell. The reference signal is used by the terminal device to sense the first cell.

Figure 4B:
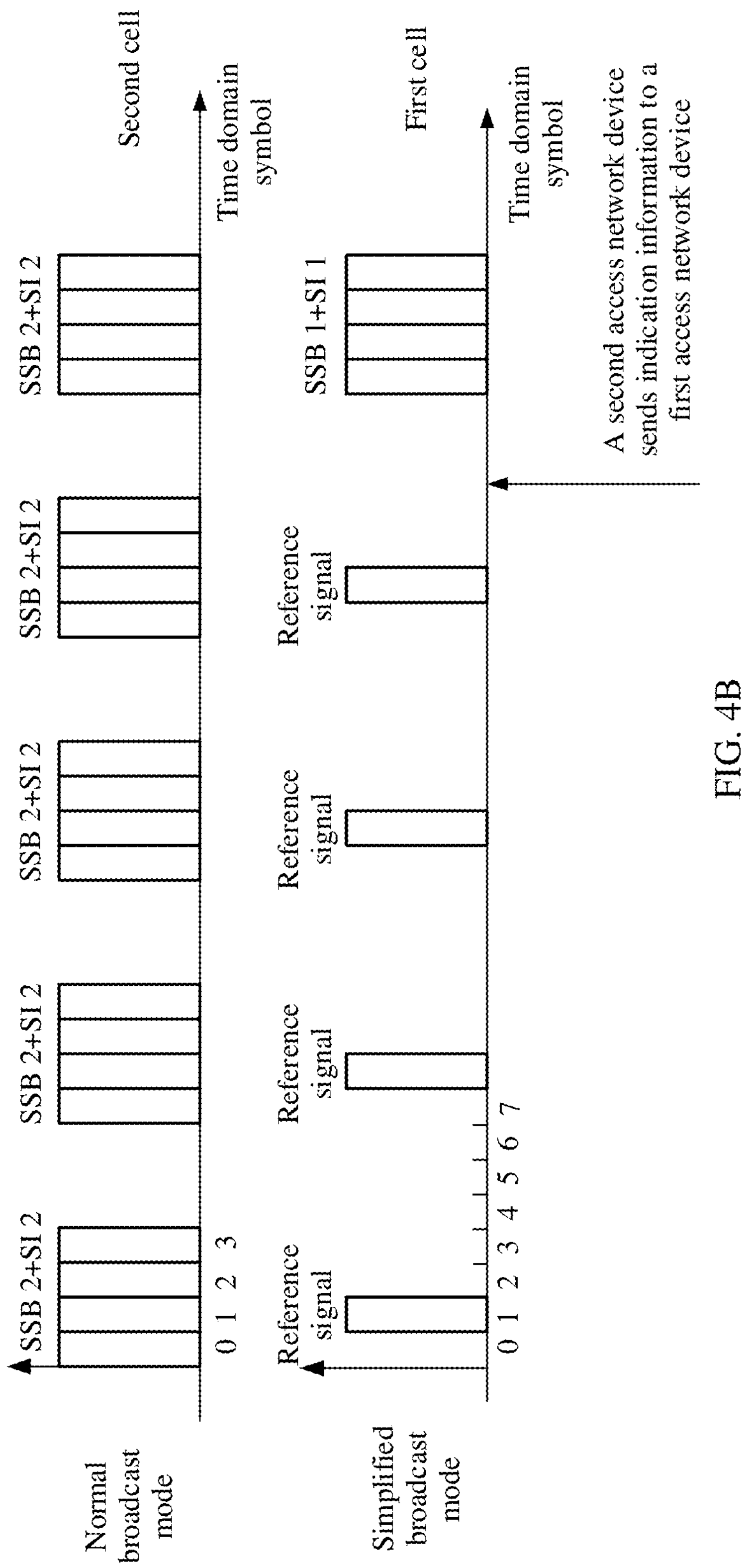
FIG. 4B is another schematic diagram of broadcasting a reference signal according to an embodiment.

For example, as shown in FIG. 4B, the first access network device does not broadcast the SSB and/or the SI in the first cell, but broadcasts the reference signal of the first cell. A mode in which the first access network device broadcasts the reference signal of the first cell in the first cell is referred to as a simplified broadcast mode. It can be understood from FIG. 4B that a quantity of time domain symbols occupied by the reference signal is 1, and a quantity of time domain symbols occupied by an SSB 1 of the first cell and SI 1 of the first cell is 4. Therefore, it can be understood that the first access network device reduces power consumption overheads of the first access network device through symbol-level shutdown. In addition, the terminal device can sense the first cell based on the reference signal of the first cell. This helps the terminal device quickly access the first cell.

Optionally, a quantity of time domain symbols occupied by the reference signal is less than a total quantity of time domain symbols occupied by the SSB of the first cell and the SI of the first cell.

In some implementations, the reference signal may be referred to as a DRS. The DRS is merely an example, and a name of the reference signal is not limited.

In some implementations, the reference signal may be a PSS of the first cell, an SSS of the first cell, an SSB of the first cell, or a newly designed signal.

In an implementation in which the reference signal is a newly designed signal, optionally, the reference signal includes at least one of the following information:

an identifier of the first cell, a number of a system frame in which the reference signal is located, a half-frame indication, an index of the reference signal, or a beam index of the reference signal.

For related descriptions of the identifier of the first cell, the number of the system frame in which the reference signal is located, the half-frame indication, the index of the reference signal, and the beam index of the reference signal, refer to related descriptions in the embodiment shown in FIG. 2A. Details are not described herein again.

For example, in step 401, the reference signal may be generated based on a pseudo-random sequence. For example, the pseudo-random sequence may be an m sequence, a Gold sequence, or a ZC sequence. This is not limited.

For example, the reference signal includes at least one of the foregoing information. The first access network device may use the pseudo-random sequence to represent the foregoing information. For example, the first access network device may configure, based on the foregoing information, an initial value or a shift value for generating a pseudo-random sequence, and then generate a corresponding pseudo-random sequence. For an example of a specific related generation process, refer to related descriptions of FIG. 2C. Details are not described herein again.

Optionally, the reference signal of the first cell includes at least one sub-signal. For the at least one sub-signal, refer to related descriptions in the embodiment shown in FIG. 2A. Details are not described herein again. The at least one sub-signal may be further understood with reference to the examples shown in FIG. 2D and FIG. 2E. Details are not described herein again.

402: The terminal device sends a measurement result to a second access network device. Correspondingly, the second access network device receives the measurement result from the terminal device.

The second access network device is an access network device to which a second cell belongs. The measurement result is a measurement result obtained by the terminal device by measuring the reference signal.

In a possible implementation, the terminal device camps on or accesses the second cell. The second cell is a neighboring cell of the first cell.

Figure 4C:
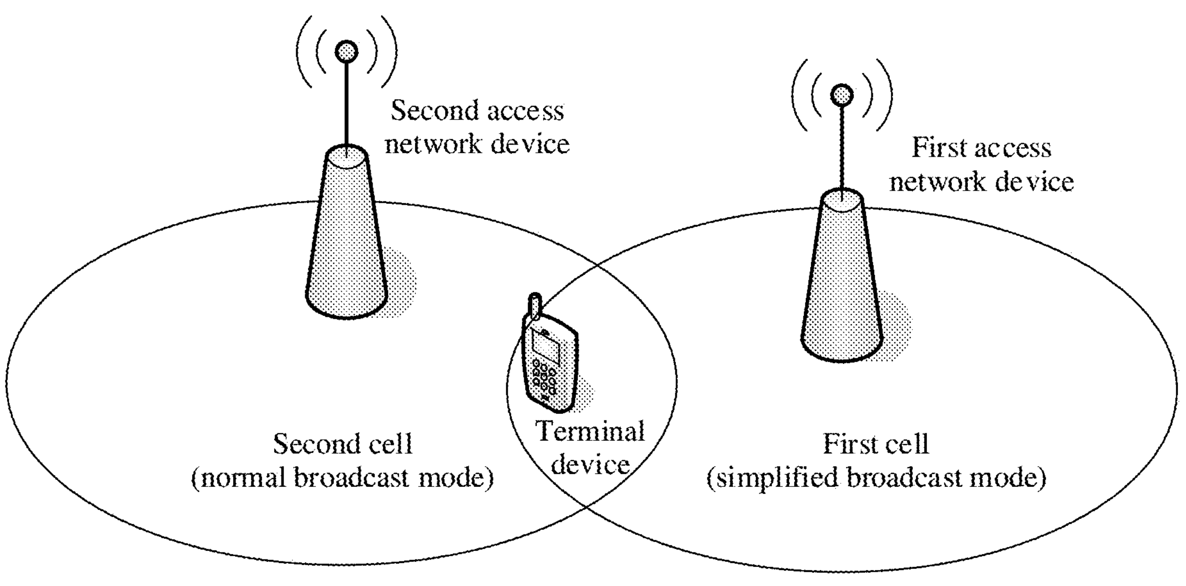
FIG. 4C is a schematic diagram of a scenario of a communication method according to an embodiment.

For example, as shown in FIG. 4B and FIG. 4C, the second access network device broadcasts an SSB 2 of the second cell and/or SI 2 of the second cell in the second cell. A mode in which the second access network device broadcasts the SSB 2 and/or the SI 2 in the second cell may be referred to as a normal broadcast mode. The terminal device camps on the second cell, and the second cell may be a neighboring cell of the first cell.

For example, after the terminal device receives the reference signal of the first cell, the terminal device measures the reference signal to obtain the measurement result. Then the terminal device sends the measurement result to the second access network device. Optionally, the embodiment shown in FIG. 4A further includes step 402*a*. Step 402*a* may be performed before step 402.

402*a*: The terminal device measures the reference signal to obtain the measurement result.

For example, the terminal device may determine the first cell based on the identifier of the first cell that is included in the reference signal. The terminal device measures the received reference signal to obtain the measurement result.

Optionally, the measurement result includes at least one of the following: the identifier of the first cell or received power of the reference signal.

In a possible implementation, step 401 includes: The terminal device sends the measurement result to the second access network device when a first condition is met.

The first condition includes at least one of the following: The received power of the reference signal in the measurement result is greater than or equal to a first threshold; or received power or received quality of a first signal is less than or equal to a second threshold.

The first signal includes any one of the following: an SSB of the second cell, a channel state information reference signal (CSI-RS) of the second cell, or a demodulation reference signal (DMRS) of the second cell.

The first threshold and the second threshold may be preset, specified in a communication protocol, or configured by the access network device for the terminal device. This is not limited.

When the received power of the reference signal is greater than the first threshold, it indicates that signal strength of the reference signal of the first cell that is received by the terminal device is high. If the terminal device accesses the first cell, the first cell may provide higher communication quality for the terminal device. Therefore, the terminal device can send the measurement result to the second access network device. In this way, the second access network device can indicate, based on the measurement result, the first access network device to enable broadcasting of the SSB and/or the SI in the first cell, so that the terminal device can access the first cell.

When the received power of the first signal is low or the received quality of the first signal is poor, it indicates that strength of a signal of the second cell that is received by the terminal device is low. The terminal device may reselect a cell for access. The terminal device may measure the reference signal of the first cell, and send the measurement result to the second access network device. In this way, the second access network device can indicate, based on the measurement result, the first access network device to enable broadcasting of the SSB and/or the SI in the first cell, so that the terminal device can quickly access the first cell.

Optionally, the embodiment shown in FIG. 4A further includes step 402*b*, and step 402*b* may be performed before step 402.

402*b*: The second access network device sends configuration information to the terminal device. Correspondingly, the terminal device receives the configuration information from the second access network device.

The configuration information is configuration information of the reference signal.

Optionally, the configuration information includes at least one of the following: a reference signal measurement cycle, a channel number of a reference signal, a received power threshold for reporting a reference signal, or a PRACH time-frequency resource and a preamble for reporting a measurement result.

The following describes the at least one piece of information included in the configuration information.

1. Reference Signal Measurement Cycle

The measurement cycle may be a time interval at which the terminal device performs reference signal measurement. The measurement cycle is sometimes far greater than a reference signal sending cycle.

For example, the reference signal sending cycle may be 5 ms, and the measurement cycle is 100 s.

2 Channel Number of a Reference Signal

For example, if the first access network device sends a reference signal on a channel 1, a channel number of the reference signal is 1. The terminal device may determine the channel 1 based on the channel number, and listen to a reference signal on the channel 1.

3. Received Power Threshold for Reporting a Reference Signal

The received power threshold for reporting indicates a received power threshold for reporting, by the terminal device, a reference signal corresponding to a measurement result.

For example, the received power threshold for reporting a reference signal is A, the terminal device measures a reference signal to obtain received power of the reference signal, and a value of the received power of the reference signal is B. If B is less than A, the terminal device does not report a measurement result. If B is greater than or equal to A, the terminal device may report a measurement result to the second access network device.

4. PRACH Time-Frequency Resource and Preamble for Reporting a Measurement Result For example, the terminal device may send the preamble to the second access network device on the PRACH time-frequency resource, where the preamble includes the measurement result. Optionally, the terminal device may use a pseudo-random sequence for generating a preamble to represent a measurement result, and then generate a preamble based on the pseudo-random sequence. For example, the terminal device may configure the measurement result as an initial value or a shift value of the pseudo-random sequence to represent the measurement result, and then generate a corresponding pseudo-random sequence.

Optionally, based on step 402*b*, step 402 includes: the terminal device sends the measurement result to the second access network device based on the configuration information.

For example, the configuration information includes a PRACH time-frequency resource and a preamble for reporting a measurement result. The terminal device determines the PRACH time-frequency resource based on the configuration information. The terminal device sends the preamble to the second access network device on the PRACH time-frequency resource, where the preamble includes the measurement result. For a specific implementation in which the preamble includes the measurement result, refer to the foregoing related descriptions. Correspondingly, the second access network device receives the measurement result from the terminal device on the PRACH time-frequency resource.

In a possible implementation, the configuration information includes reference signal measurement configuration information and reference signal reporting configuration information.

For example, the measurement configuration information includes at least one of the following: a reference signal measurement cycle or a channel number of a reference signal; and the reporting configuration information includes at least one of the following: a received power threshold for reporting a reference signal, or a PRACH time-frequency resource and a preamble for reporting a measurement result.

In this case, based on this implementation, optionally, step 402*a* includes: The terminal device measures the reference signal based on the measurement configuration information to obtain the measurement result.

For example, the measurement configuration information includes a reference signal measurement cycle and a channel number of a reference signal. The terminal device determines a channel based on the channel number, and listens to a reference signal of the first cell on the channel. Then the terminal device measures a reference signal based on the measurement cycle to obtain a measurement result.

The second access network device provides the measurement cycle and the channel number for the terminal device. In this way, the terminal device can listen to a signal on a channel corresponding to the channel number. The terminal device does not need to listen to signals on all channels, so that power consumption overheads of the terminal device are reduced. The first access network device periodically sends a reference signal, and the terminal device measures the reference signal based on the measurement cycle. The terminal device may receive a reference signal of the first cell at a corresponding time point based on the measurement cycle, without listening to a reference signal on a channel in real time. This further reduces power consumption overheads of the terminal device.

Based on the foregoing implementation, optionally, step 402 includes: The terminal device sends the measurement result to the second access network device based on the reporting configuration information. For specific related descriptions of a sending process of the terminal device, refer to the foregoing related descriptions. Details are not described herein again.

403: The second access network device sends indication information to the first access network device. Correspondingly, the first access network device receives the indication information from the second access network device.

The indication information indicates the first access network device to enable broadcasting of the SSB and/or the SI in the first cell.

For example, after the second access network device receives the measurement result from the terminal device, the second access network device indicates the first access network device to enable broadcasting of the SSB and/or the SI in the first cell.

Optionally, the embodiment shown in FIG. 4A further includes step 403*a*. Step 403*a* may be performed after step 402 and before step 403.

403*a*: The second access network device determines whether to indicate the first access network device to enable broadcasting of the SSB of the first cell and/or the SI of the first cell in the first cell. If the second access network device determines to indicate the first access network device to enable broadcasting of the SSB of the first cell and/or the SI of the first cell in the first cell, the second access network device performs step 404. If the second access network device determines not to indicate the first access network device to enable broadcasting of the SSB of the first cell and/or the SI of the first cell in the first cell, the second access network device performs another operation.

In a possible implementation, the second access network device determines, based on second information, whether to indicate the first access network device to enable broadcasting of the SSB of the first cell and/or the SI of the first cell. If the second access network device determines to indicate the first access network device to enable broadcasting of the SSB of the first cell and/or the SI of the first cell, the second access network device performs step 404. If the second access network device determines not to indicate the first access network device to enable broadcasting of the SSB of the first cell and/or the SI of the first cell, the second access network device performs another operation.

The second information includes at least one of the following: load of the first cell, load of the second cell, or the received power of the reference signal in the measurement result.

In a possible implementation, the load of the first cell may be a quantity of wake-up signals received by the first cell within a period of time.

For example, if the load of the first cell is low, the load of the second cell is high, and the received power of the reference signal is high, the second access network device may indicate the first access network device to enable broadcasting of the SSB and/or the SI in the first cell.

For example, if the load of the first cell is high, the load of the second cell is low, and the received power of the reference signal is low, the second access network device may not indicate the first access network device to enable broadcasting of the SSB and/or the SI in the first cell.

It should be noted that, optionally, that the second access network device performs another operation includes: The second access network device skips indicating the first access network device to enable broadcasting of the SSB of the first cell and/or the SI of the first cell in the first cell.

In a possible implementation, the embodiment shown in FIG. 4A further includes step 404 and step 405. Step 404 and step 405 may be performed after step 403.

404: The first access network device sends the SSB of the first cell and/or the SI of the first cell to the terminal device.

For example, after the first access network device receives the indication information from the second access network device, the first access network device broadcasts the SSB of the first cell and/or the SI of the first cell in the first cell.

For example, as shown in FIG. 4B, after the second access network device receives the indication information from the first access network device, the second access network device enables broadcasting of the SSB and/or the SI in the first cell. That is, the first cell switches from the simplified broadcast mode to a normal broadcast mode.

405: The terminal device camps on the first cell based on the SSB of the first cell and/or the SI of the first cell, or the terminal device performs synchronization in the first cell based on the SSB of the first cell and/or the SI of the first cell, or the terminal device initiates random access to the first cell based on the SSB of the first cell and/or the SI of the first cell.

Step 405 is similar to step 204 in the embodiment shown in FIG. 2A. For details, refer to related descriptions of step 204 in the embodiment shown in FIG. 2A. The details are not described herein again.

In this embodiment, the terminal device receives the reference signal of the first cell from the first access network device. The time domain resources occupied by the reference signal are fewer than the total time domain resources occupied by the SSB of the first cell and the SI of the first cell. The terminal device sends the measurement result to the second access network device. The measurement result is a measurement result obtained by the terminal device by measuring the reference signal. Therefore, it can be understood that the terminal device senses the first cell based on the reference signal of the first cell. In addition, the time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the access network device are reduced. The terminal device sends, to the second access network device, the measurement result obtained by the terminal device by measuring the reference signal. After obtaining the measurement result, the second access network device may indicate, based on the measurement result, the first access network device to enable broadcasting of the SSB of the first cell and/or the SI of the first cell in the first cell. That is, the foregoing solution provides a way of triggering the second access network device to indicate the first access network device to enable broadcasting of the SSB of the first cell and/or the SI of the first cell. For the terminal device that is to access the first cell, the first access network device can enable broadcasting of the SSB of the first cell and/or the SI of the first cell in a timely manner in the foregoing solution. This helps the terminal device quickly access the first cell, reduces a delay of accessing the cell by the terminal device, and improves communication performance.

Figure 5A:
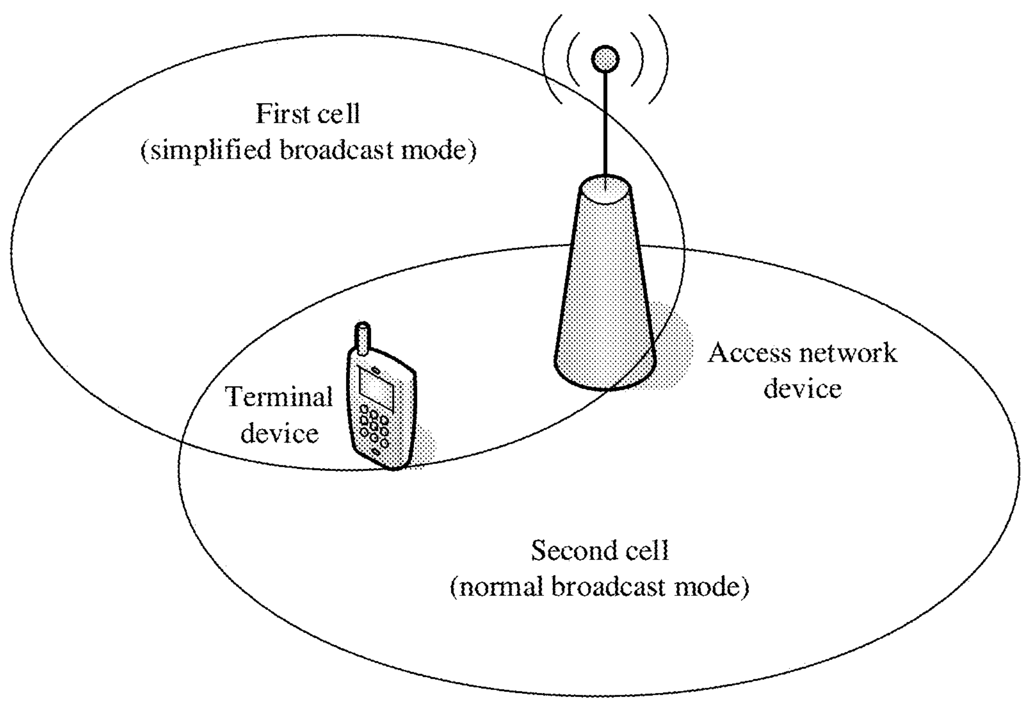
FIG. 5A is a schematic diagram of another scenario of a communication method according to an embodiment.

The embodiment shown in FIG. 4A shows an implementation in which the first cell and the second cell belong to different access network devices. Here, the first access network device and the second access network device are two different access network devices. In actual application, the first cell and the second cell may alternatively belong to a same access network device. Thus, the first access network device and the second access network device are a same access network device. For example, as shown in FIG. 5A, the first cell and the second cell are two cells of an access network device. The first cell is in a simplified broadcast mode, and the second cell is in a normal broadcast mode.

Figure 5B:
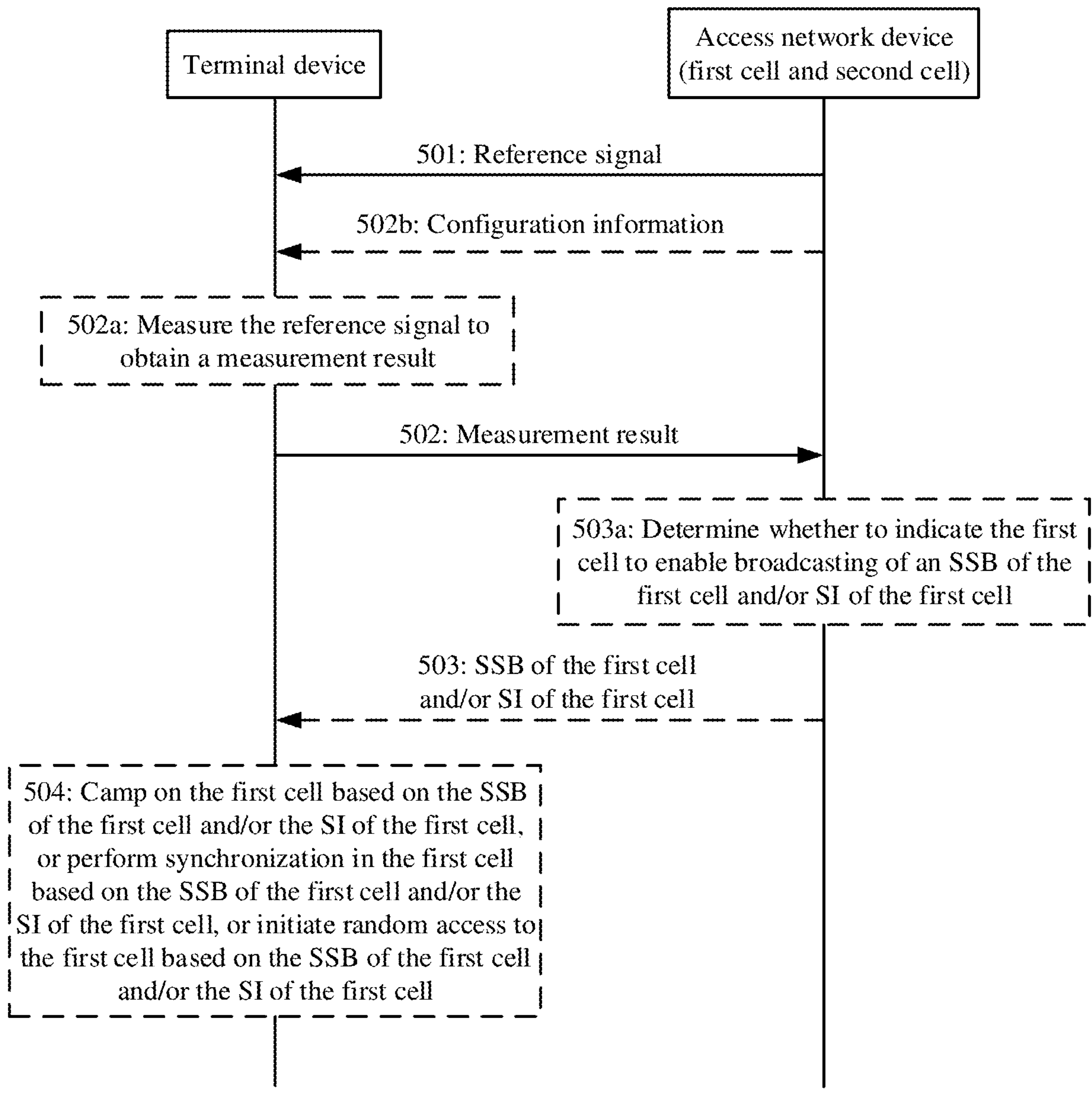
FIG. 5B is a schematic diagram of another embodiment of a communication method according to an embodiment.

Based on an implementation in which an access network device to which a first cell belongs and an access network device to which a second cell belongs are a same access network device, the following describes a solution in embodiments with reference to FIG. 5B. An embodiment shown in FIG. 5B is similar to the embodiment shown in FIG. 4A. For a difference, refer to related descriptions in the following embodiment shown in FIG. 5B.

FIG. 5B is a schematic diagram of another embodiment of a communication method. As shown in FIG. 5B, the communication method includes the following steps.

501: An access network device sends a reference signal of a first cell to a terminal device. Correspondingly, the terminal device receives the reference signal of the first cell from the access network device.

Step 501 is similar to step 401 in the embodiment shown in FIG. 4A. For details, refer to related descriptions of step 401 in the embodiment shown in FIG. 4A. The details are not described herein again.

502: The terminal device sends a measurement result to the access network device. Correspondingly, the access network device receives the measurement result from the terminal device.

The first cell and a second cell are cells of the access network device. Step 502 is similar to step 402 in the embodiment shown in FIG. 4A. For details, refer to related descriptions of step 402 in the embodiment shown in FIG. 4A. The details are not described herein again.

Optionally, the embodiment shown in FIG. 5B further includes step 502*a*. Step 502*a* may be performed before step 502.

502*a*: The terminal device measures the reference signal to obtain the measurement result.

Step 502*a* is similar to step 402*a* in the embodiment shown in FIG. 4A. For details, refer to related descriptions of step 402*a* in the embodiment shown in FIG. 4A. The details are not described herein again.

In a possible implementation, the embodiment shown in FIG. 5B further includes step 502*b*. Step 502*b* may be performed before step 502.

502*b*: The access network device sends configuration information to the terminal device. Correspondingly, the terminal device receives the configuration information from the access network device.

Step 502*b* is similar to step 402*b* in the embodiment shown in FIG. 4A. For details, refer to related descriptions of step 402*b* in the embodiment shown in FIG. 4A. The details are not described herein again.

Based on step 502*b*, optionally, step 502 includes: The terminal device sends the measurement result to the access network device based on the configuration information. For details about how the terminal device sends the measurement result, refer to related descriptions in the embodiment shown in FIG. 4A. The details are not described herein again.

Optionally, the embodiment shown in FIG. 5B further includes step 503 and step 504.

503: The access network device sends an SSB of the first cell and/or SI of the first cell to the terminal device. Correspondingly, the terminal device receives the SSB of the first cell and/or the SI of the first cell from the access network device.

In the embodiment shown in FIG. 5B, an access network device to which the first cell belongs and an access network device to which the second cell belongs are a same access network device. Therefore, after the access network device receives the measurement result, the access network device may enable broadcasting of the SSB and/or the SI in the first cell, or the access network device first determines whether to enable broadcasting of the SSB and/or the SI in the first cell.

Optionally, the embodiment shown in FIG. 5B further includes step 503*a*. Step 503*a* is performed before step 503.

503*a*: The access network device determines whether to enable broadcasting of the SSB of the first cell and/or the SI of the first cell in the first cell. If the access network device determines to enable broadcasting of the SSB of the first cell and/or the SI of the first cell in the first cell, the access network device performs step 503. If the access network device determines not to enable broadcasting of the SSB of the first cell and/or the SI of the first cell in the first cell, the access network device performs another operation.

A determining process in step 503*a* is similar to that in step 403*a* in the embodiment shown in FIG. 4A. For details, refer to related descriptions of step 403*a* in the embodiment shown in FIG. 4A. The details are not described herein again.

504: The terminal device camps on the first cell based on the SSB of the first cell and/or the SI of the first cell, or the terminal device performs synchronization in the first cell based on the SSB of the first cell and/or the SI of the first cell, or the terminal device initiates random access to the first cell based on the SSB of the first cell and/or the SI of the first cell.

Step 504 is similar to step 204 in the embodiment shown in FIG. 2A. For details, refer to related descriptions of step 204 in the embodiment shown in FIG. 2A. The details are not described herein again.

In this embodiment, the terminal device receives the reference signal of the first cell from the access network device. Time domain resources occupied by the reference signal are fewer than total time domain resources occupied by the SSB of the first cell and the SI of the first cell. The terminal device sends the measurement result to the access network device. The measurement result is a measurement result obtained by the terminal device by measuring the reference signal. Therefore, it can be understood that the terminal device senses the first cell based on the reference signal of the first cell. In addition, the time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the access network device are reduced. The terminal device sends the measurement result to the access network device. After obtaining the measurement result, the access network device may determine, based on the measurement result, whether to enable broadcasting of the SSB of the first cell and/or the SI of the first cell in the first cell. That is, a way of triggering the second access network device to enable broadcasting of the SSB of the first cell and/or the SI of the first cell is provided. For the terminal device that is to access the first cell, the access network device can enable broadcasting of the SSB of the first cell and/or the SI of the first cell in a timely manner in the foregoing solution. This helps the terminal device quickly access the first cell, reduces a delay of accessing the cell by the terminal device, and improves communication performance.

In the embodiment shown in FIG. 4A, the first access network device may be replaced with the first cell, and the second access network device may be replaced with the second cell. For example, the solution of the embodiments is described by using the first cell and the second cell as execution entities. The following describes another description manner of the solution shown in FIG. 4A by using an embodiment shown in FIG. 6.

Figure 6:
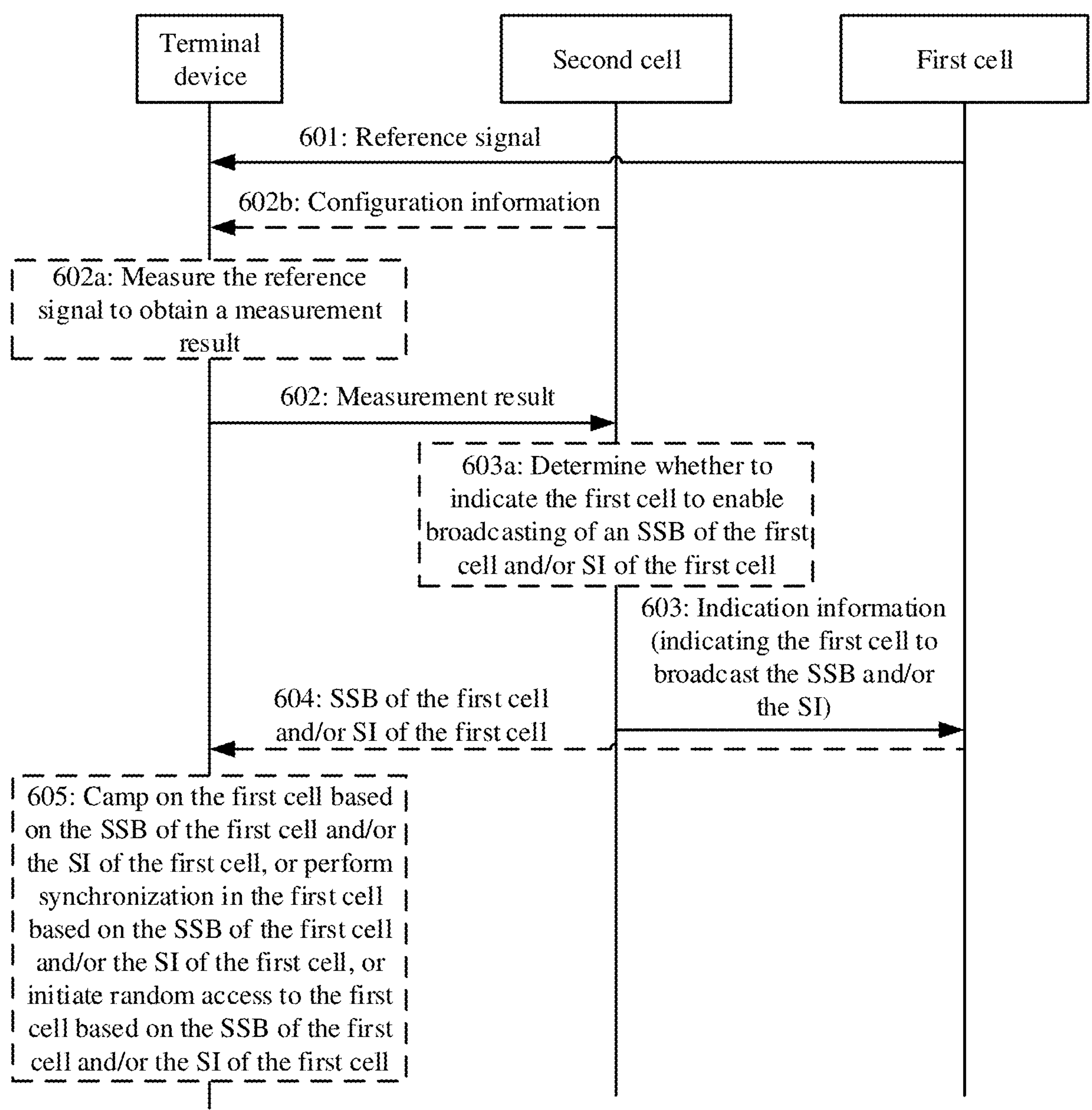
FIG. 6 is a schematic diagram of another embodiment of a communication method according to an embodiment.

FIG. 6 is a schematic diagram of another embodiment of a communication method. As shown in FIG. 6, the communication method includes the following steps.

601: A first cell sends a reference signal to a terminal device. Correspondingly, the terminal device receives the reference signal from the first cell.

602: The terminal device sends a measurement result to a second cell.

Correspondingly, the second cell receives the measurement result from the terminal device.

Step 601 and step 602 are similar to step 401 and step 402 in the embodiment shown in FIG. 4A, but are described in a different manner. For details, refer to related descriptions of step 401 and step 402 in the embodiment shown in FIG. 4A. The details are not described herein again.

In a possible implementation, the embodiment shown in FIG. 6 further includes step 602*a*. Step 602*a* is performed before step 602.

602*a*: The terminal device measures the reference signal to obtain the measurement result.

Step 602*a* is similar to step 402*a* in the embodiment shown in FIG. 4A. For details, refer to related descriptions of step 402*a* in the embodiment shown in FIG. 4A. The details are not described herein again.

Optionally, the embodiment shown in FIG. 6 further includes step 602*b*, and step 602*b* is performed before step 602.

602*b*: The second cell sends configuration information to the terminal device.

Correspondingly, the terminal device receives the configuration information from the second cell.

Step 602*b* is similar to step 402*b* in the example shown in FIG. 4A. For details, refer to related descriptions of step 402*b* in the example shown in FIG. 4A. The details are not described herein again.

Based on step 602*b*, optionally, step 602 includes: The terminal device sends the measurement result to the second cell based on the configuration information.

603: The second cell sends indication information to the first cell. Correspondingly, the first cell receives the indication information from the second cell.

The indication information indicates the first cell to broadcast an SSB of the first cell and/or SI of the first cell.

Step 603 is similar to step 403 in the embodiment shown in FIG. 4A, but is described in a different manner. For details, refer to related descriptions of step 403 in the embodiment shown in FIG. 4A. The details are not described herein again.

Optionally, the embodiment shown in FIG. 6 further includes step 603*a*. Step 603*a* may be performed before step 603.

603*a*: The second cell determines whether to indicate the first cell to enable broadcasting of the SSB of the first cell and/or the SI of the first cell. If the second cell determines to indicate the first cell to enable broadcasting of the SSB of the first cell and/or the SI of the first cell, the second cell performs step 603. If the second cell determines not to indicate the first cell to enable broadcasting of the SSB of the first cell and/or the SI of the first cell, the second cell performs another operation.

Step 603*a* is similar to step 403*a* in the embodiment shown in FIG. 4A, but is described in a different manner. For details, refer to related descriptions of step 403*a* in the embodiment shown in FIG. 4A. The details are not described herein again.

In a possible implementation, the embodiment shown in FIG. 6 further includes step 604 and step 605. Step 604 and step 605 may be performed after step 603.

604: The terminal device receives the SSB and/or the SI from the first cell.

605: The terminal device camps on the first cell based on the SSB of the first cell and/or the SI of the first cell, or the terminal device performs synchronization in the first cell based on the SSB of the first cell and/or the SI of the first cell, or the terminal device initiates random access to the first cell based on the SSB of the first cell and/or the SI of the first cell.

Step 605 is similar to step 204 in the embodiment shown in FIG. 2A. For details, refer to related descriptions of step 204 in the embodiment shown in FIG. 2A. The details are not described herein again.

In this embodiment, the terminal device receives the reference signal from the first cell. Time domain resources occupied by the reference signal are fewer than total time domain resources occupied by the SSB of the first cell and the SI of the first cell. The terminal device sends the measurement result to the second cell. The measurement result is a measurement result obtained by the terminal device by measuring the reference signal. Therefore, it can be understood that the terminal device senses the first cell based on the reference signal of the first cell. In addition, the time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the access network device are reduced. The terminal device sends the measurement result to the second cell. In this way, after obtaining the measurement result, the second cell may indicate, based on the measurement result, the first cell to enable broadcasting of the SSB and/or the SI. That is, a way of triggering the second cell to indicate the first cell to enable broadcasting of the SSB and/or the SI is provided. For the terminal device that is to access the first cell, the first cell can enable broadcasting of the SSB and/or the SI in a timely manner in the foregoing solution. This helps the terminal device quickly access the first cell, and reduces a delay of accessing the first cell by the terminal device.

Figure 7A:
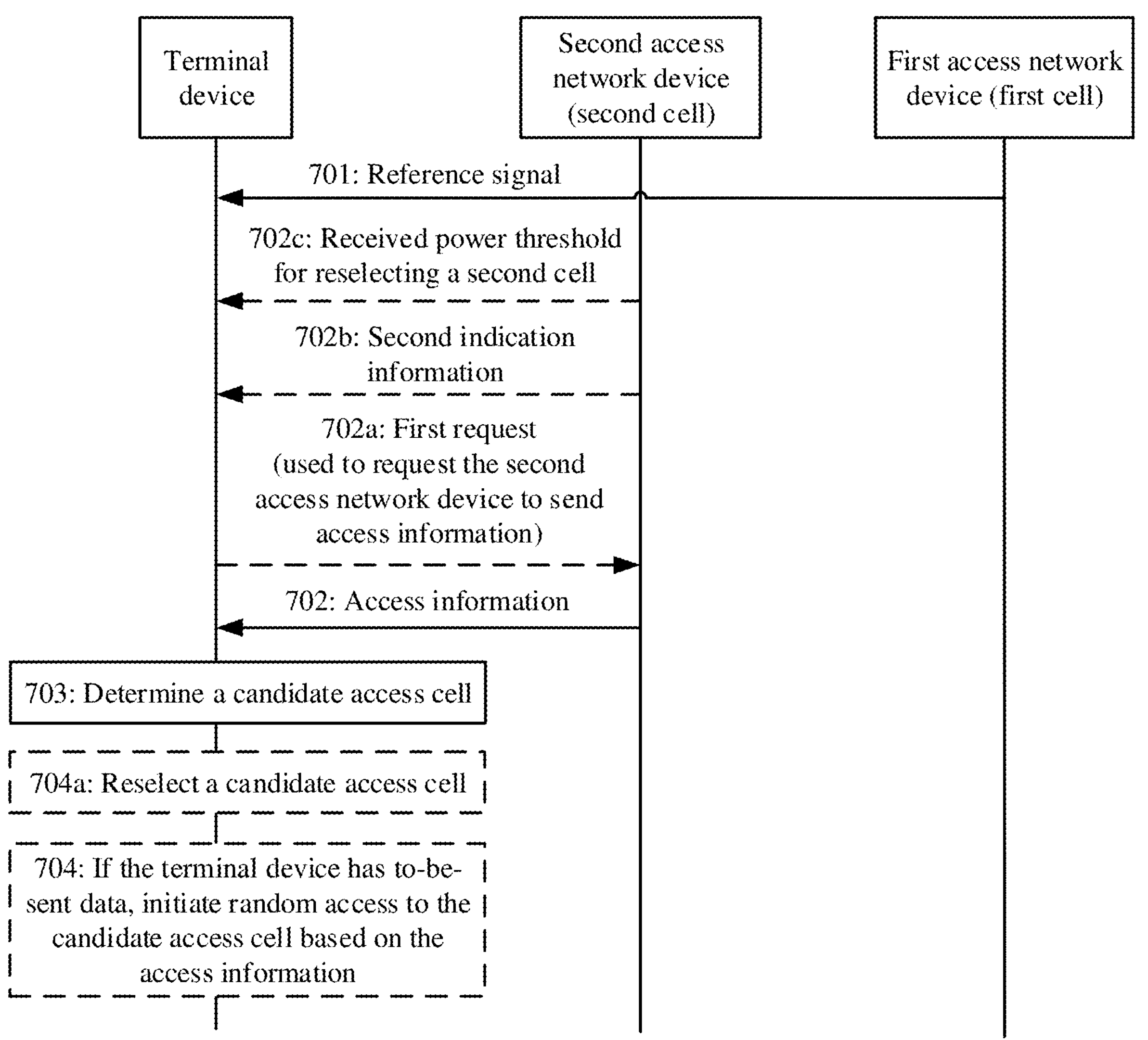
FIG. 7A is a schematic diagram of another embodiment of a communication method according to an embodiment.

FIG. 7A is a schematic diagram of another embodiment of a communication method. As shown in FIG. 7A, the communication method includes the following steps.

701: A first access network device sends a reference signal of a first cell to a terminal device. Correspondingly, the terminal device receives the reference signal of the first cell from the first access network device.

The first cell is a cell of the first access network device. The first cell includes one or more cells.

Time domain resources occupied by the reference signal of the first cell are fewer than total time domain resources occupied by an SSB of the first cell and SI of the first cell.

Optionally, a quantity of time domain symbols occupied by the reference signal of the first cell is less than a total quantity of time domain symbols occupied by the SSB of the first cell and the SI of the first cell.

Figure 7B:
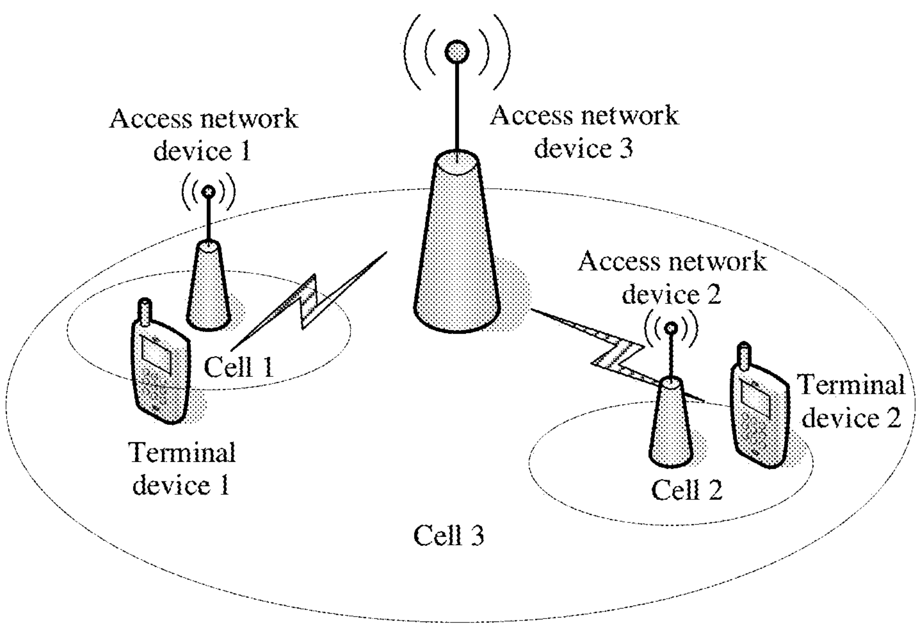
FIG. 7B is a schematic diagram of another scenario of a communication method according to an embodiment.
Figure 7C:
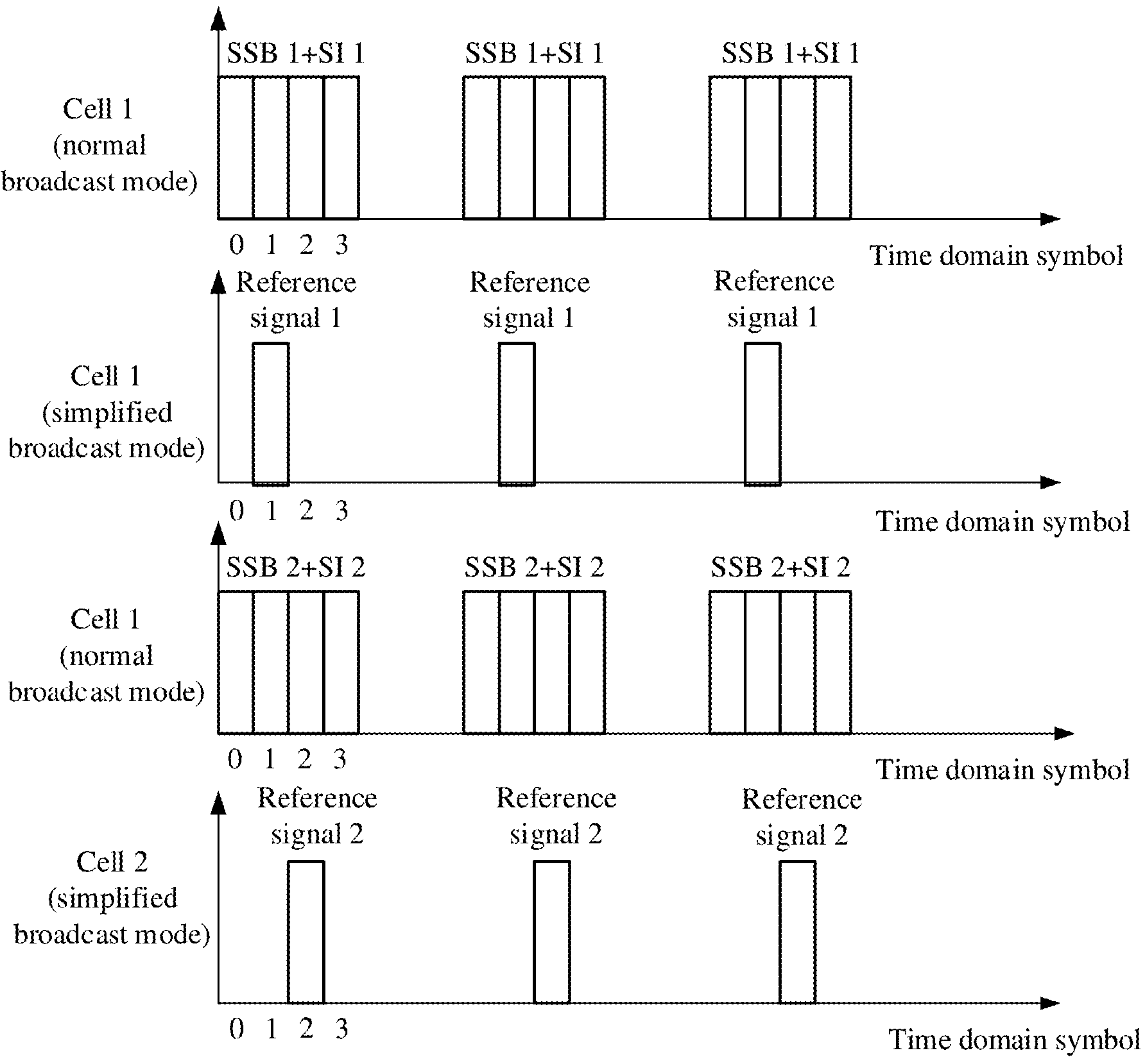
FIG. 7C is another schematic diagram of broadcasting a reference signal according to an embodiment.

For example, as shown in FIG. 7B, the first cell includes a cell 1 and a cell 2. Further, as shown in FIG. 7C, the cell 1 broadcasts a reference signal 1, and the cell 2 broadcasts a reference signal 2. A quantity of time domain symbols occupied by the reference signal 1 of the cell 1 is less than a total quantity of time domain symbols occupied by an SSB 1 corresponding to the cell 1 and SI 1 corresponding to the cell 1. A quantity of time domain symbols occupied by the reference signal 2 of the cell 2 is less than a total quantity of time domain symbols occupied by an SSB 2 corresponding to the cell 2 and SI 2 corresponding to the cell 2.

In some implementations, each of the one or more cells is located on a carrier, and different cells are located on different carriers. A carrier on which each of the one or more cells is located is a high-frequency carrier.

For example, as shown in FIG. 7B, the cell 1 is located on a 1.8 GHz (gigahertz) carrier, and the cell 2 is located on a 1.9 GHz carrier.

It should be noted that, if the first cell includes a plurality of cells, access network devices to which the plurality of cells respectively belong may be a same access network device or different access network devices. This is not limited.

For example, as shown in FIG. 7B and FIG. 7C, the first cell includes a cell 1 and a cell 2. The cell 1 is a cell of an access network device 1, and the cell 2 is a cell of an access network device 2. Therefore, the first access network device includes the access network device 1 and the access network device 2. In this implementation, the terminal device receives a reference signal 1 from the cell 1 of the access network device 1, and receives a reference signal 2 from the cell 2 of the access network device 2.

Figure 7D:
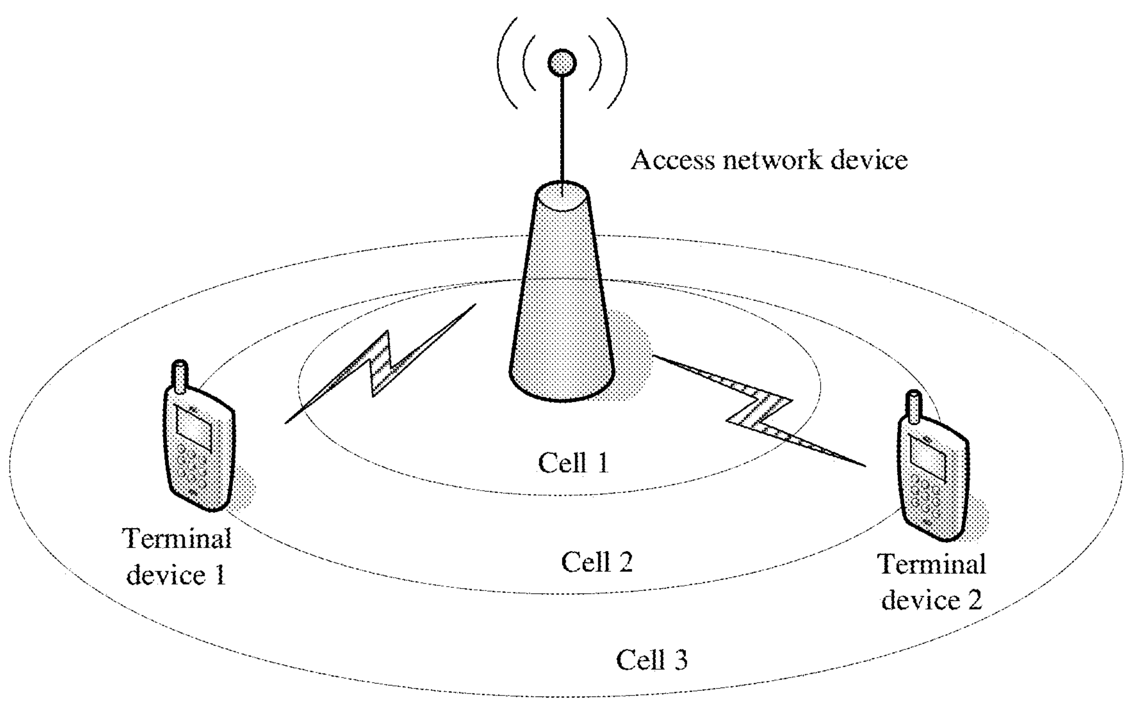
FIG. 7D is a schematic diagram of another scenario of a communication method according to an embodiment.

For example, as shown in FIG. 7C and FIG. 7D, the first cell includes a cell 1 and a cell 2. The cell 1 and the cell 2 are two cells of an access network device. Therefore, the first access network device includes the access network device. In this implementation, the terminal device receives a reference signal 1 and a reference signal 2 from the access network device. In some implementations, the reference signal may be referred to as a DRS. The DRS is merely an example, and a name of the reference signal is not limited.

In some implementations, the reference signal may be any one of the following signals: an SSS of the first cell, a PSS of the first cell, an SBB of the first cell, or a newly designed signal. This is not limited.

In an implementation in which the reference signal is a newly designed signal, optionally, the reference signal of the first cell includes at least one of the following information: first indication information, an identifier of the first cell, an identifier of the second cell associated with the first cell, a channel number of the second cell, an index of the first cell, a system frame number, a half-frame indication, an index of the reference signal, a beam index of the reference signal, a time-frequency resource for sending a wake-up signal for the first cell, a feature parameter of a pseudo-random sequence used by the wake-up signal for the first cell, or a condition for sending the wake-up signal for the first cell by the terminal device.

The following describes the at least one piece of information included in the reference signal.

1. The first indication information indicates that the first cell is a DCC cell. For a DCC cell and a BCC cell, refer to the following related descriptions.

2 Channel number of the second cell

For example, the second access network device sends a reference signal on a channel 2. The terminal device may determine the channel 2 based on the channel number of the second cell, and listen to a reference signal of the second cell on the channel 2.

3. Index of the first cell

The index of the first cell may also be referred to as a number of the first cell.

For example, the second cell is a BCC cell, and the first cell includes a plurality of DCC cells. Each DCC cell corresponds to one number. For example, the first cell includes N+1 DCC cells, a number of a first DCC cell is 0, a number of a second DCC cell is 1, . . . , a number of an (N+1)th DCC cell is N. N is an integer greater than or equal to 0.

The identifier of the first cell and the identifier of the second cell are similar to the identifier of the first cell in the embodiment shown in FIG. 2A. For details, refer to related descriptions of the identifier of the first cell in the embodiment shown in FIG. 2A. The details are not described herein again.

For the system frame number, the half-frame indication, the index of the reference signal, the beam index of the reference signal, the time-frequency resource for sending the wake-up signal for the first cell, the feature parameter of the pseudo-random sequence used by the wake-up signal for the first cell, or the condition for sending the wake-up signal for the first cell by the terminal device, refer to related descriptions in the embodiment shown in FIG. 2A. Details are not described again.

For example, in step 701, the reference signal of the first cell may be generated based on a pseudo-random sequence. For example, the pseudo-random sequence may be an m sequence, a Gold sequence, or a ZC sequence. This is not limited.

The reference signal includes at least one of the foregoing information. The first access network device may use the pseudo-random sequence to represent the foregoing information. For example, the first access network device may configure, based on the foregoing information, an initial value or a shift value for generating a pseudo-random sequence, and then generate a corresponding pseudo-random sequence.

Figure 7E:
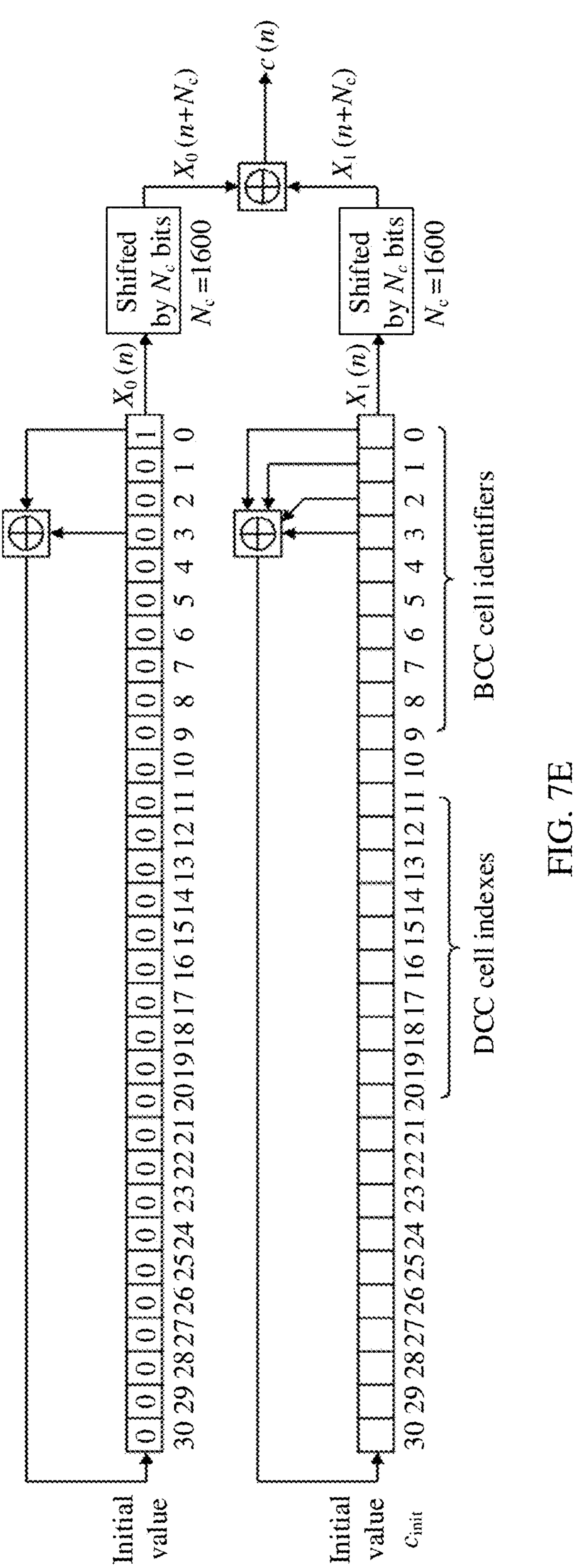
FIG. 7E is a schematic diagram of another process of generating a pseudo-random sequence used to generate a reference signal according to an embodiment.

For example, the first cell includes a DCC cell 1, and a pseudo-random sequence used to generate a reference signal of the DCC cell 1 is a 127-bit Gold sequence. The Gold sequence is generated by performing modulo 2 addition on two m sequences. A specific generation process is shown in FIG. 7E. c(n) is the pseudo-random sequence for generating the reference signal of the DCC cell 1. An initial value of a first m sequence is 0000000000000000000000000000001. In an initial value of a second m sequence, a 0th bit to a 9th bit represent an identifier of the BCC cell, an 11th bit to a 15th bit represent an index of the DCC cell 1, and remaining bits are 0. The first access network device obtains the pseudo-random sequence c(n) through the generation process shown in FIG. 7E. The first access network device performs Fourier transform or inverse Fourier transform on c(n) to generate the reference signal of the DCC cell 1.

In this case, it can be understood that the reference signal includes the identifier of the BCC cell and the index of the reference signal of the DCC cell 1. After receiving the reference signal, the terminal device may derive the identifier of the BCC cell and the index of the reference signal of the DCC cell 1.

Optionally, the reference signal of the first cell includes at least one sub-signal. For the at least one sub-signal, refer to related descriptions in the embodiment shown in FIG. 2A. Details are not described herein again. The at least one sub-signal may be further understood with reference to the examples shown in FIG. 2D and FIG. 2E. Details are not described herein again.

702: The second access network device sends access information to the terminal device. Correspondingly, the terminal device receives the access information from the second access network device.

The access information includes access information of the first cell. The access information is used by the terminal device to select, from the first cell, a candidate access cell for access.

The second access network device is an access network device of the second cell, and the first cell is a cell associated with the second cell. Optionally, the terminal device may camp on or access the second cell.

In some implementations, association between the first cell and the second cell may be represented in the following two possible aspects.

1. In terms of carriers, the first cell and the second cell are separately located on carriers, and the two cells are respectively located on different carriers.

In a communication network, carriers may be classified into a basic layer carrier and a capacity layer carrier. The basic layer carrier provides basic signal coverage of the network. Often, the basic layer carrier is a low-frequency carrier. In this way, a signal coverage area of the basic layer carrier is large, so that basic signal coverage of the network can be implemented. The basic layer carrier may be referred to as a basic component carrier (BCC). A cell corresponding to the basic layer carrier may be referred to as a basic layer cell. The capacity layer carrier provides a larger network capacity. Often, the capacity layer carrier is a high-frequency carrier, to cover an area with high traffic or a high capacity requirement, and provide a larger network capacity for the area. The capacity layer carrier may be referred to as a data component carrier (DCC). A cell corresponding to the capacity layer carrier may be referred to as a capacity layer cell.

The first cell may be referred to as a DCC cell, and the second cell may be referred to as a BCC cell. The second cell is used for basic signal coverage of a network. The first cell provides a larger network capacity.

It should be noted that names of the first cell and the second cell are merely examples, and names of the first cell and the second cell are not limited.

For example, as shown in FIG. 7B, the first cell includes a cell 1 and a cell 2. The second cell is a cell 3. The cell 3 is located on a basic layer carrier. In other words, the cell 3 is a BCC cell. A signal coverage area of the cell 3 is large. The cell 1 and the cell 2 are separately located on capacity layer carriers. In other words, the cell 1 and the cell 2 each are a DCC cell. A signal coverage area corresponding to each of the cell 1 and the cell 2 is small.

2. In terms of signal coverage areas, a signal coverage area of the first cell overlaps a signal coverage area of the second cell.

For example, as shown in FIG. 7B or FIG. 7D, the first cell includes a cell 1 and a cell 2. The second cell is a cell 3. A signal coverage area of the cell 3 is large. A signal coverage area corresponding to each of the cell 1 and the cell 2 may fall within the signal coverage area of the cell 3. For example, a signal coverage area of the cell 1 overlaps the signal coverage area of the cell 3, and a signal coverage area of the cell 2 overlaps the signal coverage area of the cell 3.

It should be noted that the second cell may include one or more cells. For example, as shown in FIG. 7B, the second cell is the cell 3, the cell 3 is a BCC cell, and the cell 1 and the cell 2 are DCC cells associated with the BCC cell. In the embodiments, an example in which the first cell includes one cell is used for description.

In some implementations, step 702 may be performed in a process in which the second access network device broadcasts an SSB of the second cell and/or SI of the second cell.

Figure 7F:
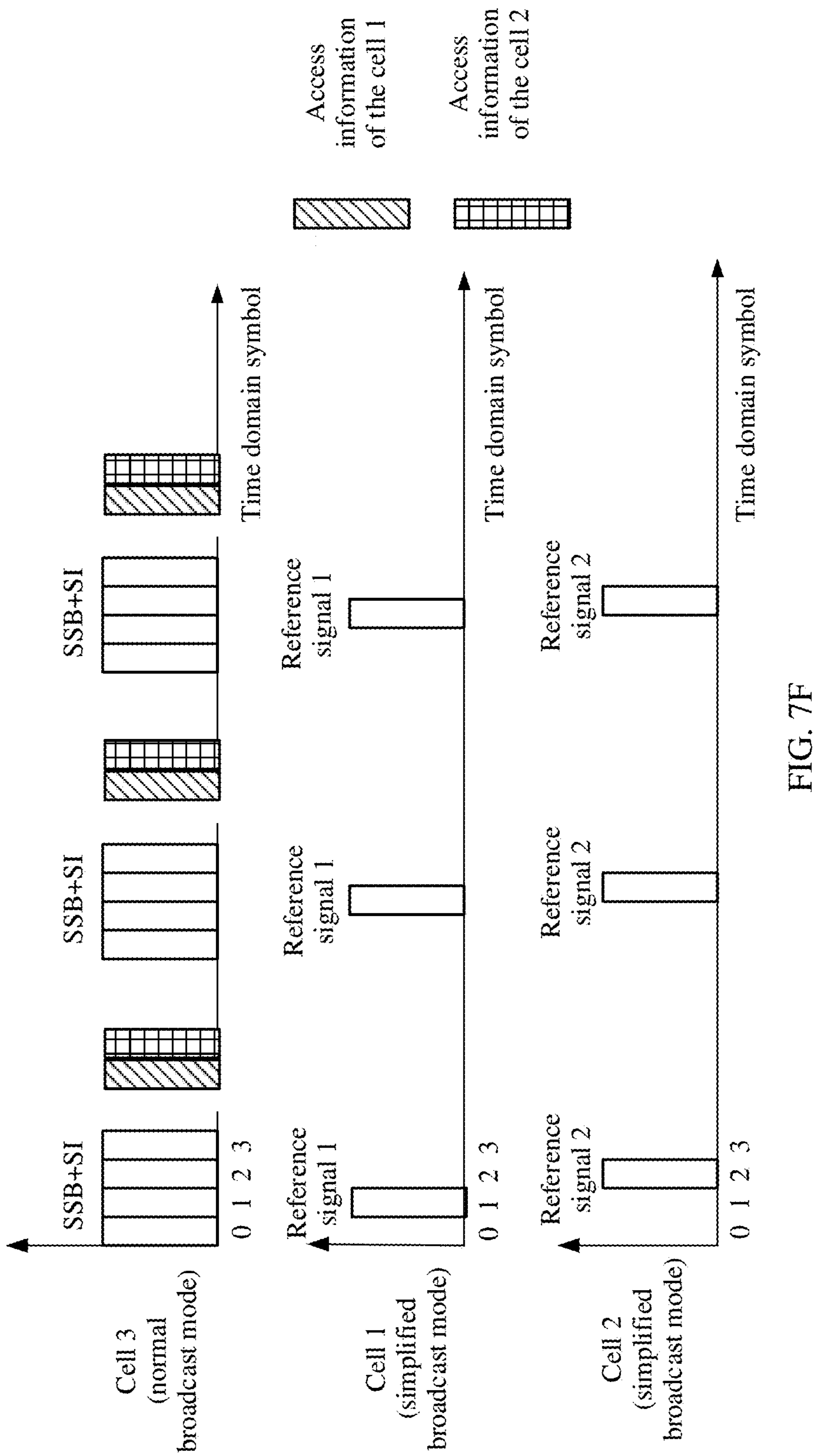
FIG. 7F is another schematic diagram of broadcasting a reference signal according to an embodiment.

For example, as shown in FIG. 7F, the first cell includes a cell 1 and a cell 2. The second cell is a cell 3. The cell 1 does not broadcast an SSB of the cell 1 and/or SI of the cell 1, but broadcasts a reference signal 1 of the cell 1. The cell 2 does not broadcast an SSB of the cell 2 and/or SI of the cell 2, but broadcasts a reference signal 2 of the cell 2. Herein, the cell 1 and the cell 2 are referred to as being in a low-power simplified broadcast mode. The cell 3 may broadcast an SSB of the cell 3 and/or SI of the cell 3. Herein, the cell 3 is referred to as being in a normal broadcast mode. Optionally, in a process in which the cell 3 broadcasts the SSB of the cell 3 and/or the SI of the cell 3, the cell 3 broadcasts access information of the cell 1 and access information of the cell 2.

It can be understood from the example shown in FIG. 7F that the cell 1 and the cell 2 are in the low-power simplified broadcast mode, and the terminal device can sense the cell 1 and the cell 2. As shown in FIG. 7B, a terminal device 1 can sense the cell 1, and a terminal device 2 can sense the cell 2. In addition, the cell 3 broadcasts the access information of the cell 1 and the access information of the cell 2. The cell 1 and the cell 2 do not need to broadcast the access information, so that power consumption overheads of the cell 1 and the cell 2 are reduced. The terminal device 1 may obtain the access information of the cell 1. If the terminal device 1 needs to access the cell 1 (for example, the terminal device 1 has to-be-sent data), the terminal device 1 may quickly access the cell 1 based on the access information of the cell 1. The terminal device 2 may obtain the access information of the cell 2. If the terminal device 2 needs to access the cell 2 (for example, the terminal device 2 has to-be-sent data), the terminal device 2 may quickly access the cell 2 based on the access information of the cell 2.

In some implementations, the first cell is located on a first carrier, the second cell is located on a second carrier, and the first carrier is different from the second carrier.

For example, as shown in FIG. 7B, the first cell includes a cell 1 and a cell 2. The second cell is a cell 3. The cell 1 is located on a high-frequency carrier 1, the cell 2 is located on a high-frequency carrier 2, and the cell 3 is located on a low-frequency carrier 1. The high-frequency carrier 1 is different from the high-frequency carrier 2.

In a possible implementation, the access information includes at least one of the following: the identifier of the first cell, the index of the first cell, a channel number of the first cell, a priority of the first cell, an offset of a start time domain location of the reference signal relative to a start time domain location or an end time domain location of an SSB corresponding to the second cell, an identifier of a network supported by the first cell, a random access parameter of the first cell, a selection parameter of the first cell, a reselection parameter of the first cell, the time-frequency resource for sending the wake-up signal for the first cell, the feature parameter of the pseudo-random sequence used by the wake-up signal for the first cell, or the condition for sending the wake-up signal for the first cell by the terminal device.

The following describes the at least one piece of information included in the access information.

For the identifier of the first cell, the index of the first cell, the channel number of the first cell, the time-frequency resource for sending the wake-up signal for the first cell, the feature parameter of the pseudo-random sequence used by the wake-up signal for the first cell, and the condition for sending the wake-up signal for the first cell by the terminal device, refer to related descriptions in the embodiment shown in FIG. 2A. Details are not described again.

The priority of the first cell indicates a priority corresponding to each of one or more cells included in the first cell.

For example, the first cell includes a plurality of DCC cells, and each DCC cell has a corresponding value. A larger value indicates a higher priority, and a smaller value indicates a lower priority.

It should be noted that, in a possible implementation, the first access network device determines the priority of the first cell based on a frequency band of a carrier on which the first cell is located. For example, transmit power used by the first access network device to transmit a signal on a high-frequency carrier is high. Therefore, a priority of a cell located on a high-frequency carrier is lower, and a priority of a cell located on a low-frequency carrier is higher. This further reduces power consumption overheads of the access network device, and improves power saving effect.

Optionally, the offset of the start time domain location of the reference signal relative to the start time domain location or the end time domain location of the SSB of the second cell is an offset of the start time domain symbol of the reference signal relative to a start time domain symbol of the SSB corresponding to the second cell.

For example, as shown in FIG. 7F, the first cell includes a cell 1 and a cell 2. A start time domain symbol of a reference signal 1 of the cell 1 is a time domain symbol 1. A start time domain symbol of a reference signal 2 of the cell 2 is a time domain symbol 2. The second cell is a cell 3, and a start time domain symbol of an SSB of the cell 3 is a time domain symbol 0. In this case, it can be understood that an offset between the start time domain symbol of the reference signal 1 of the cell 1 and the start time domain symbol of the SSB of the cell 3 is 1, and an offset between the start time domain symbol of the reference signal 2 of the cell 2 and the start time domain symbol of the SSB of the cell 3 is 2.

The identifier of the network supported by the first cell is used by the terminal device to determine whether to access the first cell.

For example, if the terminal device subscribes to a China Mobile network and the network supported by the first cell is a China Unicom network, the terminal device cannot access the first cell.

Optionally, the random access parameter of the first cell includes at least one of the following: a PRACH time-frequency resource or a root sequence index of a preamble.

The selection parameter of the first cell is used by the terminal device to select a candidate access cell from the first cell.

For example, the selection parameter of the first cell includes a received power threshold for a reference signal. In a further example, if the terminal device detects that received power of a reference signal is greater than or equal to the received power threshold, the terminal device may select the cell as a candidate access cell.

The reselection parameter of the first cell is used by the terminal device to reselect a candidate access cell from the first cell.

In a possible implementation, the reselection parameter of the first cell includes at least one of the following: a reference signal measurement cycle, a received power threshold for triggering the terminal device to measure a reference signal, a measurement frequency priority, and a reference signal received power threshold for reselecting a first cell.

For the reference signal measurement cycle, refer to related descriptions in the embodiment shown in FIG. 4A. Details are not described herein again.

The received power threshold for triggering the terminal device to measure a reference signal means that, when received power of a reference signal of a cell accessed by the terminal device is less than or equal to the received power threshold, the terminal device may measure a reference signal of another cell.

The measurement frequency priority indicates, to the terminal device, measurement priorities of reference signals of cells with different frequencies. For example, power consumption of broadcasting an SSB and/or SI by a base station in a low-frequency cell is less than power consumption overheads of broadcasting an SSB and/or SI by the base station in a high-frequency cell. Therefore, a measurement priority of the low-frequency cell may be higher than that of the high-frequency priority. In this way, the terminal device can preferentially choose to measure a reference signal of the low-frequency cell, to access the low-frequency cell.

The reference signal received power threshold for reselecting a first cell means that received power of a reference signal of a candidate access cell reselected by the terminal device is greater than or equal to the reference signal received power threshold for reselecting a first cell.

It can be understood from the foregoing access information of the first cell that the access information of the first cell may include selection information used by the terminal device to select a candidate access cell and access information used by the terminal device to access the candidate access cell.

In another possible implementation, the access information of the first cell includes the SI of the first cell.

For example, in this implementation, the second cell may broadcast the SI of the first cell, so that the terminal device subsequently selects a candidate access cell from the first cell and accesses the candidate access cell. In this way, the terminal device can quickly access the candidate access cell. The first access network device does not need to broadcast the access information of the first cell, so that power consumption overheads of the first access network device are reduced.

Optionally, the second cell is associated with a plurality of cells. The first cell includes all cells associated with the second cell; or the first cell includes some cells associated with the second cell.

For example, the first cell is a DCC cell, and the second cell is a BCC cell. The first cell includes all DCC cells associated with the BCC cell; or the first cell includes some DCC cells associated with the BCC cell.

For example, by default, the second cell may broadcast access information of all cells associated with the second cell. This helps the terminal device select the candidate access cell from the first cell based on the access information, and access the candidate access cell. Alternatively, the second cell may broadcast access information of a cell with a higher priority among cells associated with the second cell. That is, the first cell includes some cells associated with the second cell. Therefore, an amount of broadcasting performed by the second cell is reduced, and power consumption overheads of broadcasting performed by the second cell are reduced. For priority settings, refer to the foregoing related descriptions. Alternatively, the second cell may broadcast the access information of the first cell that the terminal device requests to broadcast. For details, refer to related descriptions in the following step 702*a*.

Optionally, the embodiment shown in FIG. 7A further includes step 702*a*, and step 702*a* may be performed before step 702.

702*a*: The terminal device sends a first request to the second access network device. Correspondingly, the second access network device receives the first report from the terminal device.

The first request is used to request the access information of the first cell from the second access network device.

For example, the second cell broadcasts the SSB of the second cell and the SI of the second cell. The terminal device camps on or accesses the second cell, and the terminal device receives a broadcast message from the second cell. The broadcast message includes the SSB of the second cell and the SI of the second cell. The terminal device sends the first request to the second access network device. In this case, the second cell broadcasts the SSB of the second cell and the SI of the second cell, and further broadcasts the access information of the first cell.

Optionally, the second cell is associated with a plurality of cells, and the terminal device requests the second access network device to broadcast access information of the cells associated with the second cell. The terminal device may not specify a cell whose access information is to be broadcast by the second access network device. The first access network device may broadcast access information of all cells associated with the second cell.

In this implementation, the first cell includes all cells associated with the second cell.

Optionally, the second cell is associated with a plurality of cells, and the first request is used to request the second access network device to broadcast access information of a specified cell. The specified cell is some cells associated with the second cell. Therefore, the first access network device may broadcast the access information of the specified cell. The second access network device does not need to broadcast access information of all cells associated with the second cell. This reduces an amount of broadcasting performed by the second access network device, and therefore reduces power consumption overheads of the second access network device.

In this implementation, the first cell includes some cells associated with the second cell.

Figure 7G:
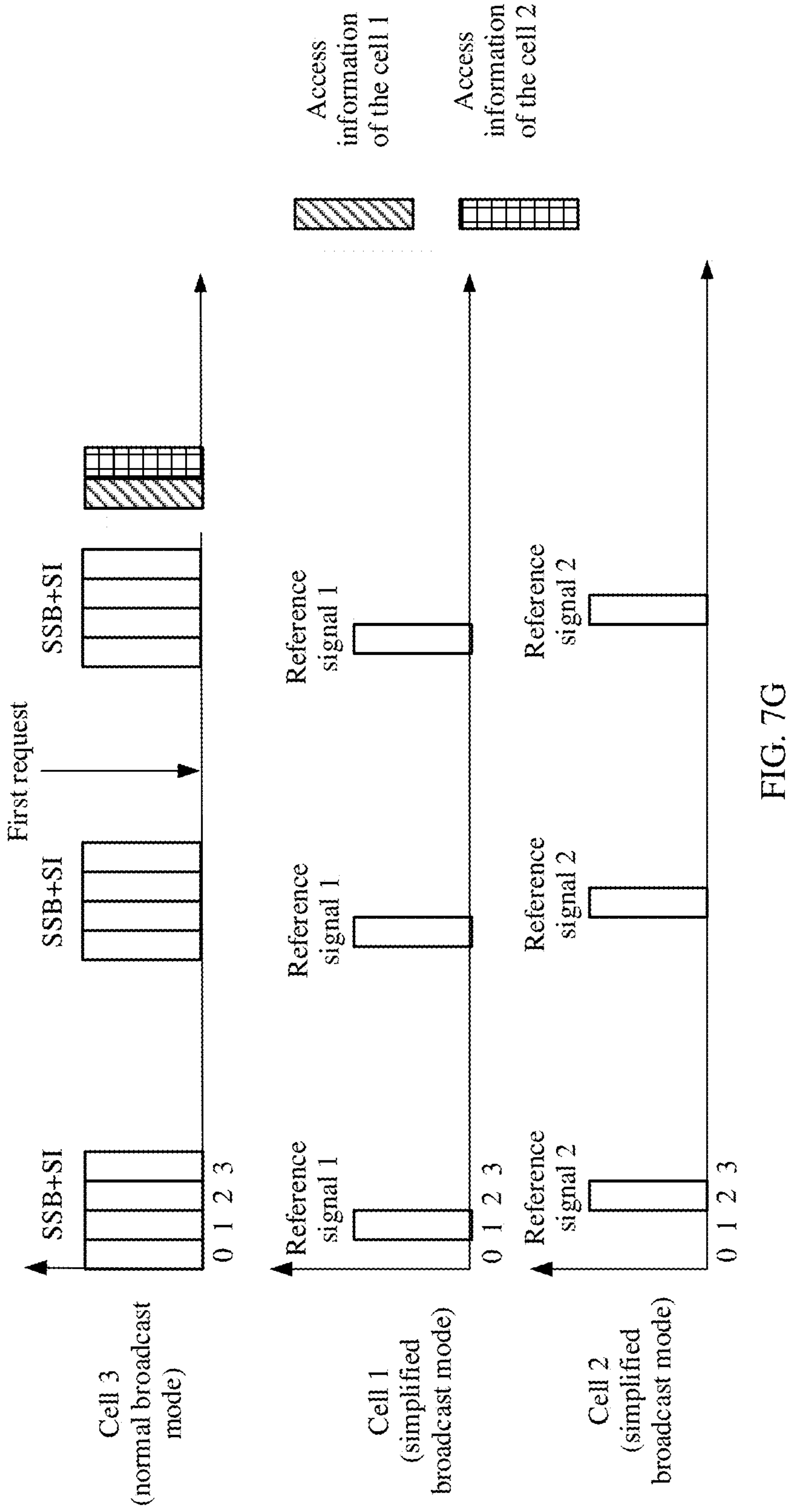
FIG. 7G is another schematic diagram of broadcasting a reference signal according to an embodiment.

For example, as shown in FIG. 7G, a BCC cell broadcasts an SSB of the BCC cell and SI of the BCC cell. Cells associated with the second cell include a DCC cell 1 and a DCC cell 2. If the terminal device needs to access a DCC cell (for example, the terminal device has to-be-sent data), the terminal device may request, from the BCC cell by using the first request, access information of a DCC cell associated with the BBC cell. After the BCC cell receives the first request, the BCC cell may broadcast access information of the DCC cell 1 and access information of the DCC cell 2.

In a possible implementation, step 702*a* includes: The terminal device sends the first request to the second access network device by using a preamble or an RRC system request message.

The preamble includes the first request, or the RRC system request message includes the first request.

The terminal device configures, based on the first request, an initial value or a shift value of a pseudo-random sequence for generating the preamble. Then the terminal device generates the pseudo-random sequence based on the initial value or the shift value, and then generates the preamble based on the pseudo-random sequence.

The foregoing implementation provides two carriers used by the terminal device to send the first request, and provides a basis for implementing the solution. In addition, the terminal device sends the first request to the second access network device by using the preamble, and the terminal device does not need to access the second cell. The terminal device can quickly transfer information to the second access network device, so that the terminal device quickly obtains the access information of the first cell. This helps the terminal device quickly select the candidate access cell and access the candidate access cell, to reduce a delay of accessing the cell by the terminal device, and improve communication performance.

Optionally, step 702 includes: The terminal device sends the first request to the second access network device when the terminal device detects that received power of the reference signal of the first cell is greater than or equal to a threshold.

The threshold may be preset, configured, or defined in a communication standard. This is not limited.

In this implementation, the terminal device requests the access information of the first cell from the second access network device when the terminal device detects that the received power of the reference signal is greater than the threshold. This can prevent the terminal device from frequently requesting the second access network device to broadcast the access information of the first cell, to reduce power consumption overheads of the second access network device. In addition, when received power of a reference signal is greater than the threshold, it indicates that strength of a signal received by the terminal device from a cell corresponding to the reference signal is high. In this way, if the terminal device subsequently accesses the cell, the cell can provide higher communication quality for the terminal device, to improve communication performance.

In a possible implementation, the embodiment shown in FIG. 7A further includes step 702*b*, and step 702*b* may be performed before step 703.

702*b*: The second access network device sends second indication information to the terminal device. Correspondingly, the terminal device receives the second indication information from the second access network device.

The second indication information indicates that the second cell is a BCC cell.

For example, the second access network device may indicate, by using the second indication information, that the second cell is a BCC cell. In this way, the terminal device can request the access information of the first cell from the second cell.

It should be noted that there is no fixed execution sequence between step 702*b* and step 701. Step 701 may be performed before step 702*b*, or step 702*b* is performed before step 701, or step 701 and step 702*b* are simultaneously performed based on a situation.

Optionally, the embodiment shown in FIG. 7A further includes step 702*c*.

702*c*: The second access network device sends, to the terminal device, a received power threshold for reselecting a second cell.

For example, when the terminal device detects that received power of an SSB of another second cell is greater than the received power threshold for reselecting a second cell, the terminal device may reselect the another second cell.

It should be noted that there is no fixed execution sequence between step 702*c* and step 701, step 702*a*, step 702*b*, and step 702. Step 702*c* may be performed before step 701, step 702*a*, step 702*b*, and step 702; or step 701, step 702*a*, step 702*b*, and step 702 are performed before step 702*c*. This is not limited.

703: The terminal device determines a candidate access cell.

The candidate access cell is selected from the first cell based on the access information and the reference signal.

For example, the terminal device selects the candidate access cell from the first cell based on the access information and the reference signal.

For example, the access information includes a channel number of a DCC cell and a priority of the DCC cell. The terminal device may search for the DCC cell based on the access information, and measure power of the DCC cell. For example, the terminal device sequentially searches, in descending order of priorities of DCC cells, for the DCC cell on a channel on which each DCC cell is located. When the terminal device detects that received power of a reference signal of a DCC cell exceeds a received power threshold for reporting and/or the DCC cell is a cell with a strongest signal on a channel on which the DCC cell is located, the terminal device may use the DCC cell as a candidate access cell.

If a priority of the DCC cell is higher than that of another DCC cell, the terminal device may not detect a reference signal of the another DCC cell. That is, the DCC cell serves as a finally determined candidate access cell. In this way, the terminal device can quickly determine the candidate access cell, so that the terminal device can quickly access the candidate access cell.

Optionally, the embodiment shown in FIG. 7A further includes step 704, and step 704 may be performed after step 703.

704: If the terminal device has to-be-sent data, the terminal device initiates random access to the candidate access cell based on the access information.

For example, the candidate access cell is a DCC cell 1. The access information includes a random access parameter of the DCC cell 1. The terminal device initiates random access to the candidate access cell based on the random access parameter of the DCC cell 1.

In a possible implementation, the embodiment shown in FIG. 7A further includes step 704*a*, and step 704*a* may be performed before step 704 and after step 703.

704*a*: The terminal device reselects a candidate access cell.

For a specific execution process of step 704*a*, refer to detailed descriptions in the following embodiment shown in FIG. 7H. Details are not described herein.

Based on step 704*a*, optionally, step 704 includes: If the terminal device has to-be-sent data, the terminal device initiates random access to the reselected candidate access cell based on the access information.

In this embodiment, the terminal device senses the first cell based on the reference signal of the first cell. The time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the first access network device are reduced. The terminal device obtains the access information of the first cell from the second access network device. In this way, the terminal device can select, based on the access information and the reference signal of the first cell, the candidate access cell for access. This enables the terminal device to quickly access the candidate access cell, reduces a delay of accessing the cell by the terminal device, and improves communication performance.

Figure 7H:
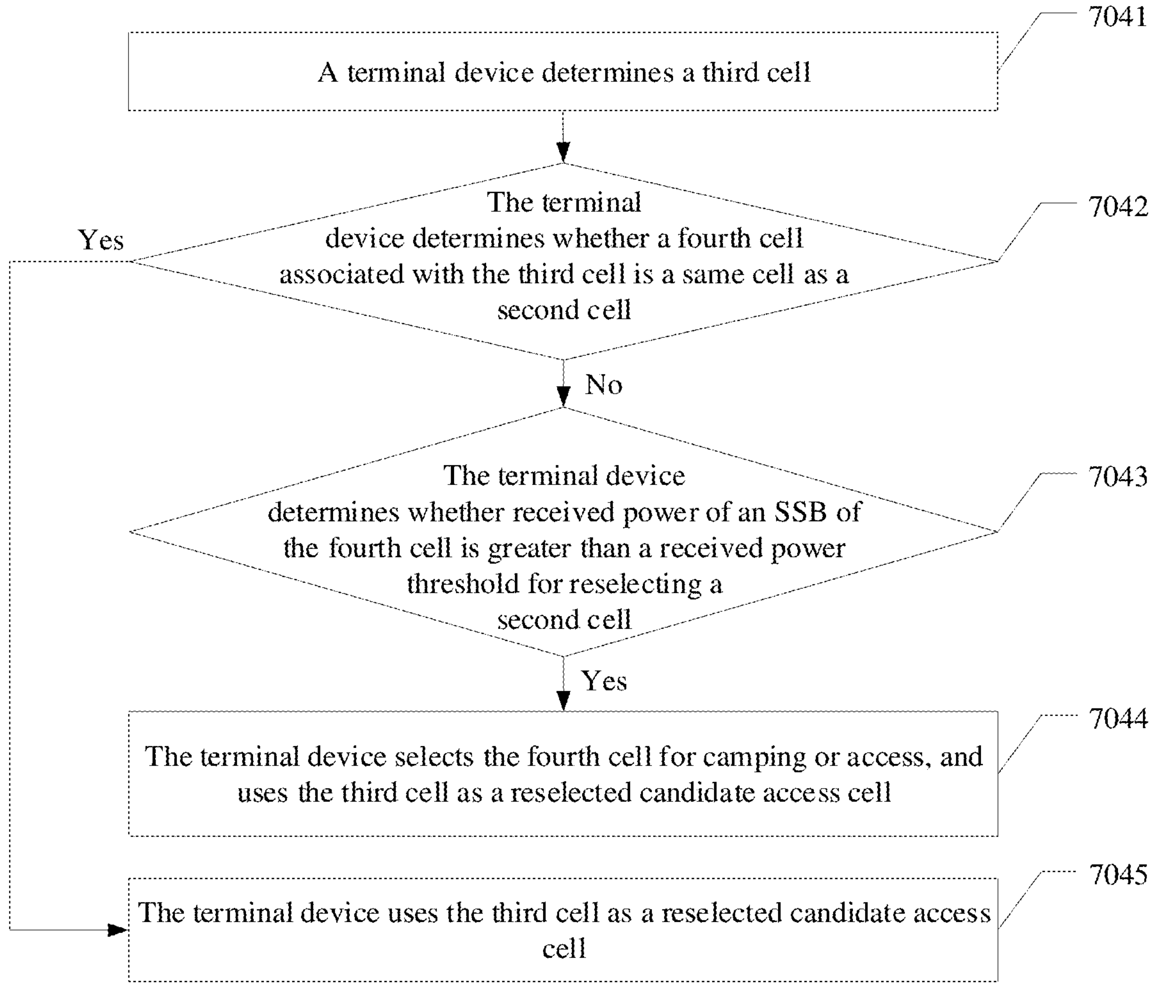
FIG. 7H is a schematic diagram of another embodiment of a communication method according to an embodiment.

The following describes step 704*a* in detail with reference to the embodiment shown in FIG. 7H. Step 704*a* includes step 7041 to step 7045.

FIG. 7H is a schematic diagram of another embodiment of a communication method according to an embodiment. The communication method in FIG. 7H includes the following steps.

7041: The terminal device determines a third cell.

The third cell is a DCC cell.

For example, the terminal device searches for a DCC cell. For example, the terminal device may periodically search for a DCC cell; or the terminal device searches for a DCC cell when received power of a reference signal of the candidate access cell selected in step 704 is less than a power threshold for triggering reference signal measurement.

The terminal device may search for a DCC cell based on priorities of DCC cells. The terminal device may determine the third cell if the terminal device detects that received power of a reference signal of the third cell is greater than the received power of the reference signal of the candidate access cell selected in step 704. Alternatively, the terminal device may determine the third cell when the terminal device detects that received power of a reference signal of the third cell is greater than the reference signal received power threshold for reselecting a first cell.

7042: The terminal device determines whether a fourth cell associated with the third cell is a same cell as the second cell; and if the fourth cell is a same cell as the second cell, performs step 7045; or if the fourth cell is not a same cell as the second cell, performs step 7043.

The third cell is a cell associated with the fourth cell.

Association between the third cell and the fourth cell is similar to association between the first cell and the second cell in step 701 in the embodiment shown in FIG. 7A. For details, refer to related descriptions of step 701 in the embodiment shown in FIG. 7A. The details are not described herein again.

For example, the third cell is a DCC cell, and the fourth cell is a BCC cell. The terminal device determines whether the fourth cell and the second cell are a same BCC cell; and if the fourth cell and the second cell are a same BCC cell, performs step 7045; or if the fourth cell and the second cell are not a same BCC cell, performs step 7043.

The following describes a possible implementation of determining, by the terminal device, whether the fourth cell and the second cell are a same BCC cell.

The terminal device determines whether the broadcast message of the second cell includes an identifier of the third cell. If the identifier of the third cell is included, it indicates that the fourth cell and the second cell are a same BCC cell. If the identifier of the third cell is not included, it indicates that the fourth cell and the second cell are not a same BCC cell.

7043: The terminal device determines whether received power of an SSB of the fourth cell is greater than the received power threshold for reselecting a second cell. If the received power of the SSB of the fourth cell is greater than the received power threshold for reselecting a second cell, the terminal device performs step 7044. If the received power of the SSB of the fourth cell is not greater than the received power threshold for reselecting a second cell, the terminal device performs another operation.

In some implementations, the terminal device may determine, based on information carried in a reference signal of the third cell, the fourth cell associated with the third cell.

For example, the reference signal of the third cell includes an identifier of the fourth cell. In this case, the terminal device searches for the fourth cell on some or all channels based on the identifier of the fourth cell.

For example, the reference signal of the third cell includes an identifier of the fourth cell and a channel number of the fourth cell. The terminal device may search for the fourth cell on a channel corresponding to the channel number.

The terminal device measures received power of an SSB broadcast in the fourth cell. If the received power of the SSB is greater than or equal to the received power threshold for reselecting a second cell, the terminal device performs step 7044. If the received power of the SSB is less than the received power threshold for reselecting a second cell, the terminal device performs another operation.

It should be noted that, optionally, that the terminal device performs another operation includes: The terminal device re-searches for a DCC cell to reselect a DDC cell.

7044: The terminal device selects the fourth cell for camping or access, and uses the third cell as a reselected candidate access cell.

7045: The terminal device uses the third cell as a reselected candidate access cell.

FIG. 7A shows an implementation in which the first cell and the second cell belong to different access network devices. For example, the first access network device and the second access network device are two different access network devices. In actual application, the first cell and the second cell may alternatively belong to a same access network device. For example, the first access network device and the second access network device are a same access network device.

For example, as shown in FIG. 7D, the first cell includes a cell 1 and a cell 2. The second cell is a cell 3. The cell 1, the cell 2, and the cell 3 are three cells of an access network device. The cell 1 and the cell 2 are in a simplified broadcast mode, and the cell 3 is in a normal broadcast mode.

Figure 8:
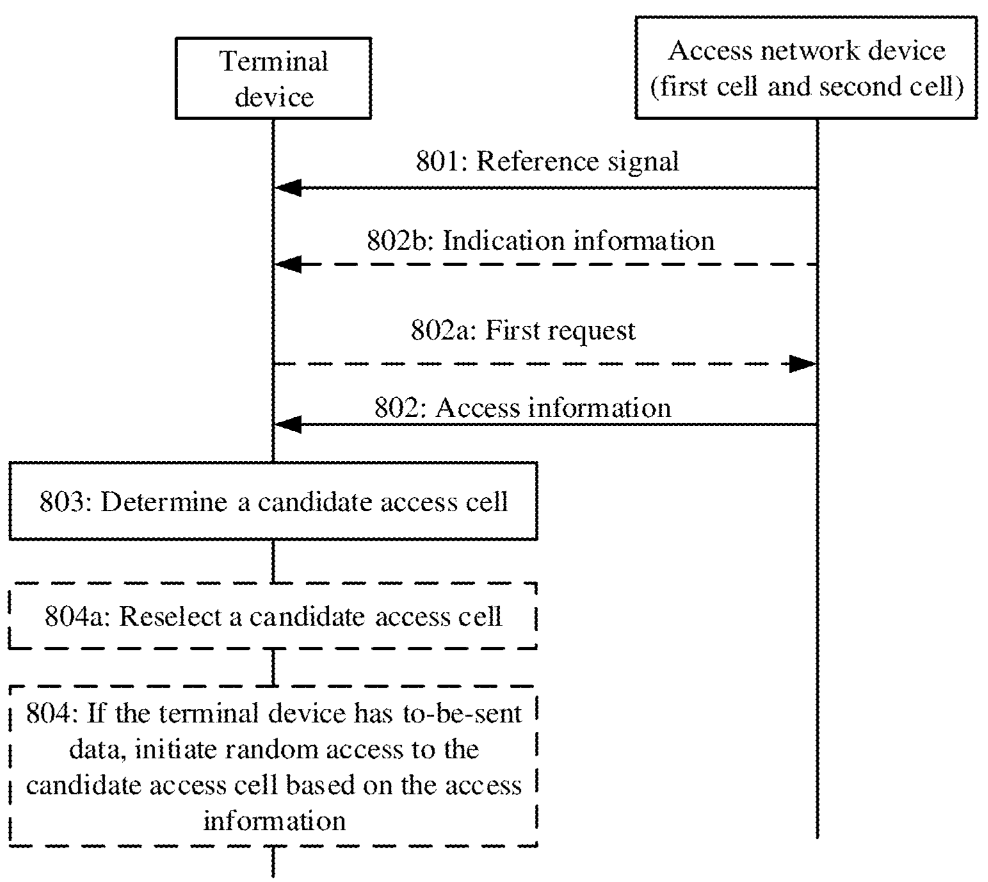
FIG. 8 is a schematic diagram of another embodiment of a communication method according to an embodiment.

Based on an implementation in which an access network device to which a first cell belongs and an access network device to which a second cell belongs are a same access network device, the following describes a solution in embodiments with reference to FIG. 8. An embodiment shown in FIG. 8 is similar to the embodiment shown in FIG. 7A. For details about a difference, refer to related descriptions in the following embodiment shown in FIG. 8.

FIG. 8 is a schematic diagram of another embodiment of a communication method. As shown in FIG. 8, the communication method includes the following steps.

801: An access network device sends a reference signal of a first cell to a terminal device. Correspondingly, the terminal device receives the reference signal of the first cell from the access network device.

802: The access network device sends access information of the first cell to the terminal device. Correspondingly, the terminal device receives the access information of the first cell from the access network device.

Step 801 and step 802 are similar to step 701 and step 702 in the embodiment shown in FIG. 7A. For details, refer to related descriptions of step 701 and step 702 in the embodiment shown in FIG. 7A. The details are not described herein again.

It should be noted that there is no fixed execution sequence between step 801 and step 802. Step 801 may be performed before step 802, or step 802 is performed before step 801, or step 801 and step 802 are simultaneously performed based on a situation. This is not limited.

Optionally, the embodiment shown in FIG. 8 further includes step 802*a*, and step 802*a* may be performed before step 802.

802*a*: The terminal device sends a first request to the access network device.

Correspondingly, the access network device receives the first report from the terminal device.

It should be noted that there is no fixed execution sequence between step 802*a* and step 801. Step 801 may be performed before step 802*a*, or step 802*a* is performed before step 801, or step 801 and step 802*a* are simultaneously performed based on a situation. This is not limited.

Optionally, the embodiment shown in FIG. 8 further includes step 802*b*. Step 802*b* may be performed before step 802*a*.

802*b*: The access network device sends indication information to the terminal device. Correspondingly, the terminal device receives the indication information from the access network device.

Step 802*b* is similar to step 702*b* in the embodiment shown in FIG. 7A. For details, refer to related descriptions of step 702*b* in the embodiment shown in FIG. 7A. The details are not described herein again.

803: The terminal device determines a candidate access cell.

Step 803 is similar to step 703 in the embodiment shown in FIG. 7A. For details, refer to related descriptions of step 703 in the embodiment shown in FIG. 7A. The details are not described herein again.

Optionally, the embodiment shown in FIG. 8 further includes step 804, and step 804 is performed after step 803.

804: If the terminal device has to-be-sent data, the terminal device initiates random access to the candidate access cell based on the access information.

Step 804 is similar to step 704 in the embodiment shown in FIG. 7A. For details, refer to related descriptions of step 704 in the embodiment shown in FIG. 7A. The details are not described herein again.

In a possible implementation, the embodiment shown in FIG. 8 further includes step 804*a*, and step 804*a* may be performed before step 804 and after step 803.

804*a*: The terminal device reselects a candidate access cell.

Step 804*a* is similar to step 704*a* in the embodiment shown in FIG. 7A. For details, refer to related descriptions of step 704*a* in the embodiment shown in FIG. 7A. The details are not described herein again.

Based on step 804*a*, optionally, step 804 includes: If the terminal device has to-be-sent data, the terminal device initiates random access to the reselected candidate access cell based on the access information.

In this embodiment, the terminal device senses the first cell based on the reference signal of the first cell. In addition, the time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the access network device are reduced. The terminal device obtains the access information of the first cell from the access network device. In this way, the terminal device can select, based on the access information and the reference signal of the first cell, the candidate access cell for access. This enables the terminal device to quickly access the candidate access cell, reduces a delay of accessing the cell by the terminal device, and improves communication performance.

In the embodiment shown in FIG. 7A, the first access network device may be replaced with the first cell, and the second access network device may be replaced with the second cell. For example, the solution of the embodiments are described by using the first cell and the second cell as execution entities. The following describes another description manner of the solution shown in FIG. 7A by using an embodiment shown in FIG. 9.

Figure 9:
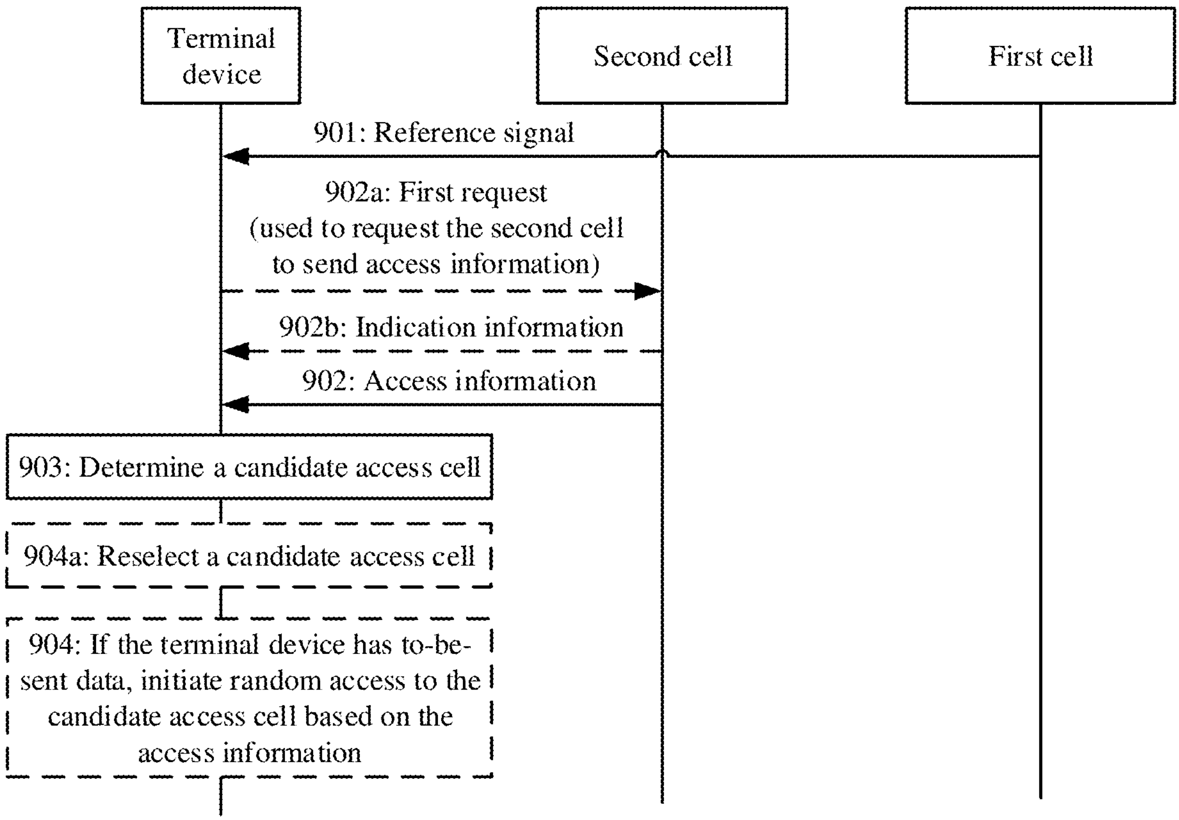
FIG. 9 is a schematic diagram of another embodiment of a communication method according to an embodiment.

FIG. 9 is a schematic diagram of another embodiment of a communication method. As shown in FIG. 9, the communication method includes the following steps.

901: A terminal device receives a reference signal from a first cell.

The first cell is a cell to which a first access network device belongs.

902: The terminal device receives access information from a second cell, where the access information includes access information of the first cell.

The second cell is a cell to which a second access network device belongs.

Step 901 and step 902 are similar to step 701 and step 702 in the embodiment shown in FIG. 7A. For details, refer to related descriptions of step 701 and step 702 in the embodiment shown in FIG. 7A. The details are not described herein again.

Optionally, the embodiment shown in FIG. 9 further includes step 902*a*, and step 902*a* may be performed before step 902.

902*a*: The terminal device sends a first request to the second cell, where the first request is used to request the second cell to send the access information of the first cell.

Optionally, the embodiment shown in FIG. 9 further includes step 902*b*, and step 902*b* may be performed before step 902.

902*b*: The terminal device receives second indication information from the second cell.

Step 902*a* is similar to step 702*a* in the embodiment shown in FIG. 7A, and step 902*b* is similar to step 702*b* in the embodiment shown in FIG. 7A. For details, refer to related descriptions of step 702*a* and step 702*b* in the embodiment shown in FIG. 7A. The details are not described herein again.

903: The terminal device determines a candidate access cell.

904: If the terminal device has to-be-sent data, the terminal device initiates random access to the candidate access cell based on the access information.

Step 903 and step 904 are similar to step 703 and step 704 in the embodiment shown in FIG. 7A. For details, refer to related descriptions of step 703 and step 704 in the embodiment shown in FIG. 7A. The details are not described herein again.

Optionally, the embodiment shown in FIG. 9 further includes step 904*a*, and step 904*a* may be performed before step 904.

904*a*: The terminal device reselects a candidate access cell.

Based on step 904*a*, optionally, step 904 includes: If the terminal device has to-be-sent data, the terminal device initiates random access to the reselected candidate access cell based on the access information.

Step 904*a* is similar to step 704*a* in the embodiment shown in FIG. 7A. For details, refer to related descriptions of step 704*a* in the embodiment shown in FIG. 7A. The details are not described herein again.

In this embodiment, the terminal device senses the first cell based on the reference signal of the first cell. In addition, the time domain resources occupied by the reference signal are fewer than the total time domain resources occupied by the SSB of the first cell and the SI of the first cell. In this way, power consumption of broadcasting the reference signal by the first cell is low. In other words, the first cell is in a low-power broadcast mode. Therefore, power consumption overheads of the access network device are reduced. The terminal device obtains the access information of the first cell from the access network device. In this way, the terminal device can select, based on the access information and the reference signal of the first cell, the candidate access cell for access. This enables the terminal device to quickly access the candidate access cell, reduces a delay of accessing the cell by the terminal device, and improves communication performance.

Figure 10:
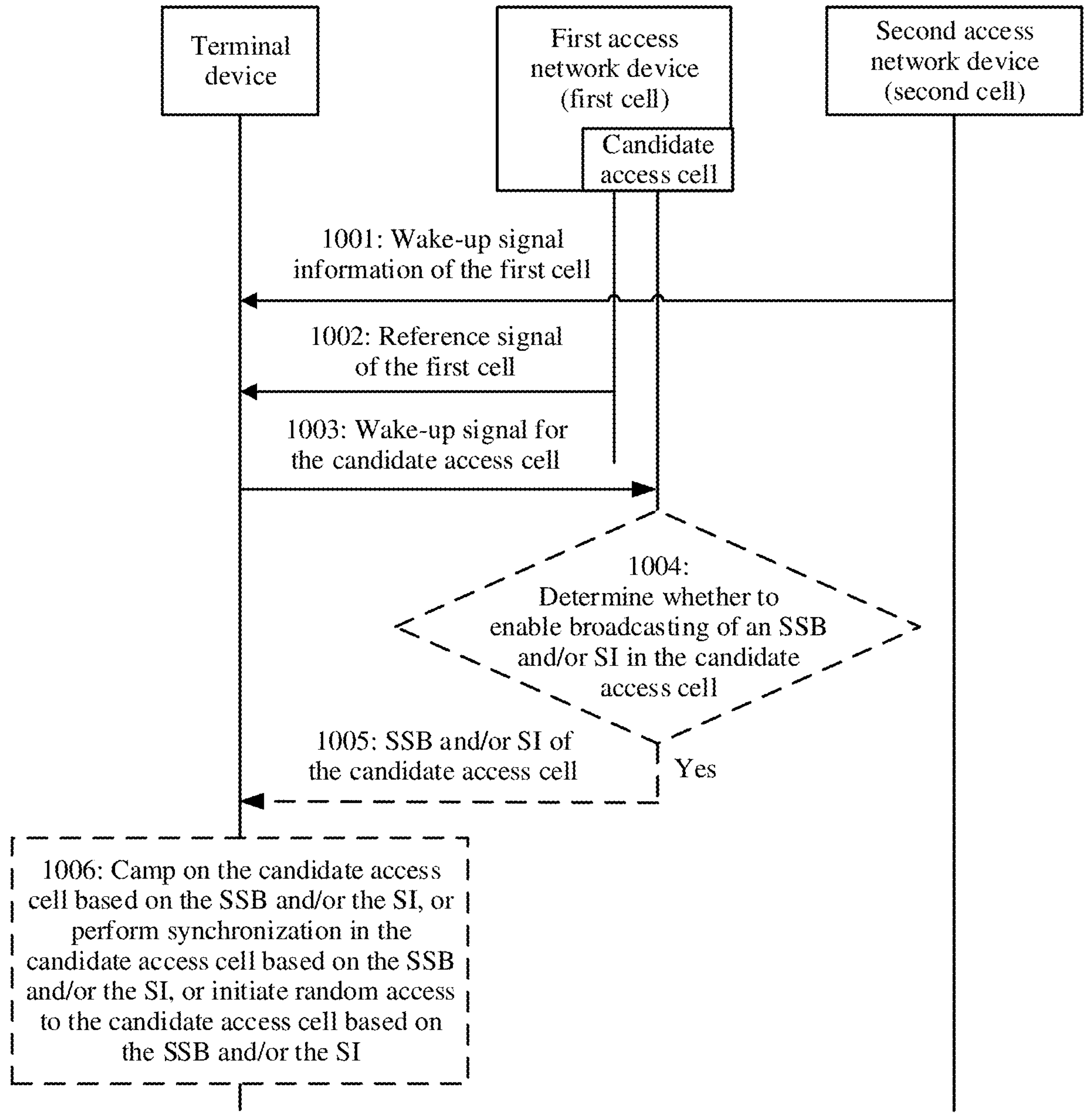
FIG. 10 is a schematic diagram of another embodiment of a communication method according to an embodiment.

FIG. 10 is a schematic diagram of another embodiment of a communication method. As shown in FIG. 10, the communication method includes the following steps.

1001: A second access network device sends wake-up signal information of a first cell to a terminal device. Correspondingly, the terminal device receives the wake-up signal information of the first cell from the second access network device.

The second access network device is an access network device of a second cell, and the first cell is a cell associated with the second cell. For related descriptions of association between the first cell and the second cell, refer to related descriptions of step 701 in the embodiment shown in FIG. 7A. Details are not described herein again.

The wake-up signal information of the first cell includes at least one of the following: a time-frequency resource for sending a wake-up signal for the first cell, a feature parameter of a pseudo-random sequence used by the wake-up signal for the first cell, or a condition for sending the wake-up signal for the first cell by the terminal device. For content included in the wake-up signal information of the first cell, refer to related descriptions in the embodiment shown in FIG. 7A.

1002: A first access network device sends a reference signal of the first cell to the terminal device. Correspondingly, the terminal device receives the reference signal of the first cell from the first access network device.

The first access network device is an access network device of the first cell. For related descriptions of the reference signal of the first cell, refer to related descriptions of the reference signal of the first cell in step 701 in the embodiment shown in FIG. 7A. Details are not described herein again.

1003: The terminal device sends a wake-up signal for a candidate access cell to the first access network device. Correspondingly, the first access network device receives the wake-up signal for the candidate access cell from the terminal device.

For example, the terminal device measures the reference signal of the first cell, and selects the candidate access cell from the first cell. The terminal device sends the wake-up signal for the candidate access cell to the first access network device.

Optionally, the terminal device sends the wake-up signal for the candidate access cell to the first access network device when a second condition is met.

The second condition includes at least one of the following: Received power of a reference signal of the candidate access cell is greater than a third threshold; or a reference signal of the candidate access cell is a reference signal with maximum received power in the first cell.

Optionally, the wake-up signal information of the first cell in step 1001 includes a time-frequency resource for sending the wake-up signal for the candidate access cell and a feature parameter of a pseudo-random sequence used by the wake-up signal for the candidate access cell.

In this case, the embodiment shown in FIG. 10 further includes step 1003*a*, and step 1003*a* is performed after step 1003.

1003*a*: The terminal device generates the wake-up signal based on the feature parameter of the pseudo-random sequence used by the wake-up signal for the candidate access cell. Step 1003*a* is similar to step 202*b* in the embodiment shown in FIG. 2A. For details, refer to related descriptions of step 202*b* in the embodiment shown in FIG. 2A. The details are not described herein again.

Step 1003 includes: The terminal device sends the wake-up signal for the candidate access cell to the first access network device on the time-frequency resource for sending the wake-up signal for the candidate access cell.

Optionally, the embodiment shown in FIG. 10 further includes step 1004 to step 1006.

1004: The first access network device determines whether to enable broadcasting of an SSB and/or SI in the candidate access cell. If the first access network device determines to enable broadcasting of an SSB and/or SI in the candidate access cell, the first access network device performs step 1005. If the first access network device determines not to enable broadcasting of an SSB and/or SI in the candidate access cell, the first access network device performs another operation.

In a possible implementation, the first access network device determines, based on third information, whether to enable broadcasting of an SSB and/or SI in the candidate access cell. If the first access network device determines to enable broadcasting of an SSB and/or SI in the candidate access cell, the first access network device enables broadcasting of an SSB and/or SI in the candidate access cell.

The third information includes at least one of the following: load of the candidate access cell, load of the second cell, and received power of a wake-up signal received by the first access network device.

For example, if the load of the candidate access cell is low, the load of the second cell is high, and the received power of the wake-up signal is high, the first access network device may broadcast an SSB and/or SI in the candidate access cell.

For example, if the load of the candidate access cell is high and the load of the second cell is low, the first access network device may not enable broadcasting of an SSB and/or SI in the candidate access cell.

It should be noted that, optionally, that the first access network device performs another operation includes: The first access network device remains in an original state. For example, the first access network device does not broadcast an SSB and/or SI in the candidate access cell.

1005: The first access network device sends an SSB and/or SI of the candidate access cell to the terminal device. Correspondingly, the terminal device receives the SSB and/or the SI of the candidate access cell from the first access network device.

1006: The terminal device camps on the candidate access cell based on the SSB and/or the SI, or the terminal device performs synchronization in the candidate access cell based on the SSB and/or the SI, or the terminal device initiates random access to the candidate access cell based on the SSB and/or the SI.

Step 1005 and step 1006 are similar to step 203 and step 204 in the embodiment shown in FIG. 2A. For details, refer to related descriptions of step 203 and step 204 in the embodiment shown in FIG. 2A. The details are not described herein again.

In this embodiment, the terminal device receives the wake-up signal information of the first cell from the second access network device. The second access network device is an access network device of the second cell, and the first cell is a cell associated with the second cell. The terminal device receives the reference signal of the first cell from the first access network device. The terminal device sends the wake-up signal for the candidate access cell to the candidate access cell. The wake-up signal is used to wake up the first access network device to broadcast an SSB and/or SI in the candidate access cell. Therefore, it can be understood that the terminal device senses the first cell based on the reference signal of the first cell. In addition, the time domain resources occupied by the reference signal are fewer than the total time domain resources occupied by the SSB of the first cell and the SI of the first cell. In this way, power consumption of broadcasting the reference signal by the first access network device is low. In other words, the first cell is in a low-power simplified broadcast mode. The terminal device senses the first cell based on the reference signal. The terminal device sends the wake-up signal for the candidate access cell to the first access network device based on the wake-up signal information of the first cell. In this way, the first access network device can enable, in a timely manner, broadcasting of an SSB and/or SI in the candidate access cell, so that the terminal device can quickly access the candidate access cell. This reduces a delay of accessing the cell by the terminal device, and improves communication performance.

Figure 11:
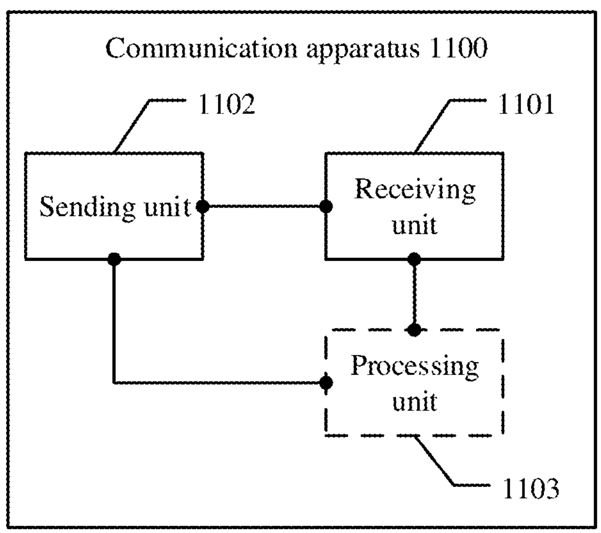
FIG. 11 is a schematic diagram of a structure of a communication apparatus according to an embodiment.

The following describes a communication apparatus provided in embodiments. FIG. 11 is a schematic diagram of a structure of a communication apparatus 1100 according to an embodiment. For example, the communication apparatus 1100 includes a receiving unit 1101 and a sending unit 1102. Optionally, the communication apparatus 1100 further includes a processing unit 1103.

When the communication apparatus 1100 is a terminal device or a chip in a terminal device, the communication apparatus 1100 may be configured to perform some or all of the steps performed by the terminal device in the embodiments shown in FIG. 2A, FIG. 3, FIG. 4A, FIG. 5B, FIG. 6, and FIG. 10. For details, refer to related descriptions of the embodiments shown in FIG. 2A, FIG. 3, FIG. 4A, FIG. 5B, FIG. 6, and FIG. 10.

For example, the receiving unit 1101 is configured to perform step 201 in the embodiment shown in FIG. 2A, and the sending unit 1102 is configured to perform step 202 in the embodiment shown in FIG. 2A.

Optionally, the processing unit 1103 is configured to perform step 202*a*, step 202*b*, and step 204 in the embodiment shown in FIG. 2A.

For example, the receiving unit 1101 is configured to perform step 301 in the embodiment shown in FIG. 3, and the sending unit 1102 is configured to perform step 302 in the embodiment shown in FIG. 3.

Optionally, the processing unit 1103 is configured to perform step 302*a*, step 302*b*, and step 304 in the embodiment shown in FIG. 3.

For example, the receiving unit 1101 is configured to perform step 401 in the embodiment shown in FIG. 4A, and the sending unit 1102 is configured to perform step 402 in the embodiment shown in FIG. 4A.

Optionally, the receiving unit 1101 is configured to perform step 402*b* and step 404 in the embodiment shown in FIG. 4A.

Optionally, the processing unit 1103 is configured to perform step 402*a* and step 405 in the embodiment shown in FIG. 4A.

For example, the receiving unit 1101 is configured to perform step 501 in the embodiment shown in FIG. 5B, and the sending unit 1102 is configured to perform step 502 in the embodiment shown in FIG. 5B.

Optionally, the receiving unit 1101 is configured to perform step 502*b* and step 503 in the embodiment shown in FIG. 5B.

Optionally, the processing unit 1103 is configured to perform step 502*a* and step 504 in the embodiment shown in FIG. 5B.

For example, the receiving unit 1101 is configured to perform step 601 in the embodiment shown in FIG. 6, and the sending unit 1102 is configured to perform step 602 in the embodiment shown in FIG. 6.

Optionally, the receiving unit 1101 is configured to perform step 602*b* and step 604 in the embodiment shown in FIG. 6.

Optionally, the processing unit 1103 is configured to perform step 602*a* and step 605 in the embodiment shown in FIG. 6.

For example, the receiving unit 1101 is configured to perform step 1001 and step 1002 in the embodiment shown in FIG. 10, and the sending unit 1102 is configured to perform step 1003 in the embodiment shown in FIG. 10.

Optionally, the receiving unit 1101 is further configured to perform step 1005 in the embodiment shown in FIG. 10, and the processing unit 1103 is configured to perform step 1006 in the embodiment shown in FIG. 10.

When the communication apparatus 1100 is an access network device or a chip in an access network device, the communication apparatus 1100 may be configured to perform some or all of the steps performed by the access network device in the embodiment shown in FIG. 2A; the communication apparatus 1100 may be configured to perform some or all of the steps performed by the first cell in the embodiment shown in FIG. 3; or the communication apparatus 1100 may be configured to perform some or all of the steps performed by the first access network device or the second access network device in the embodiments shown in FIG. 4A, FIG. 5B, and FIG. 6. The communication apparatus 1100 may be configured to perform some or all of the steps performed by the second access network device in the embodiment shown in FIG. 10. For details, refer to related descriptions of the embodiments shown in FIG. 2A, FIG. 3, FIG. 4A, FIG. 5B, FIG. 6, and FIG. 10.

For example, the sending unit 1102 is configured to perform step 201 in the embodiment shown in FIG. 2A, and the receiving unit 1101 is configured to perform step 202 in the embodiment shown in FIG. 2A.

Optionally, the processing unit 1103 is configured to perform step 203*a* in the embodiment shown in FIG. 2A.

Optionally, the sending unit 1102 is configured to perform step 203 in the embodiment shown in FIG. 2A.

For example, the sending unit 1102 is configured to perform step 301 in the embodiment shown in FIG. 3, and the receiving unit 1101 is configured to perform step 302 in the embodiment shown in FIG. 3.

Optionally, the processing unit 1103 is configured to perform step 303*a* in the embodiment shown in FIG. 3.

Optionally, the sending unit 1102 is configured to perform step 303 in the embodiment shown in FIG. 3.

For example, the sending unit 1102 is configured to perform step 401 in the embodiment shown in FIG. 4A, and the receiving unit 1101 is configured to perform step 403 in the embodiment shown in FIG. 4A.

Optionally, the sending unit 1102 is configured to perform step 404 in the embodiment shown in FIG. 4A.

For example, the sending unit 1102 is configured to perform step 501 in the embodiment shown in FIG. 5B, and the receiving unit 1101 is configured to perform step 502 in the embodiment shown in FIG. 5B.

Optionally, the sending unit 1102 is further configured to perform step 502*b* and step 503 in the embodiment shown in FIG. 5B.

Optionally, the processing unit 1103 is further configured to perform step 503*a* in the embodiment shown in FIG. 5B.

For example, the sending unit 1102 is configured to perform step 601 in the embodiment shown in FIG. 6, and the receiving unit 1101 is configured to perform step 603 in the embodiment shown in FIG. 6.

Optionally, the sending unit 1102 is further configured to perform step 604 in the embodiment shown in FIG. 6.

For example, the receiving unit 1101 is configured to perform step 402 in the embodiment shown in FIG. 4A, and the sending unit 1102 is configured to perform step 403 in the embodiment shown in FIG. 4A.

Optionally, the sending unit 1102 is further configured to perform step 402*b* in the embodiment shown in FIG. 4A.

Optionally, the processing unit 1103 is further configured to perform step 403*a* in the embodiment shown in FIG. 4A.

For example, the receiving unit 1101 is configured to perform step 602 in the embodiment shown in FIG. 6, and the sending unit 1102 is configured to perform step 603 in the embodiment shown in FIG. 6.

Optionally, the sending unit 1102 is further configured to perform step 602*b* in the embodiment shown in FIG. 6.

Optionally, the processing unit 1103 is further configured to perform step 603*a* in the embodiment shown in FIG. 4A.

For example, the sending unit 1102 is configured to perform step 1002 in the embodiment shown in FIG. 10, and the receiving unit 1101 is configured to perform step 1003 in the embodiment shown in FIG. 10.

Optionally, the processing unit 1103 is configured to perform step 1004 in the embodiment shown in FIG. 10, and the sending unit 1102 is configured to perform step 1005 in the embodiment shown in FIG. 10.

Figure 12:
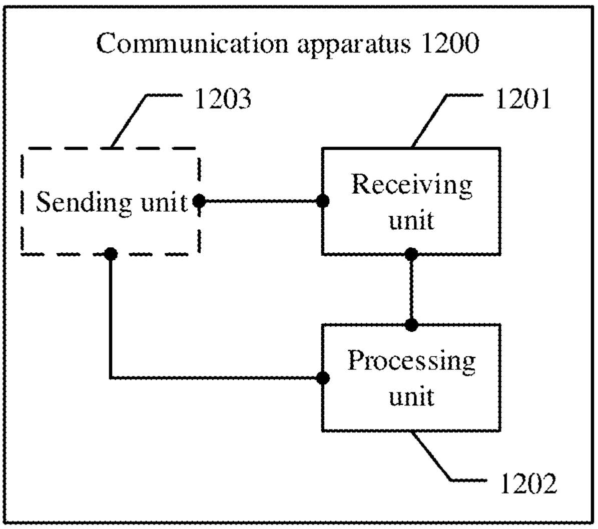
FIG. 12 is a schematic diagram of another structure of a communication apparatus according to an embodiment.

The following describes a communication apparatus provided in embodiments. FIG. 12 is a schematic diagram of a structure of a communication apparatus 1200 according to an embodiment. The communication apparatus 1200 includes a receiving unit 1201 and a processing unit 1202. Optionally, the communication apparatus 1200 further includes a sending unit 1203.

When the communication apparatus 1200 is a terminal device or a chip in a terminal device, the communication apparatus 1200 may be configured to perform some or all of the steps performed by the terminal device in the embodiments shown in FIG. 7A, FIG. 7H, FIG. 8, and FIG. 9. For details, refer to related descriptions in the embodiments shown in FIG. 7A, FIG. 7H, FIG. 8, and FIG. 9. The details are not described herein again.

For example, the receiving unit 1201 is configured to perform step 701 and step 702 in the embodiment shown in FIG. 7A, and the processing unit 1202 is configured to perform step 703 in the embodiment shown in FIG. 7A.

Optionally, the sending unit 1203 is configured to perform step 702*a* in the embodiment shown in FIG. 7A, and the receiving unit 1201 is configured to perform step 702*b* and step 702*c* in the embodiment shown in FIG. 7A.

Optionally, the processing unit 1202 is further configured to perform step 704*a* and step 704 in the embodiment shown in FIG. 7A.

Optionally, the processing unit 1202 is further configured to perform step 7041 to step 7045 in the embodiment shown in FIG. 7H.

For example, the receiving unit 1201 is configured to perform step 801 and step 802 in the embodiment shown in FIG. 8, and the processing unit 1202 is configured to perform step 803 in the embodiment shown in FIG. 8.

Optionally, the sending unit 1203 is configured to perform step 802*a* in the embodiment shown in FIG. 8, and the receiving unit 1201 is configured to perform step 802*b* and step 802*c* in the embodiment shown in FIG. 8.

Optionally, the processing unit 1202 is further configured to perform step 804*a* and step 804 in the embodiment shown in FIG. 8.

For example, the receiving unit 1201 is configured to perform step 901 and step 902 in the embodiment shown in FIG. 9, and the processing unit 1202 is configured to perform step 903 in the embodiment shown in FIG. 9.

Optionally, the sending unit 1203 is configured to perform step 902*a* in the embodiment shown in FIG. 9, and the receiving unit 1201 is configured to perform step 902*b* and step 902*c* in the embodiment shown in FIG. 9.

Optionally, the processing unit 1202 is further configured to perform step 904*a* and step 904 in the embodiment shown in FIG. 9.

Figure 13:
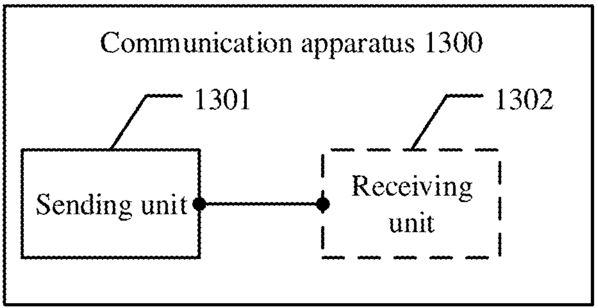
FIG. 13 is a schematic diagram of another structure of a communication apparatus according to an embodiment.

The following describes a communication apparatus provided in embodiments. FIG. 13 is a schematic diagram of a structure of a communication apparatus 1300 according to an embodiment. The communication apparatus 1300 includes a sending unit 1301. Optionally, the communication apparatus 1300 further includes a receiving unit 1302.

When the communication apparatus 1300 is an access network device or a chip in an access network device, the communication apparatus 1300 may be configured to perform some or all of the steps performed by the second access network device in the embodiment shown in FIG. 7A; the communication apparatus 1300 may be configured to perform some or all of the steps performed by the access network device in the embodiment shown in FIG. 8; or the communication apparatus 1300 may be configured to perform some or all of the steps performed by the second cell in the embodiment shown in FIG. 9. For details, refer to related descriptions in the embodiments shown in FIG. 7A, FIG. 8, and FIG. 9.

For example, the sending unit 1301 is configured to perform step 702 in the embodiment shown in FIG. 7A.

Optionally, the receiving unit 1302 is configured to perform step 702*a* in the embodiment shown in FIG. 7A, and the sending unit 1301 is configured to perform step 702*b* and step 702*c* in the embodiment shown in FIG. 7A.

For example, the sending unit 1301 is configured to perform step 802 in the embodiment shown in FIG. 8.

Optionally, the receiving unit 1302 is configured to perform step 802*a* in the embodiment shown in FIG. 8, and the sending unit 1301 is configured to perform step 802*b* in the embodiment shown in FIG. 8.

For example, the sending unit 1301 is configured to perform step 802 in the embodiment shown in FIG. 9.

Optionally, the receiving unit 1302 is configured to perform step 902*a* in the embodiment shown in FIG. 9, and the sending unit 1301 is configured to perform step 902*b* in the embodiment shown in FIG. 9.

Figure 14:
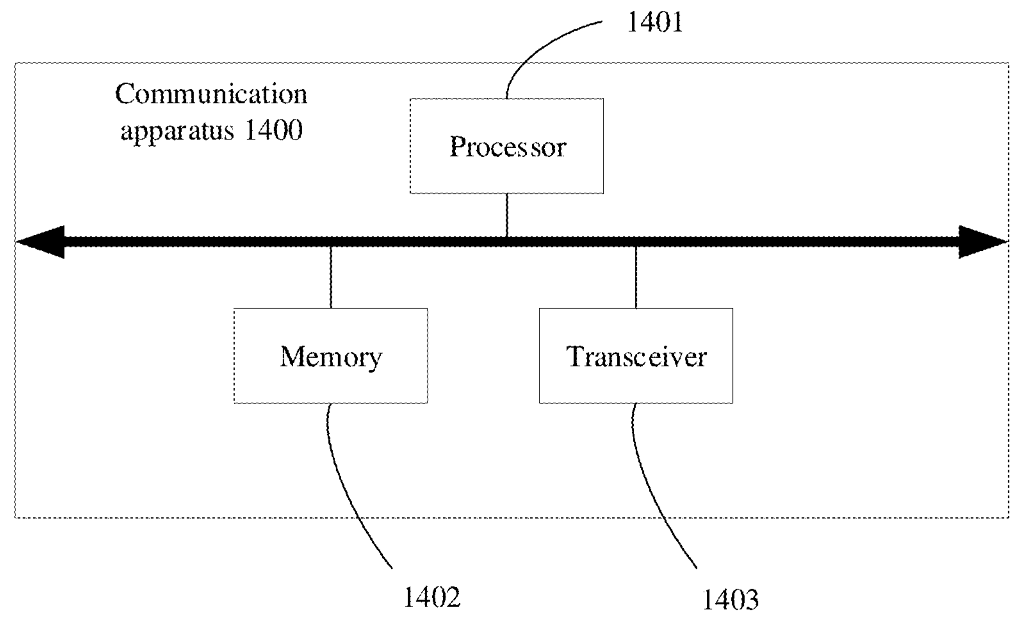
FIG. 14 is a schematic diagram of another structure of a communication apparatus according to an embodiment.

The embodiments further provide a communication apparatus. FIG. 14 is a schematic diagram of another structure of a communication apparatus 1400 according to an embodiment.

The communication apparatus 1400 includes a processor 1401, a memory 1402, and a transceiver 1403.

The processor 1401, the memory 1402, and the transceiver 1403 are connected to each other through a bus, and the memory stores computer instructions.

When the communication apparatus 1400 is an access network device or a chip in an access network device, the communication apparatus 1400 may be configured to perform the steps performed by the access network device in the embodiment shown in FIG. 2A; the communication apparatus 1400 may be configured to perform the steps performed by the first cell in the embodiment shown in FIG. 3; the communication apparatus 1400 may be configured to perform the steps performed by the first access network device or the second access network device in the embodiments shown in FIG. 4A, FIG. 5B, FIG. 6, and FIG. 10; the communication apparatus 1400 may be configured to perform the steps performed by the second access network device in the embodiment shown in FIG. 7A; the communication apparatus 1400 may be configured to perform the steps performed by the access network device in the embodiment shown in FIG. 8; and the communication apparatus 1400 may be configured to perform the steps performed by the second access network device in the embodiment shown in FIG. 10. For details, refer to related descriptions in the foregoing method embodiments.

The sending unit 1102 and the receiving unit 1101 shown in FIG. 11 may be the transceiver 1403. Therefore, a specific implementation of the transceiver 1403 is not described again. The processing unit 1103 shown in FIG. 11 may be the processor 1401. Therefore, a specific implementation of the processor 1401 is not described again.

The sending unit 1301 and the receiving unit 1302 shown in FIG. 13 may be the transceiver 1403. Therefore, a specific implementation of the transceiver 1403 is not described again.

Figure 15:
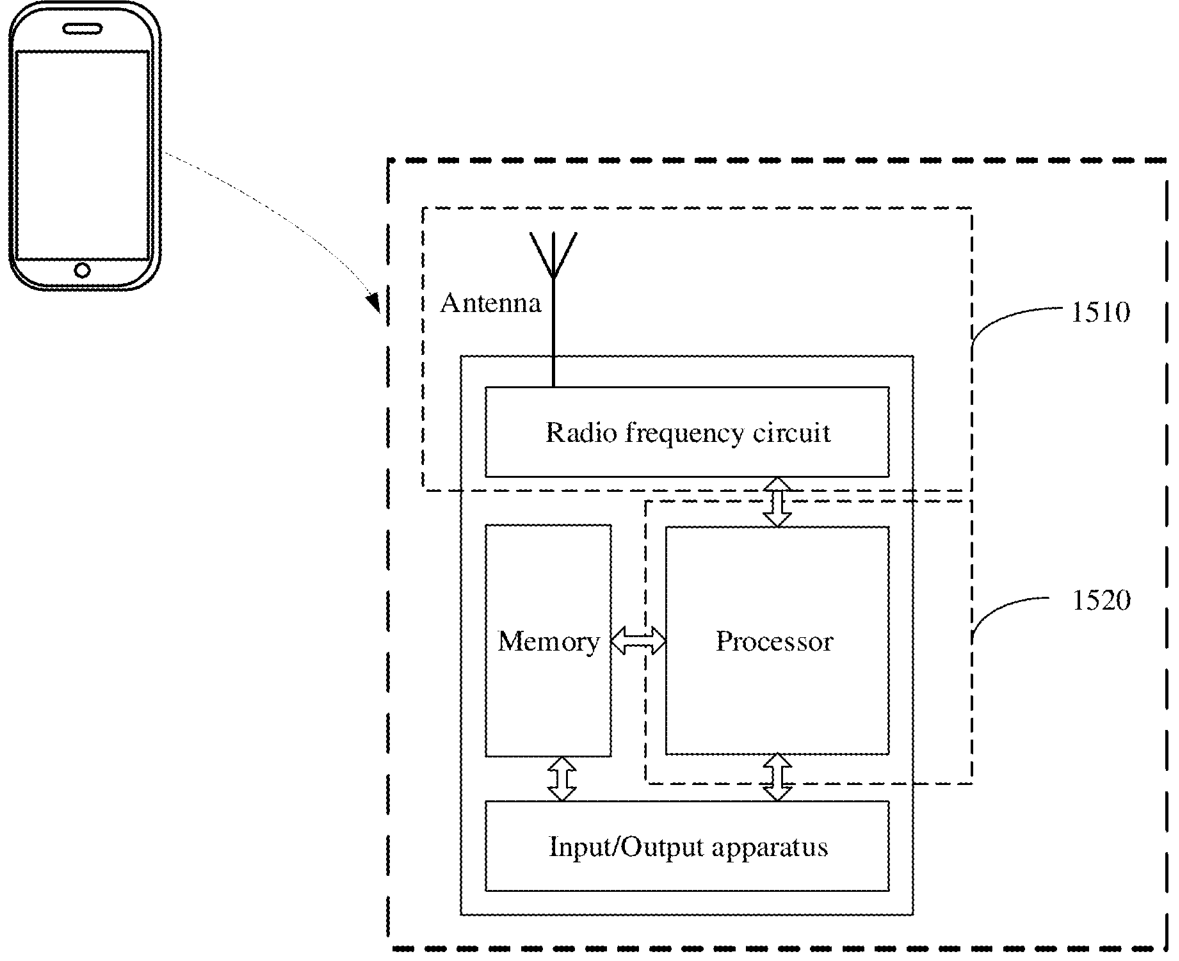
FIG. 15 is a schematic diagram of a structure of a terminal device according to an embodiment.

A schematic diagram of a possible structure of a terminal device is shown in FIG. 15 below.

FIG. 15 is a simplified schematic diagram of a structure of a terminal device. For ease of understanding and illustration, an example in which the terminal device is a mobile phone is used in FIG. 15. As shown in FIG. 15, the terminal device includes a processor, a memory, a radio frequency circuit, an antenna, and an input/output apparatus.

The processor is configured to process a communication protocol and communication data, control the terminal device, execute a software program, process data of the software program, and the like.

The memory is configured to store the software program and data.

The radio frequency circuit is configured to perform conversion between a baseband signal and a radio frequency signal and process the radio frequency signal.

The antenna is configured to send and receive a radio frequency signal in a form of an electromagnetic wave.

The input/output apparatus, for example, a touchscreen, a display, or a keyboard, is configured to receive data entered by a user and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data.

For ease of description, only one memory and one processor are shown in FIG. 15. An actual terminal device product may include one or more processors and one or more memories. The memory may also be referred to as a storage medium, a non-transitory computer readable storage medium, a storage device, or the like. The memory may be disposed independent of the processor, or may be integrated with the processor. This is not limited in this embodiment.

In this embodiment, the antenna and the radio frequency circuit that have a transceiver function may be considered as a transceiver unit of the terminal device, and the processor that has a processing function may be considered as a processing unit of the terminal device. As shown in FIG. 15, the terminal device includes a transceiver unit 1510 and a processing unit 1520. The transceiver unit may also be referred to as a transceiver, a transceiver device, a transceiver apparatus, or the like. The processing unit may also be referred to as a processor, a processing board, a processing module, a processing apparatus, or the like.

Optionally, a component that is in the transceiver unit 1510 and that is configured to implement a receiving function may be considered as a receiving unit, and a component that is in the transceiver unit 1510 and that is configured to implement a sending function may be considered as a sending unit. That is, the transceiver unit 1510 includes the receiving unit and the sending unit. The transceiver unit sometimes may also be referred to as a transceiver machine, a transceiver, a transceiver circuit, or the like. The receiving unit sometimes may also be referred to as a receiving machine, a receiver, a receive circuit, or the like. The sending unit sometimes may also be referred to as a transmitting machine, a transmitter, a transmit circuit, or the like.

It should be understood that the transceiver unit 1510 is configured to perform a sending operation and a receiving operation on the terminal device in the method embodiments, and the processing unit 1520 is configured to perform operations other than the sending and receiving operations on the terminal device in the method embodiments.

When the terminal device is a chip, the chip includes a transceiver unit and a processing unit. The transceiver unit may be an input/output circuit or a communication interface. The processing unit is a processor, a microprocessor, an integrated circuit, or a logic circuit integrated on the chip. In the method embodiments, the sending operation corresponds to output of the input/output circuit, and the receiving operation corresponds to input for the input/output circuit.

Figure 16:
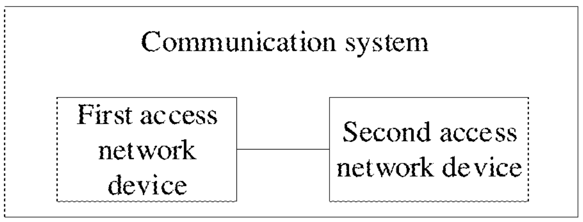
FIG. 16 is a schematic diagram of a communication system according to an embodiment.

An embodiment further provides a communication system. FIG. 16 is a schematic diagram of a communication system. The communication system includes a first access network device and a second access network device. The first access network device is configured to perform all or some of the steps performed by the first access network device in the embodiments shown in FIG. 4A, FIG. 7A, and FIG. 10. The second access network device is configured to perform all or some of the steps performed by the second access network device in the embodiments shown in FIG. 4A, FIG. 7A, and FIG. 10.

An embodiment further provides a computer program product including computer instructions. When the computer program product runs on a computer, the computer is enabled to perform the communication methods in the embodiments shown in FIG. 2A, FIG. 3, FIG. 4A, FIG. 5B, FIG. 6, FIG. 7A, FIG. 7H, FIG. 8, FIG. 9, and FIG. 10.

An embodiment further provides a non-transitory computer-readable storage medium, including computer instructions. When the computer instructions run on a computer, the computer is enabled to perform the communication methods in the embodiments shown in FIG. 2A, FIG. 3, FIG. 4A, FIG. 5B, FIG. 6, FIG. 7A, FIG. 7H, FIG. 8, FIG. 9, and FIG. 10.

An embodiment further provides a chip apparatus, including a processor, configured to invoke a computer program or computer instructions stored in a memory, so that the processor performs the communication methods in the embodiments shown in FIG. 2A, FIG. 3, FIG. 4A, FIG. 5B, FIG. 6, FIG. 7A, FIG. 7H, FIG. 8, FIG. 9, and FIG. 10.

Optionally, the processor is coupled to the memory through an interface.

Optionally, the chip apparatus further includes a memory, and the memory stores a computer program or computer instructions.

Any aforementioned processor may be a general-purpose central processing unit, a microprocessor, an application-specific integrated circuit (ASIC), or one or more integrated circuits for controlling execution of programs for the communication methods in the embodiments shown in FIG. 2A, FIG. 3, FIG. 4A, FIG. 5B, FIG. 6, FIG. 7A, FIG. 7H, FIG. 8, FIG. 9, and FIG. 10.

Any aforementioned memory may be a read-only memory (ROM), another type of static storage device capable of storing static information and instructions, a random access memory (RAM), or the like.

In addition, it should be noted that the apparatus embodiments described above are merely examples. The units described as separate parts may or may not be physically separate, and parts shown as units may or may not be physical units, that is, may be located in one place, or may be distributed on a plurality of network units. Some or all of the modules may be selected according to actual requirements to achieve objectives of solutions of embodiments. In addition, in the accompanying drawings of the apparatus embodiments, a connection relationship between modules indicates that the modules have a communication connection, which may be implemented as one or more communication buses or signal cables.

According to the descriptions of the foregoing implementations, a person skilled in the art can clearly understand that the embodiments may be implemented by software in combination with necessary general-purpose hardware, or may be implemented by dedicated hardware, including an application-specific integrated circuit, a dedicated CPU, a dedicated memory, a dedicated component, or the like. Additionally, any function performed by a computer program may be implemented by corresponding hardware, and a same function may also be implemented by various specific hardware structures, for example, an analog circuit, a digital circuit, or a dedicated circuit. However, in the embodiments, an implementation by using a software program can be desired implementation in some cases. Based on such an understanding, solutions of the embodiments essentially, or a part contributing to the conventional technology, may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device to perform the methods in embodiments.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of processes or functions according to embodiments are generated. The computer may be a general-purpose computer, a dedicated computer, a computer network, or another programmable apparatus. The computer instructions may be stored in a non-transitory computer-readable storage medium, or may be transmitted from a non-transitory computer-readable storage medium to another non-transitory computer-readable storage medium. For example, the computer instructions may be transmitted from a website, computer, network device, local computing device, computing device, or data center to another website, computer, network device, local computing device, computing device, or data center in a wired (for example, a coaxial cable, an optical fiber, or a digital subscriber line (DSL)) or wireless (for example, infrared, radio, or microwave) manner. The non-transitory computer-readable storage medium may be any usable medium that can be stored on the computer, or a data storage device, for example, a network device, a local computing device, or a data center, that integrates one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It should be understood that "an embodiment" or "embodiment" means that a specific feature, structure, or characteristic related to the embodiment is included in at least one embodiment. Therefore, "in one embodiment" or "in an embodiment" does not necessarily indicate a same embodiment. In addition, these particular features, structures, or characteristics may be combined in one or more embodiments in any appropriate manner. It should be understood that sequence numbers of the foregoing processes do not mean execution sequences in embodiments. The execution sequences of the processes should be determined based on functions and internal logic of the processes, and should not constitute any limitation on implementation processes of embodiments.

A person of ordinary skill in the art may be aware that, in combination with the examples described in embodiments, units and algorithm steps can be implemented by electronic hardware, computer software, or a combination thereof. To clearly describe interchangeability between hardware and software, the foregoing generally describes compositions and steps of the examples based on functions. Whether the functions are performed by hardware or software depends on particular applications and design constraints of solutions. A person skilled in the art may use different methods to implement the described functions for each particular application, but it should not be considered that the implementation goes beyond the scope of the embodiments.

It can be clearly understood by a person skilled in the art that, for ease and brevity of description, for detailed operating processes of the foregoing system, apparatus, and unit, reference may be made to corresponding processes in the foregoing method embodiments. Details are not described herein again.

In several embodiments provided, it should be understood that the system, apparatuses, and methods may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may or may not be physical units, that is, may be located in one place, or may be distributed on a plurality of network units. Some or all of the units may be selected according to actual requirements to achieve objectives of solutions of embodiments.

In addition, functional units in embodiments may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a non-transitory computer-readable storage medium. Based on such an understanding, solutions of the embodiments essentially, or a part contributing to the conventional technology, or all or some of solutions may be implemented in a form of a software product. The computer software product is stored in a storage medium and includes several instructions for instructing a computer device (which may be a personal computer, a server, a network device, or the like) to perform all or some of the steps of the methods in embodiments.

In conclusion, the foregoing descriptions are merely example embodiments of solutions of the embodiments, but are not intended to limit the scope of the embodiments. Any modification, equivalent replacement, or improvement made without departing from the spirit and principle of the embodiments shall fall within the scope of the embodiments.

The invention claimed is:

1. A method, comprising:

receiving, by a terminal device, a reference signal from a first cell, wherein time domain resources occupied by the reference signal are fewer than total time domain resources occupied by a synchronization signal block (SSB) of the first cell and system information (SI) of the first cell; and sending, by the terminal device, a wake-up signal (WUS) to the first cell, wherein the wake-up signal is used to wake up the first cell to send the SSB and/or the SI.

2. The method according to claim 1, further comprising:

determining, by the terminal device, the first cell based on the reference signal.

3. The method according to claim 1, wherein the reference signal comprises at least one of:

an identifier of the first cell, a number of a system frame in which the reference signal is located, a half-frame indication, an index of the reference signal, a beam index of the reference signal, a time-frequency resource for sending the wake-up signal, a feature parameter of a pseudo-random sequence used by the wake-up signal, a condition for sending the wake-up signal by the terminal device, a paging indication, or a system information number.

4. The method according to claim 1, wherein sending, by the terminal device, the wake-up signal to the first cell comprises:

sending, by the terminal device, the wake-up signal to the first cell when a first condition is met, wherein the first condition comprises at least one of: the terminal device determines to camp on or access the first cell; received power of the reference signal is greater than a threshold; the reference signal is a reference signal with maximum received power among reference signals that are received by the terminal device and that respectively correspond to one or more cells; the reference signal comprises a paging indication; or a system information number comprised in the reference signal changes.

5. The method according to claim 1, wherein the reference signal comprises the time-frequency resource for sending the wake-up signal and the feature parameter of the pseudo-random sequence used by the wake-up signal, and the method further comprises:

generating, by the terminal device, the wake-up signal based on the feature parameter of the pseudo-random sequence used by the wake-up signal; and sending, by the terminal device, the wake-up signal to the first cell comprises:

sending, by the terminal device, the wake-up signal to the first cell on the time-frequency resource for sending.

6. The method according to claim 1, wherein the wake-up signal comprises a preamble for waking up the first cell to send the SSB and/or the SI.

7. A method, comprising:

sending, by an access network device, a reference signal to a terminal device, wherein the access network device is an access network device to which a first cell belongs, and time domain resources occupied by the reference signal are fewer than total time domain resources occupied by a synchronization signal block (SSB) of the first cell and system information (SI) of the first cell; and receiving, by the access network device, a wake-up signal (WUS) from the terminal device, wherein the wake-up signal is used to wake up the access network device to send the SSB and/or the SI in the first cell.

8. The method according to claim 7, wherein the reference signal comprises at least one of:

an identifier of the first cell, a number of a system frame in which the reference signal is located, a half-frame indication, an index of the reference signal, a beam index of the reference signal, a time-frequency resource for sending the wake-up signal, a feature parameter of a pseudo-random sequence used by the wake-up signal, a condition for sending the wake-up signal by the terminal device, a paging indication, or a system information number.

9. The method according to claim 7, further comprising: sending, by the access network device, the SSB and/or the SI to the terminal device.

10. The method according to claim 9, further comprising:

determining, by the access network device, whether to enable broadcasting of the SSB and/or the SI in the first cell; and if the access network device determines to enable broadcasting of the SSB and/or the SI in the first cell, performing, by the access network device, the step of sending, by the access network device, the SSB and/or the SI to the terminal device.

11. The method according to claim 10, wherein determining, by the access network device, whether to enable broadcasting of the SSB and/or the SI in the first cell comprises:

determining, by the access network device based on first information, whether to enable broadcasting of the SSB and/or the SI in the first cell, wherein the first information comprises at least one of: load of the first cell, load of a neighboring cell of the first cell, or received power of the reference signal.

12. The method according to claim 7, wherein the reference signal comprises the time-frequency resource for sending the wake-up signal and the feature parameter of the pseudo-random sequence used by the wake-up signal, and the method further comprises:

receiving, by the access network device, the wake-up signal from the terminal device on the time-frequency resource for sending; and determining, by the access network device, the wake-up signal based on the feature parameter of the pseudo-random sequence used by the wake-up signal.

13. The method according to claim 7, wherein the wake-up signal comprises a preamble for waking up the first cell to send the SSB and/or the SI.

14. An apparatus, comprising:

a processor; and a non-transitory computer-readable medium including computer-executable instructions that, when executed by the processor, cause the apparatus to carry out a method including:

receiving, by a terminal device, a reference signal from a first cell, wherein time domain resources occupied by the reference signal are fewer than total time domain resources occupied by a synchronization signal block (SSB) of the first cell and system information (SI) of the first cell; and sending, by the terminal device, a wake-up signal (WUS) to the first cell, wherein the wake-up signal is used to wake up the first cell to send the SSB and/or the SI.

15. The apparatus according to claim 14, wherein the method further comprises:

determining, by the terminal device, the first cell based on the reference signal.

16. The apparatus according to claim 14, wherein the reference signal comprises at least one of:

an identifier of the first cell, a number of a system frame in which the reference signal is located, a half-frame indication, an index of the reference signal, a beam index of the reference signal, a time-frequency resource for sending the wake-up signal, a feature parameter of a pseudo-random sequence used by the wake-up signal, or a condition for sending the wake-up signal by the terminal device.

17. The apparatus according to claim 14, wherein sending, by the terminal device, the wake-up signal to the first cell comprises:

sending, by the terminal device, the wake-up signal to the first cell when a first condition is met, wherein the first condition comprises at least one of: the terminal device determines to camp on or access the first cell; received power of the reference signal is greater than a threshold; the reference signal is a reference signal with maximum received power among reference signals that are received by the terminal device and that respectively correspond to one or more cells; the reference signal comprises a paging indication; or a system information number comprised in the reference signal changes.

18. The apparatus according to claim 14, wherein the reference signal comprises the time-frequency resource for sending the wake-up signal and the feature parameter of the pseudo-random sequence used by the wake-up signal, and the method further comprises:

generating, by the terminal device, the wake-up signal based on the feature parameter of the pseudo-random sequence used by the wake-up signal; and sending, by the terminal device, the wake-up signal to the first cell comprises:

sending, by the terminal device, the wake-up signal to the first cell on the time-frequency resource for sending.

19. The apparatus according to claim 14, wherein the wake-up signal comprises a preamble for waking up the first cell to send the SSB and/or the SI.

* * * * *